United States Patent
Sun et al.

(10) Patent No.: US 10,879,532 B2
(45) Date of Patent: *Dec. 29, 2020

(54) POSITIVE ELECTRODE ACTIVE MATERIAL, METHOD FOR MANUFACTURING SAME, AND LITHIUM SECONDARY BATTERY CONTAINING SAME

(71) Applicant: IUCF-HYU(INDUSTRY-UNIVERSITY COOPERATION FOUNDATION HANYANG UNIVERSITY), Seoul (KR)

(72) Inventors: Yang-Kook Sun, Seoul (KR); Do Wook Jun, Seongnam-si (KR); Un Hyuck Kim, Gunpo-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,197

(22) Filed: Oct. 9, 2018

(65) Prior Publication Data

US 2019/0044141 A1    Feb. 7, 2019

Related U.S. Application Data

(63) Continuation of application No. PCT/KR2017/002697, filed on Mar. 13, 2017.

(30) Foreign Application Priority Data

Apr. 8, 2016    (KR) .................. 10-2016-0043718
Feb. 17, 2017    (KR) .................. 10-2017-0021889

(51) Int. Cl.
     *H01M 4/525*      (2010.01)
     *H01M 4/505*      (2010.01)
     (Continued)

(52) U.S. Cl.
     CPC ............ *H01M 4/525* (2013.01); *C01G 53/04* (2013.01); *C01G 53/42* (2013.01); *H01M 4/366* (2013.01);
     (Continued)

(58) Field of Classification Search
     CPC .. H01M 10/052; H01M 4/0471; H01M 4/366; H01M 4/485; H01M 4/505; H01M 4/525; H01M 4/626
     See application file for complete search history.

(56) References Cited

U.S. PATENT DOCUMENTS

2014/0158932 A1*    6/2014    Sun .................. H01M 4/13
                                                 252/182.1
2014/0205901 A1    7/2014    Nagai et al.
     (Continued)

FOREIGN PATENT DOCUMENTS

CN       105378985 A    3/2016
EP       1 321 994 A2    6/2003
     (Continued)

OTHER PUBLICATIONS

Sung-Kyun Jung, et al., "Understanding the Degradation Mechanisms of $LiNi_{0.5}Co_{0.2}Mn_{0.3}O_2$ Cathode Material in Lithium Ion Batteries", Advanced Energy Materials, 2014, 7 pages, vol. 4, No. 1300787.

(Continued)

*Primary Examiner* — Robert S Jones, Jr.
*Assistant Examiner* — Rachel L Zhang
(74) *Attorney, Agent, or Firm* — Sughrue Mion, PLLC

(57) ABSTRACT

A positive active material is provided. The positive active material may include lithium, an additive metal, and at least (Continued)

one of nickel, cobalt, manganese, or aluminum. The additive metal may include an element different from nickel, cobalt, manganese, and aluminum. An average content of the additive metal may be less than 2 mol %.

16 Claims, 55 Drawing Sheets

(51) Int. Cl.
  *H01M 4/04* (2006.01)
  *H01M 10/052* (2010.01)
  *C01G 53/00* (2006.01)
  *H01M 4/485* (2010.01)
  *C01G 53/04* (2006.01)
  *H01M 4/62* (2006.01)
  *H01M 4/36* (2006.01)
  *H01M 4/02* (2006.01)

(52) U.S. Cl.
  CPC ........... *H01M 4/485* (2013.01); *H01M 4/505* (2013.01); *H01M 4/626* (2013.01); *H01M 10/052* (2013.01); *C01P 2002/52* (2013.01); *C01P 2002/54* (2013.01); *C01P 2002/72* (2013.01); *C01P 2004/03* (2013.01); *C01P 2004/04* (2013.01); *C01P 2004/12* (2013.01); *C01P 2004/45* (2013.01); *H01M 4/0471* (2013.01); *H01M 2004/021* (2013.01); *H01M 2004/028* (2013.01)

(56) References Cited

U.S. PATENT DOCUMENTS

| 2015/0228974 A1 | 8/2015 | Kokado et al. |
| 2016/0079595 A1 | 3/2016 | Sun et al. |
| 2016/0099469 A1* | 4/2016 | Paulsen ................. C01G 53/50 429/223 |

FOREIGN PATENT DOCUMENTS

| EP | 2 752 923 A1 | 7/2014 |
| EP | 3 007 253 A1 | 4/2016 |
| JP | 2006-236762 A | 9/2006 |
| KR | 10-2010-0042145 A | 4/2010 |
| KR | 10-2011-0099935 A | 9/2011 |
| KR | 10-2012-0030632 A | 3/2012 |
| KR | 10-1400593 B1 | 5/2014 |
| KR | 10-2014-0142171 A | 12/2014 |
| KR | 10-2016-0023496 A | 3/2016 |

OTHER PUBLICATIONS

International Search Report for PCT/KR2017/002697 dated Jun. 19, 2017 [PCT/ISA/210].

* cited by examiner

[Fig. 1]
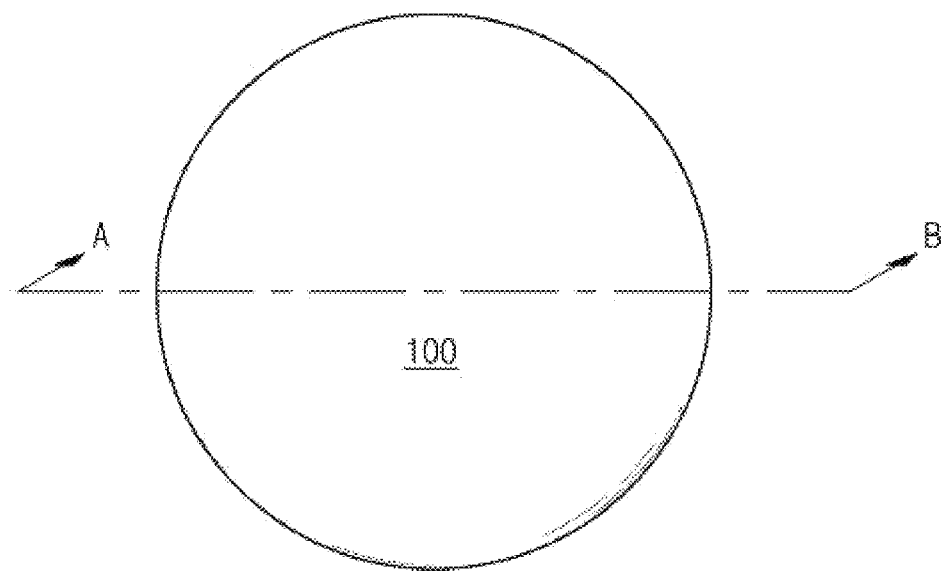
[Fig. 2]
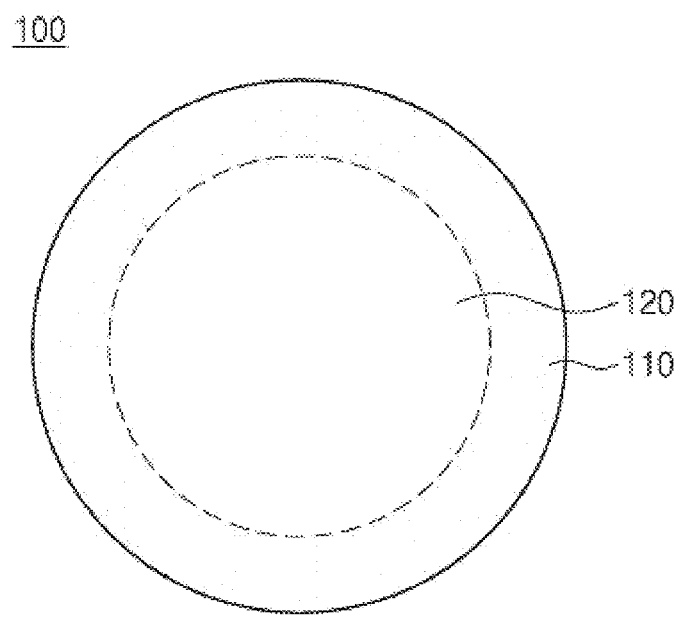

[Fig. 3]
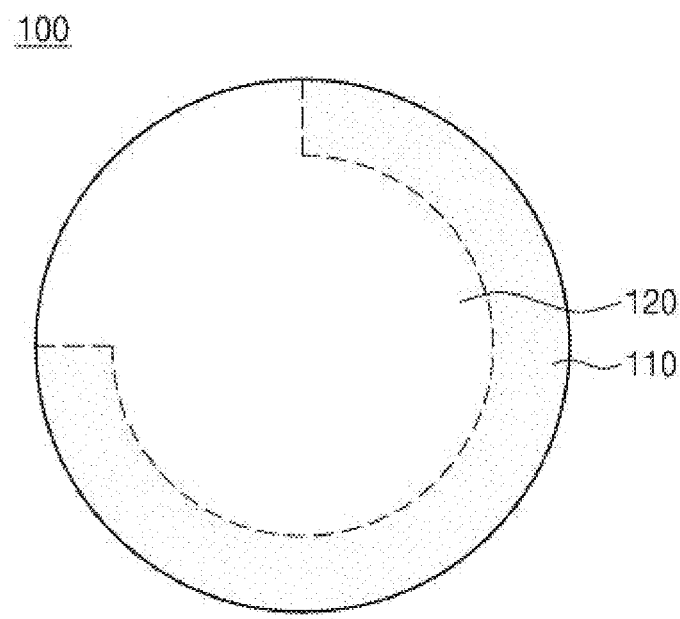
[Fig. 4]
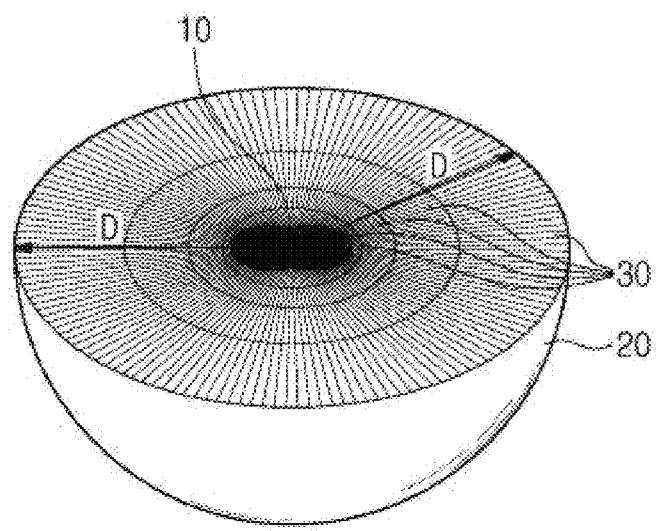

【Fig. 5(a)】
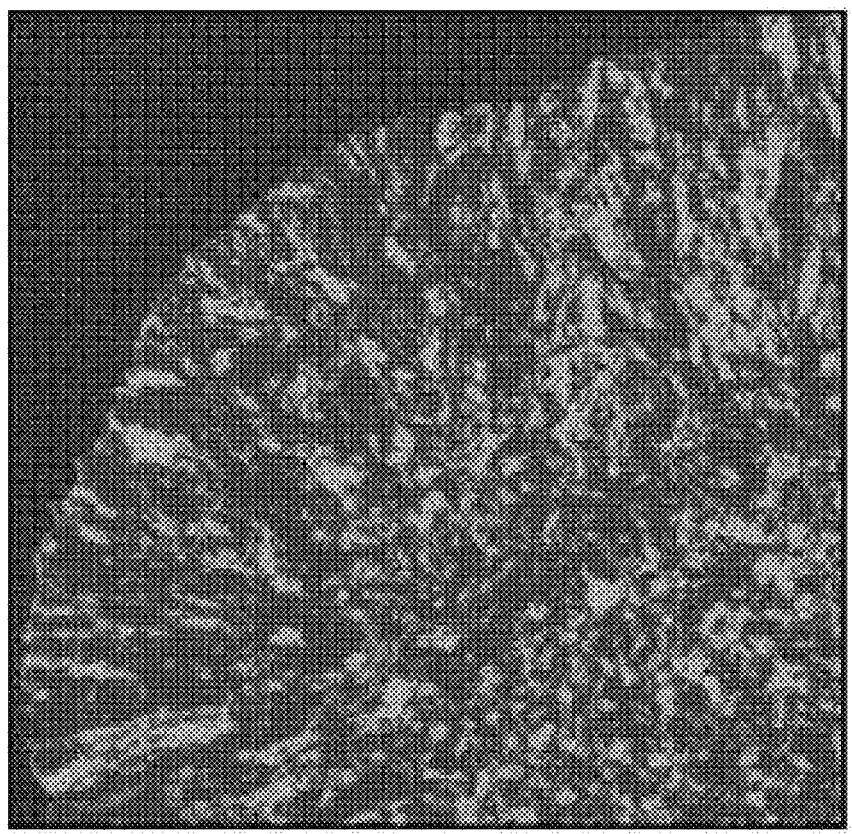

[Fig. 5(b)]
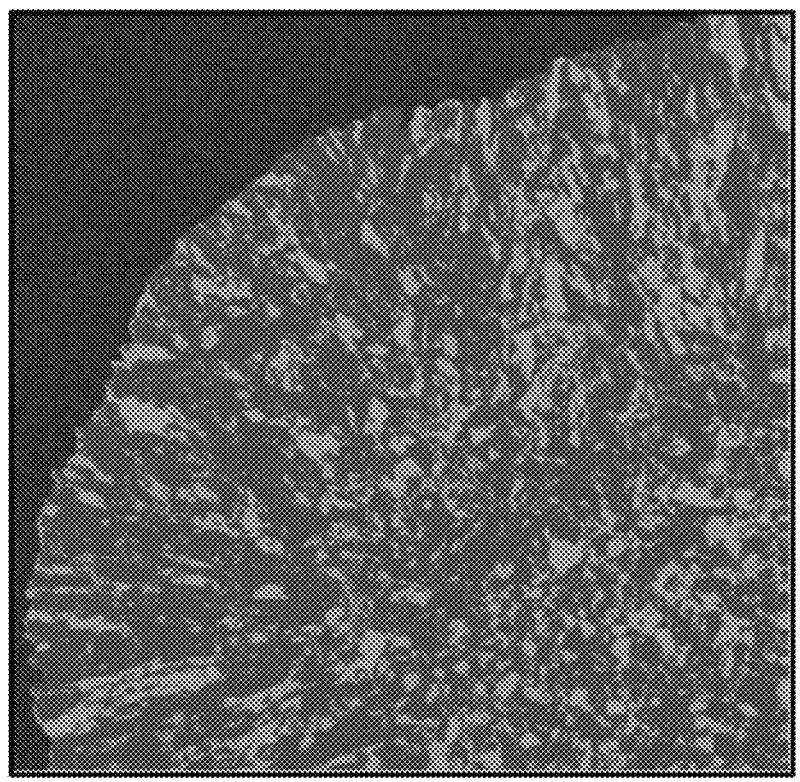

[Fig. 6(a)]
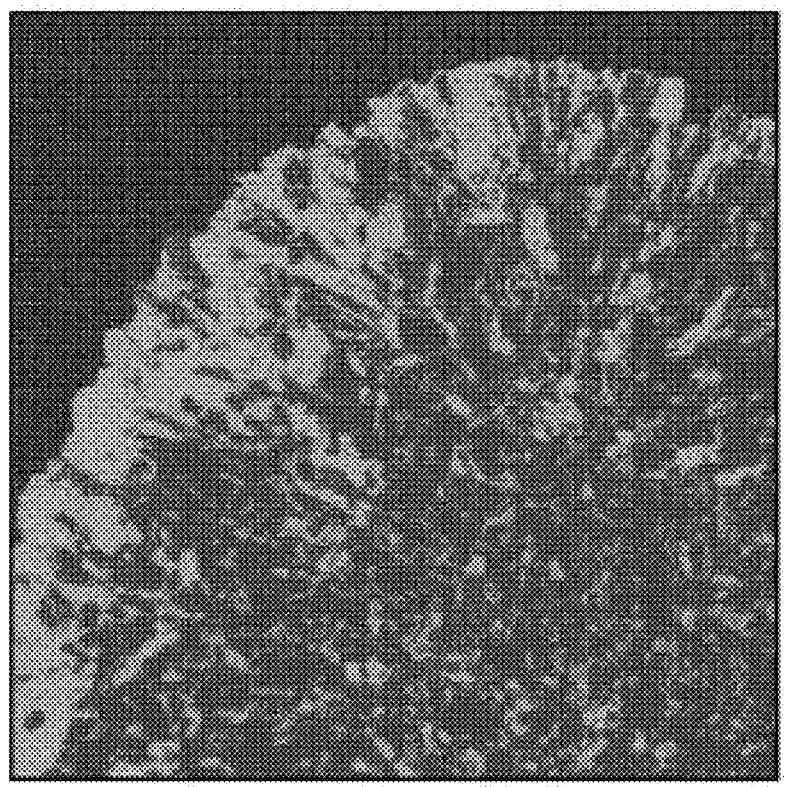

[Fig. 6(b)]
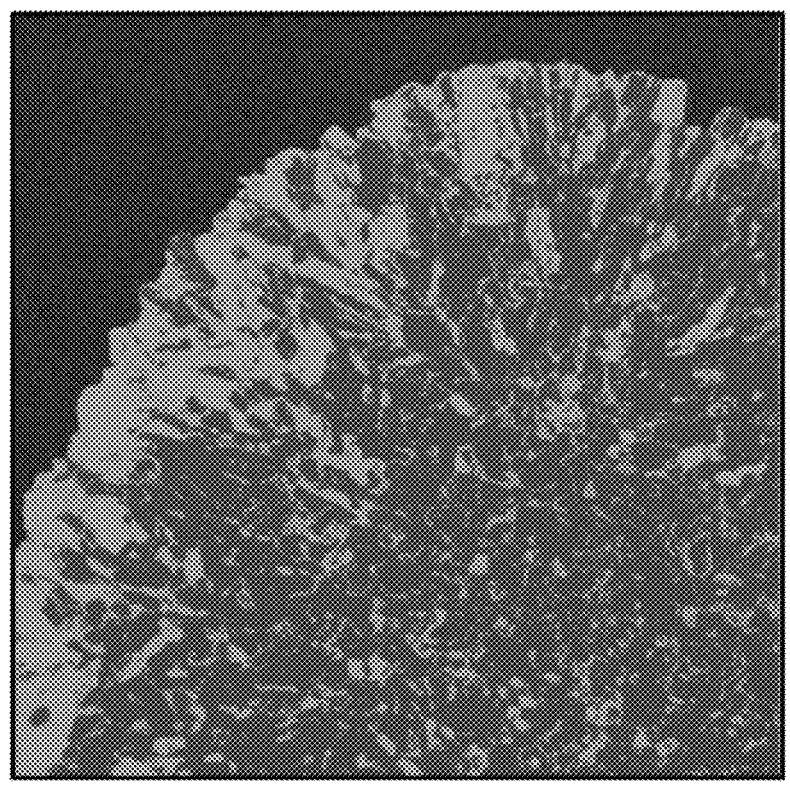

[Fig. 11]
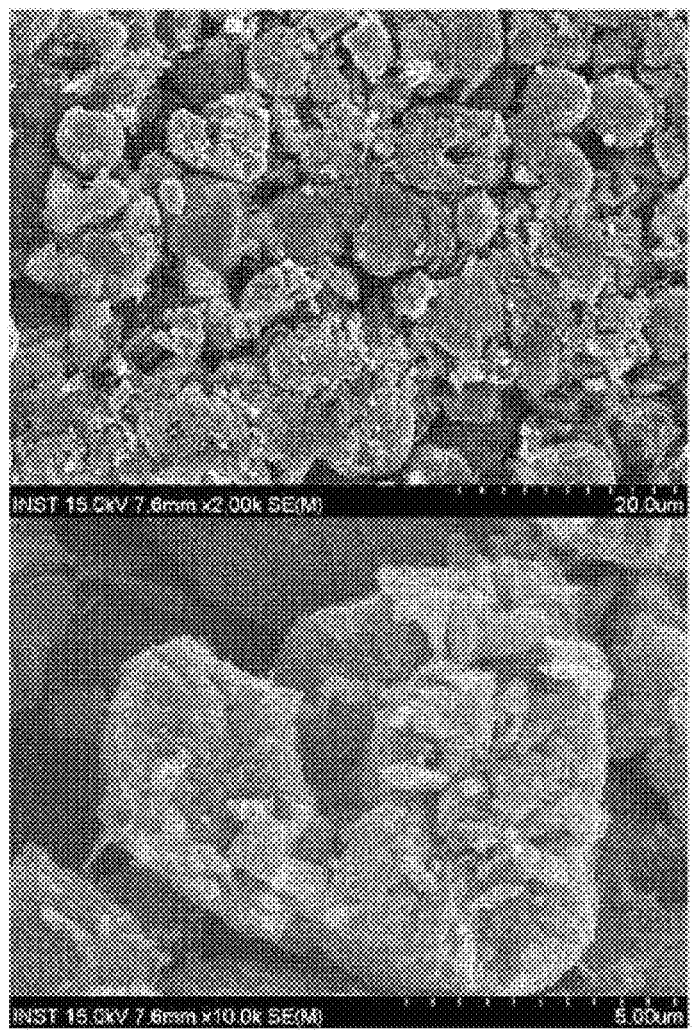

[Fig. 12]
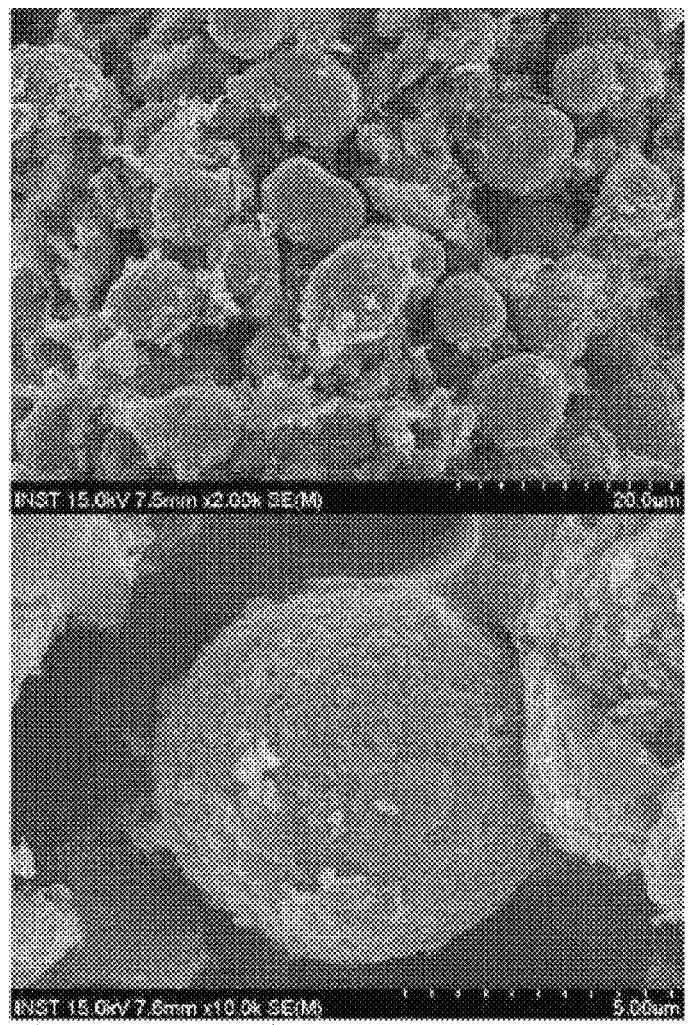

[Fig. 13]
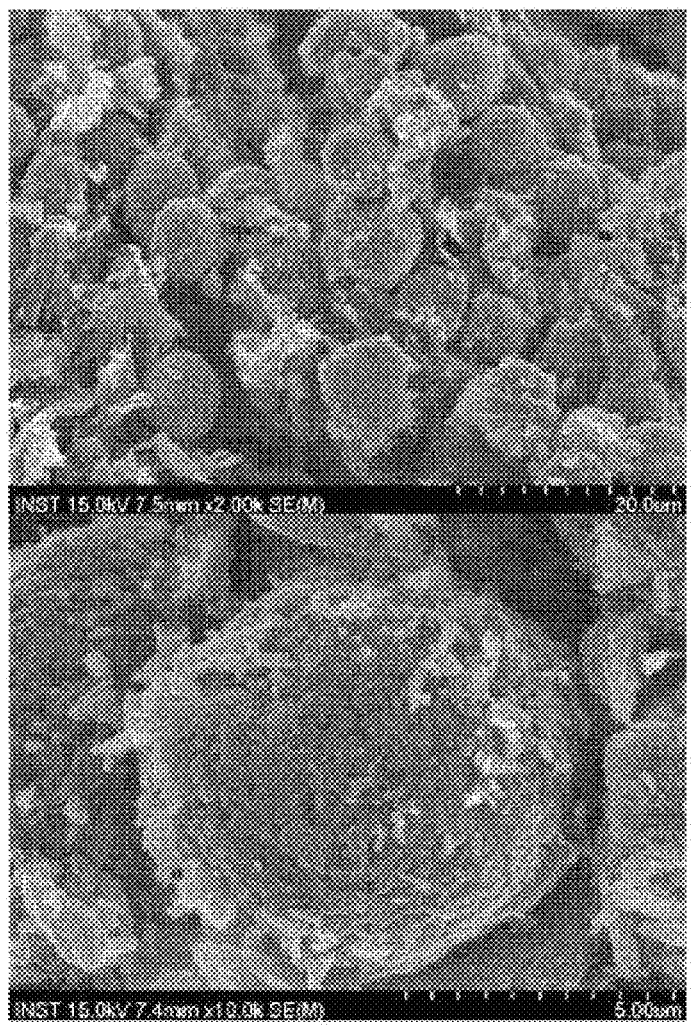

[Fig. 14]
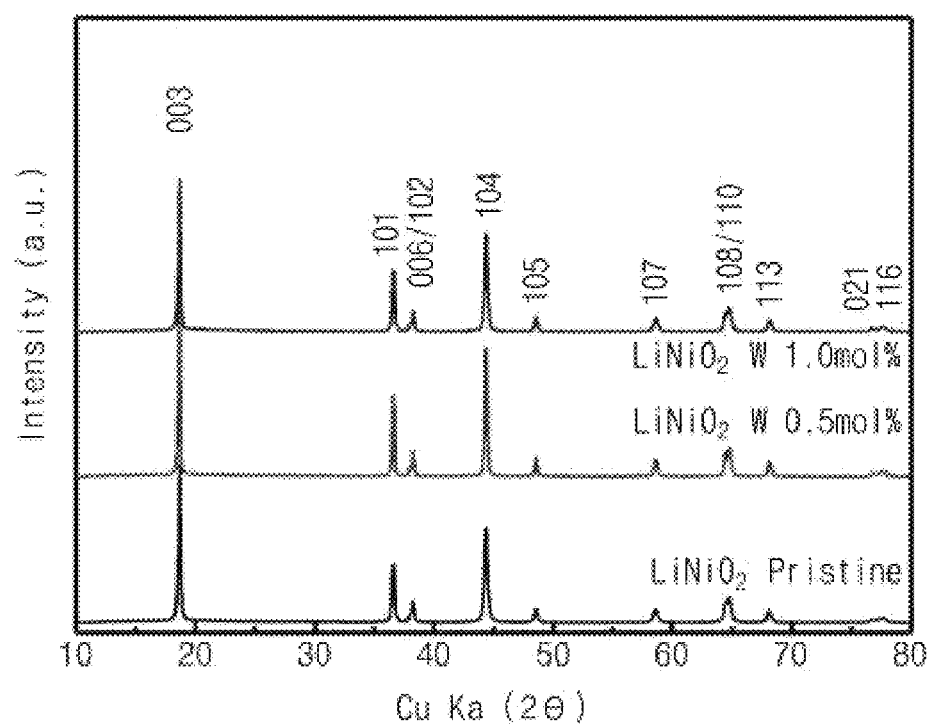

[Fig. 15]
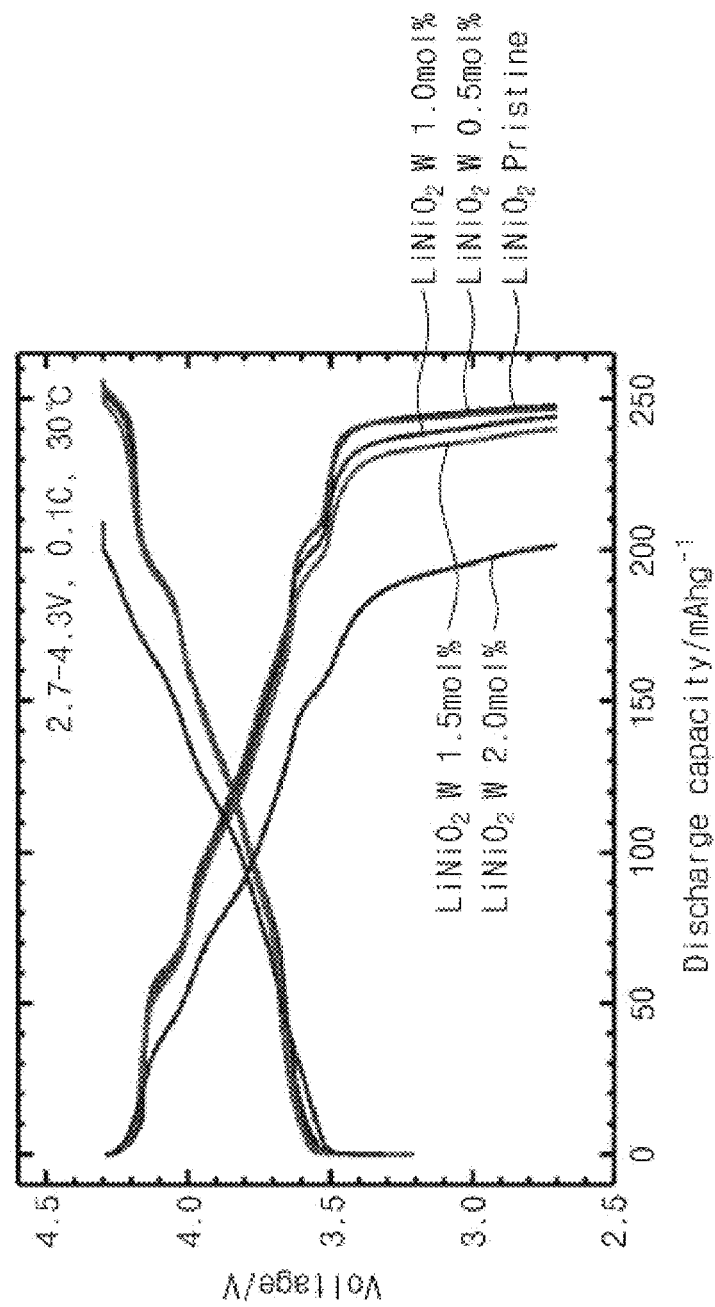

[Fig. 16]
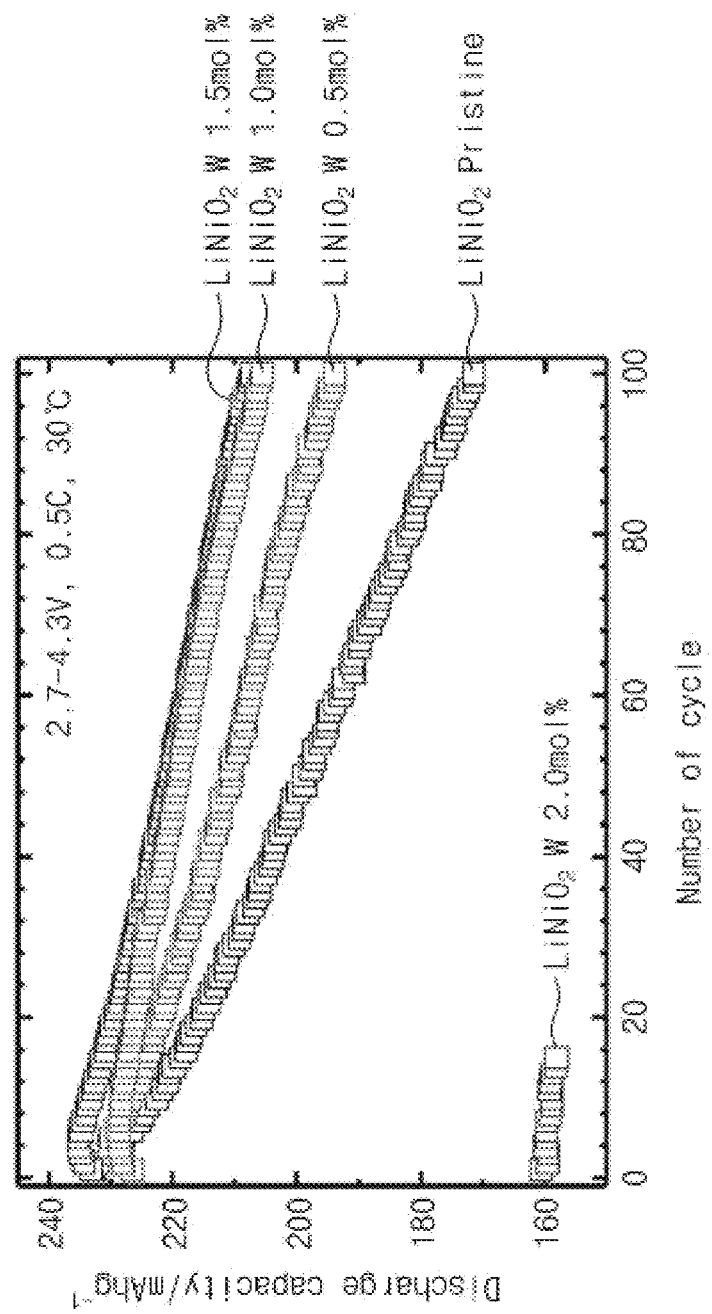

[Fig. 17]
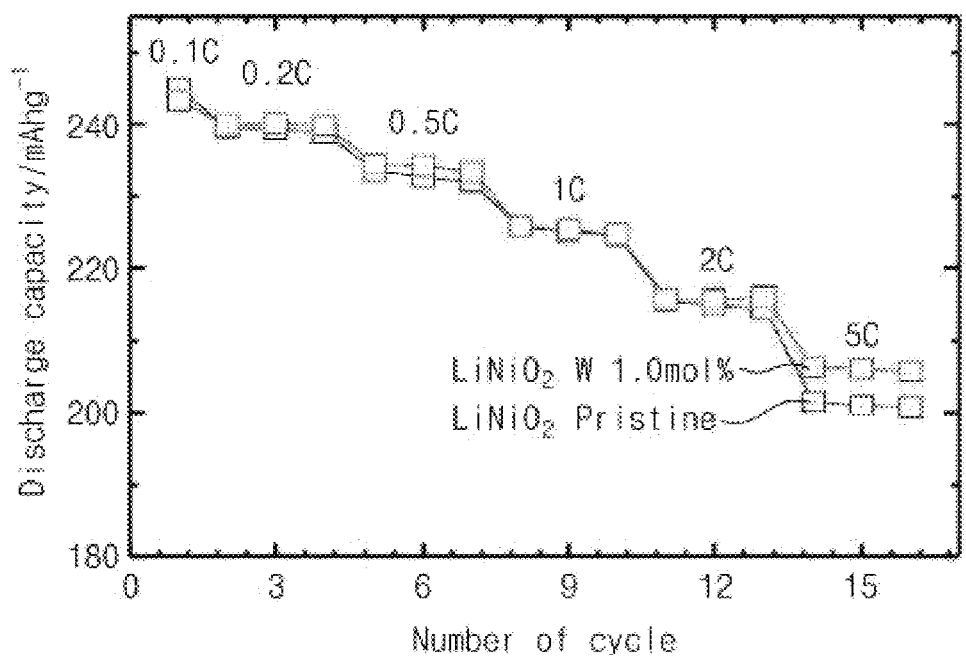

[Fig. 18]
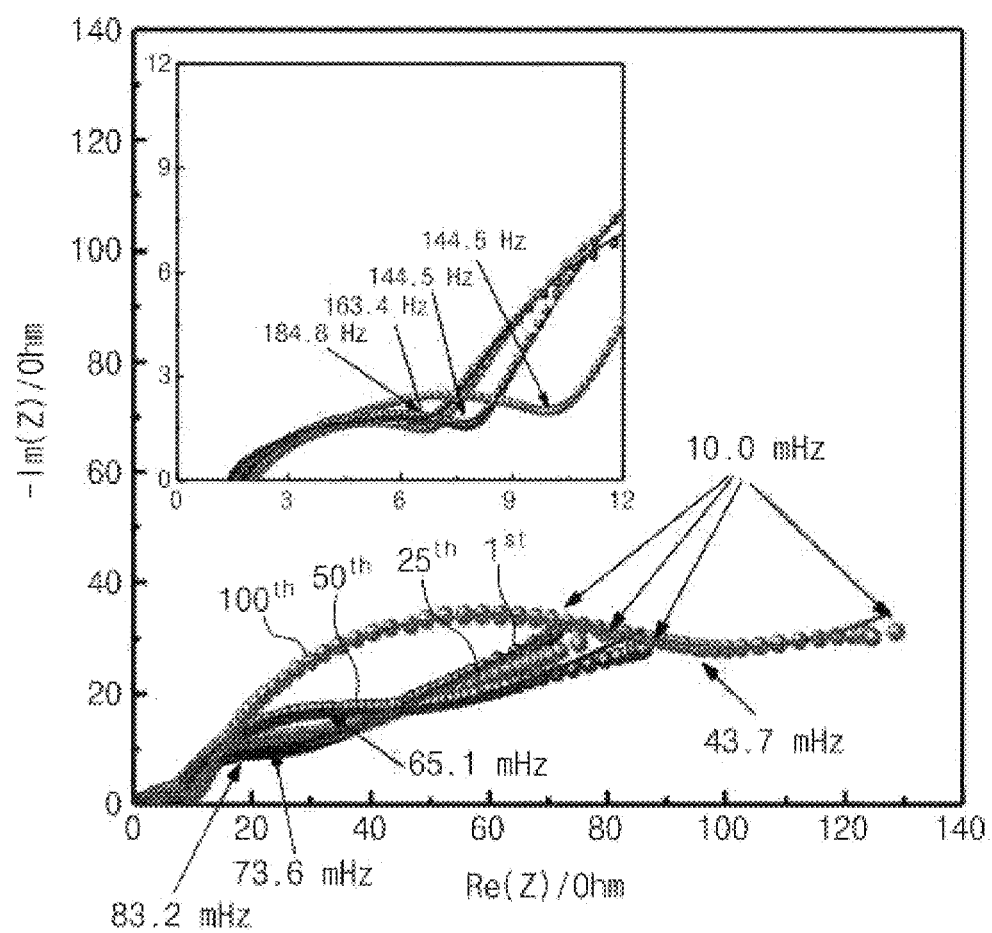

[Fig. 19]
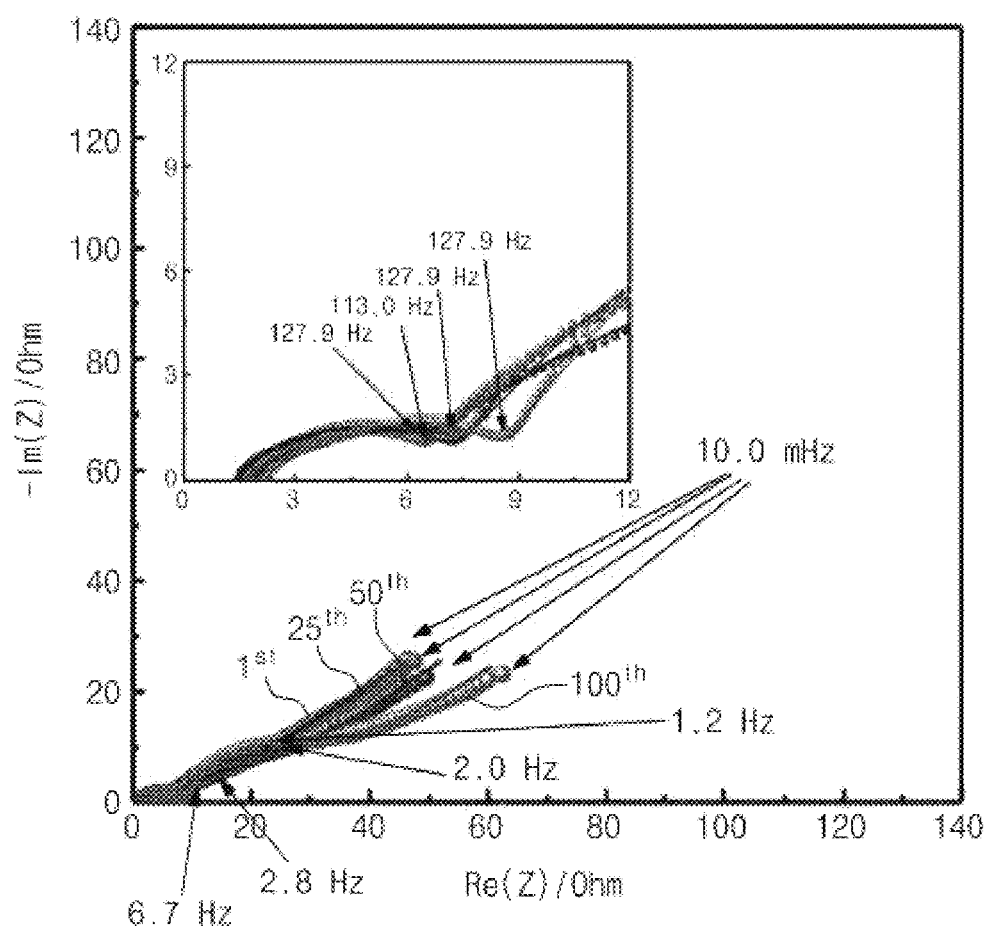

[Fig. 20]
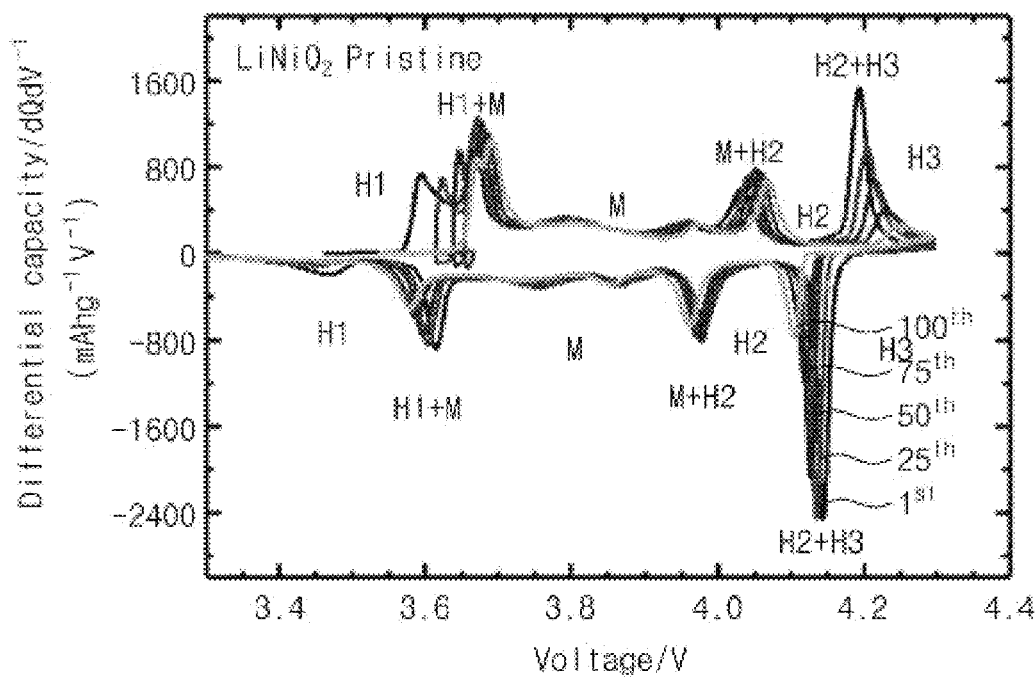
[Fig. 21]
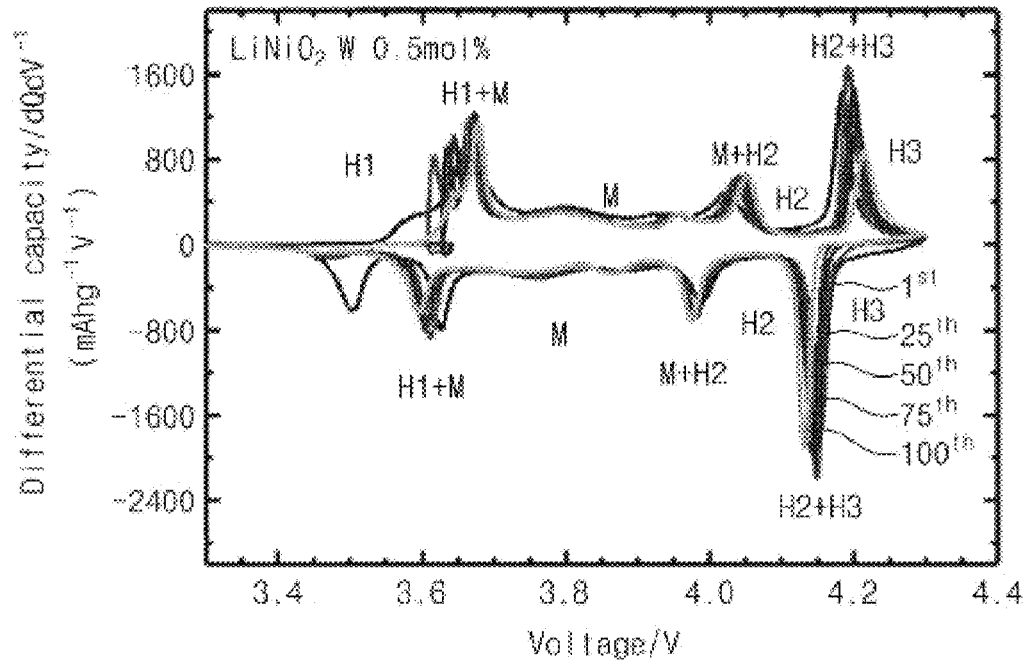

[Fig. 22]
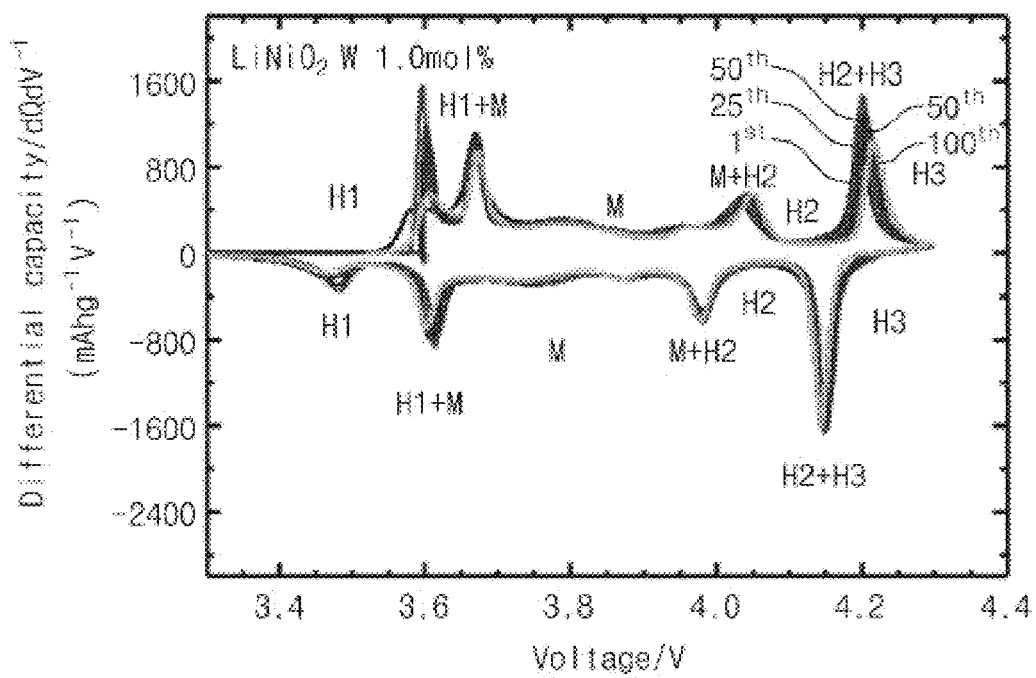
[Fig. 23]
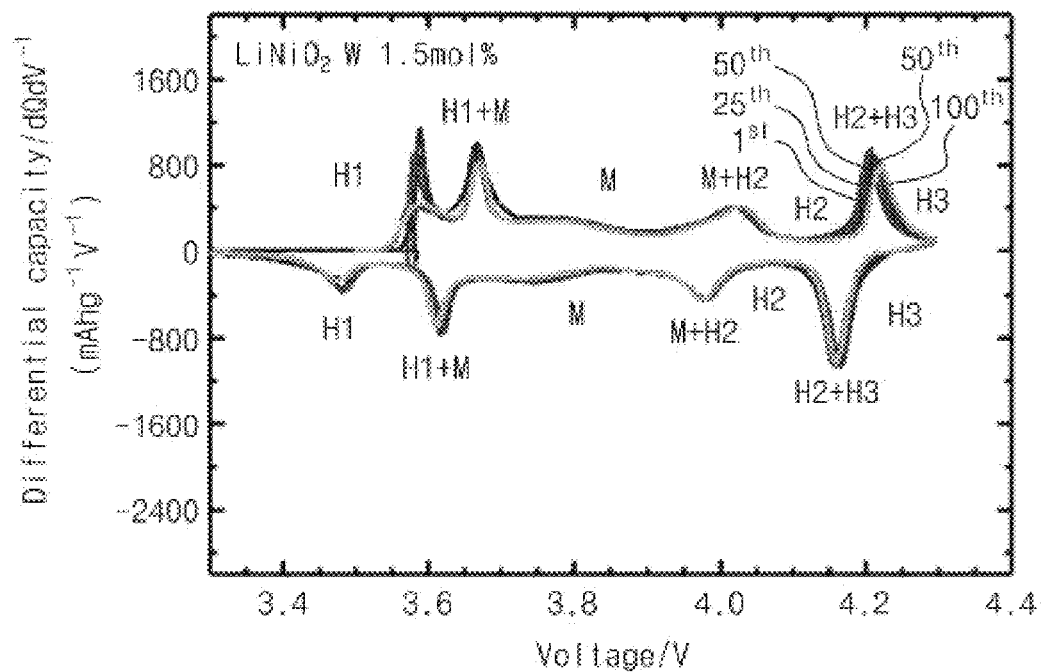

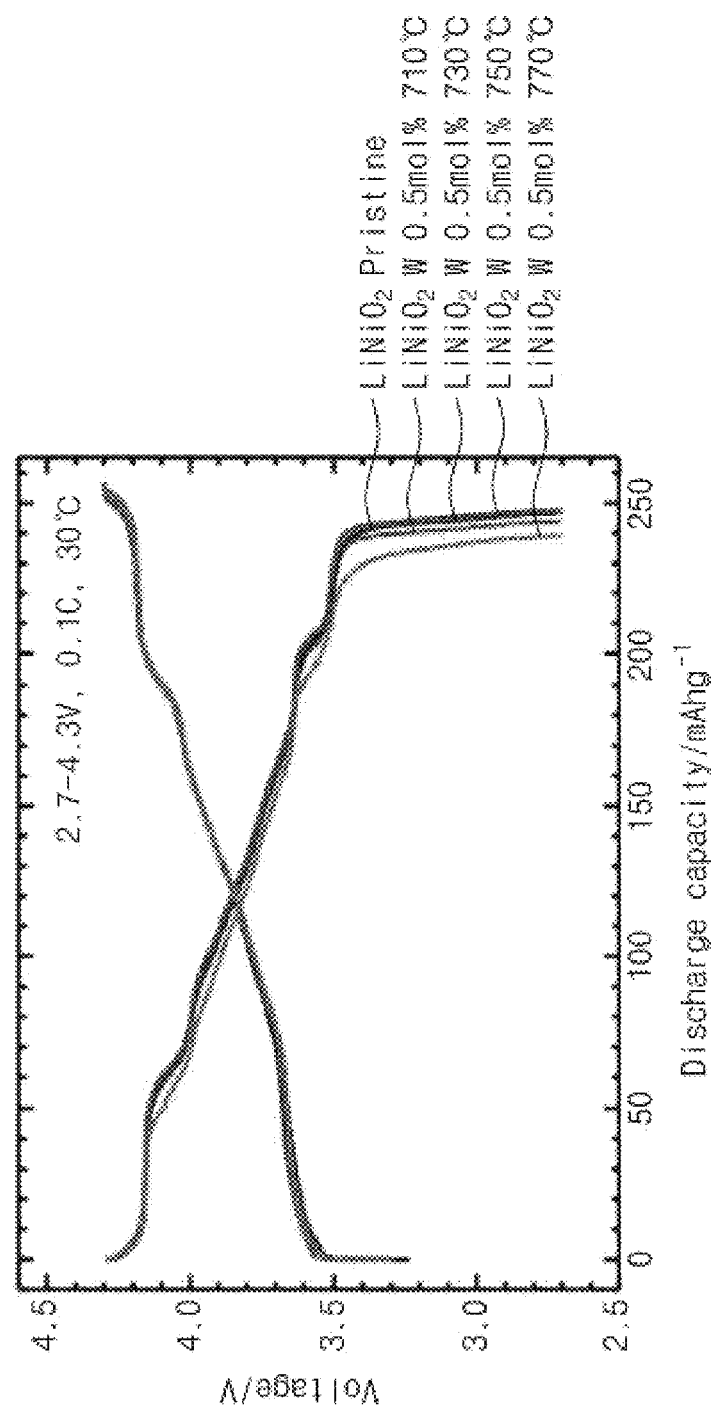
[Fig. 24]

[Fig. 25]
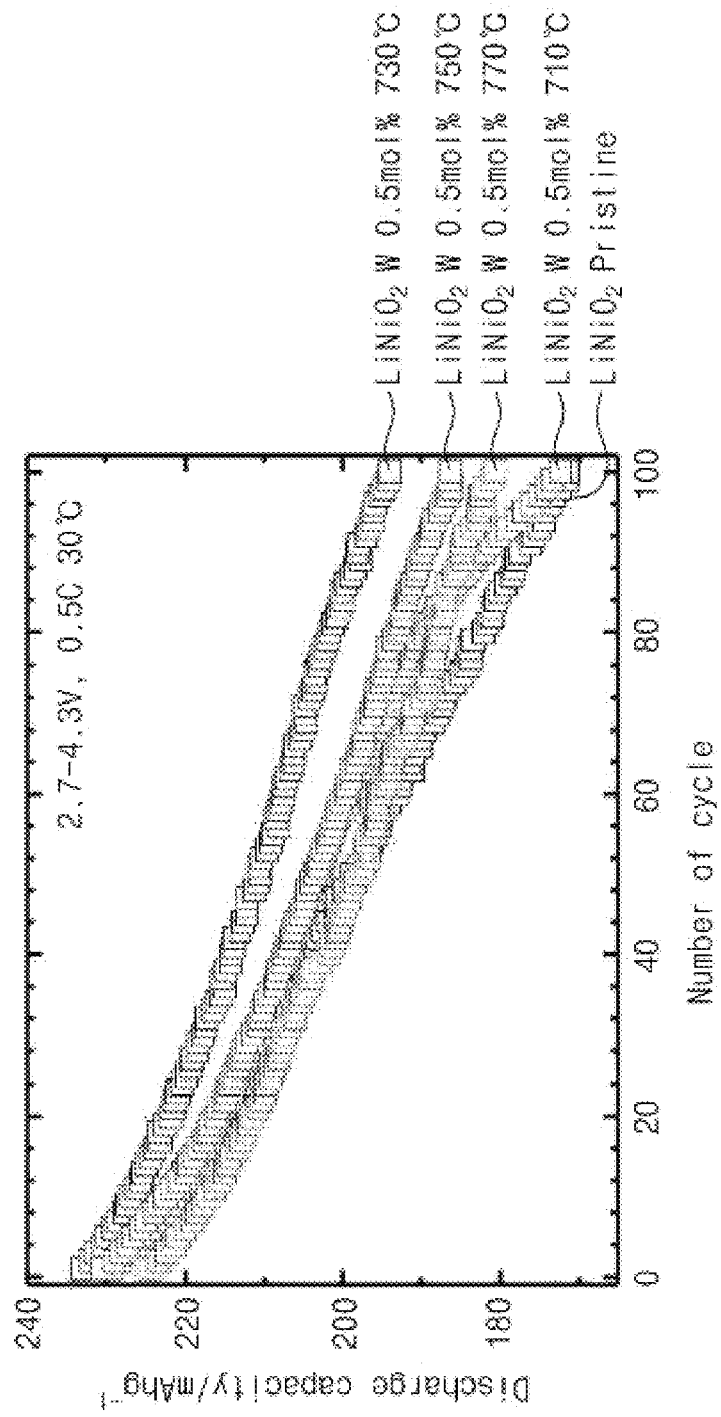

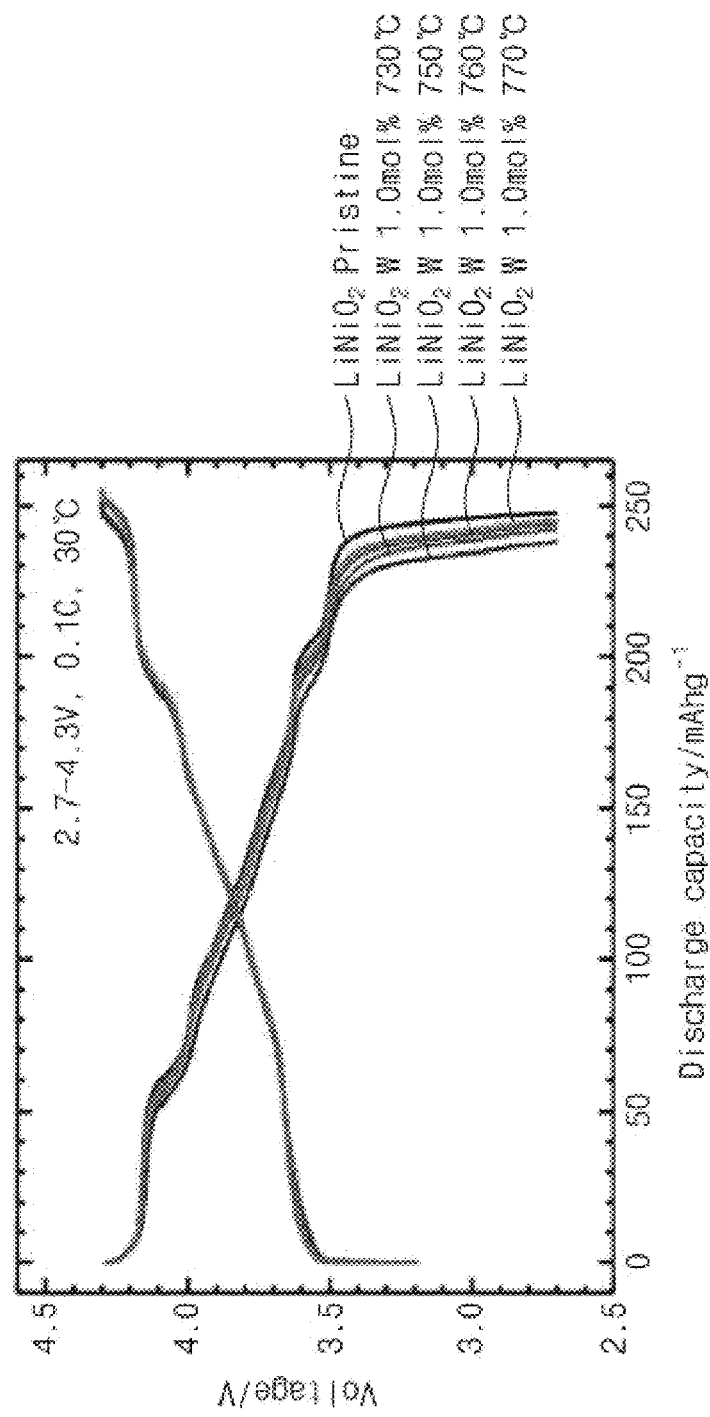
[Fig. 26]

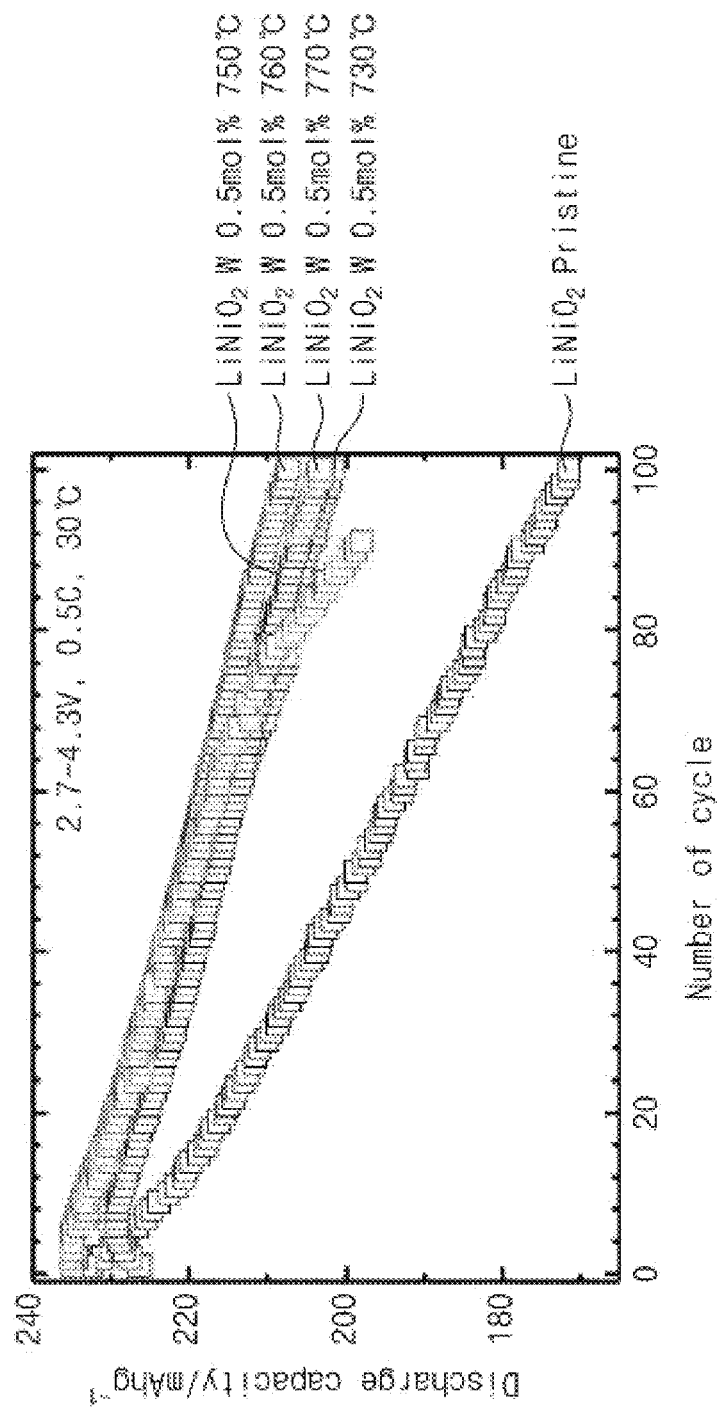
[Fig. 27]

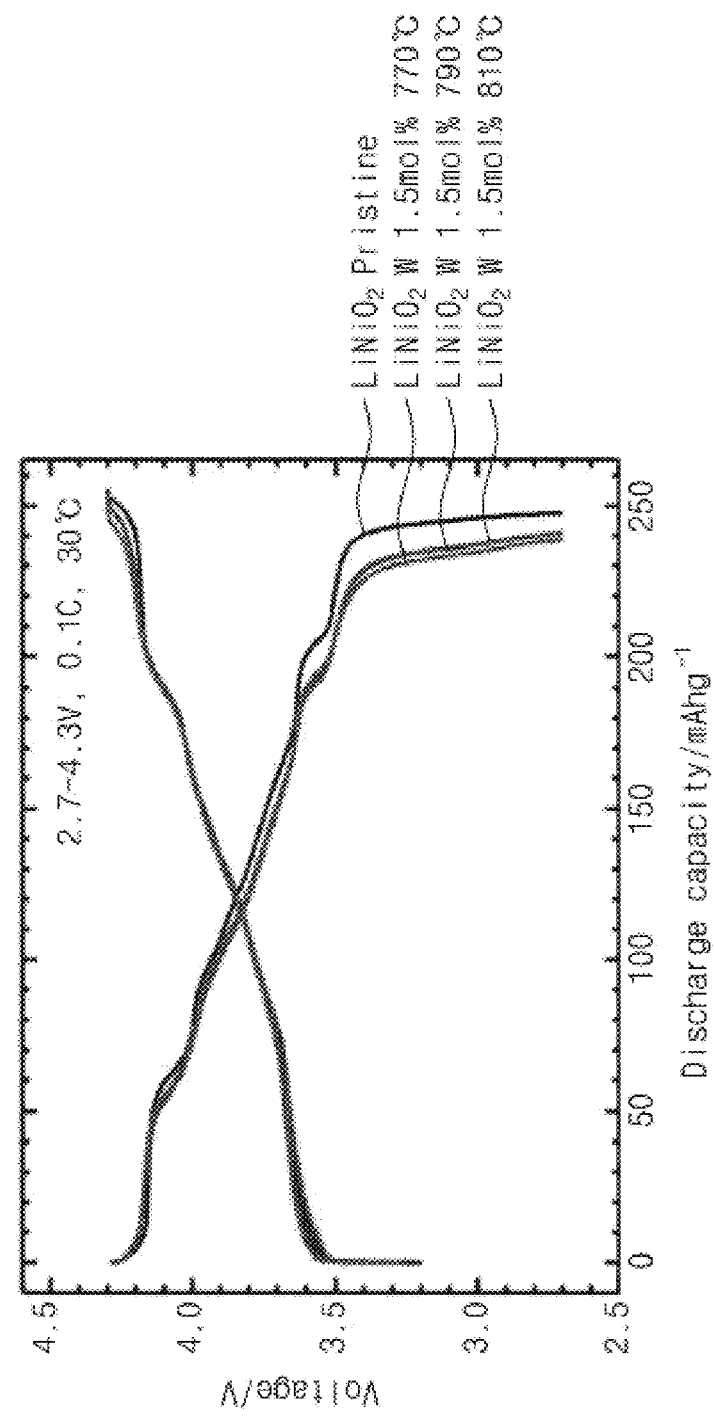
[Fig. 28]

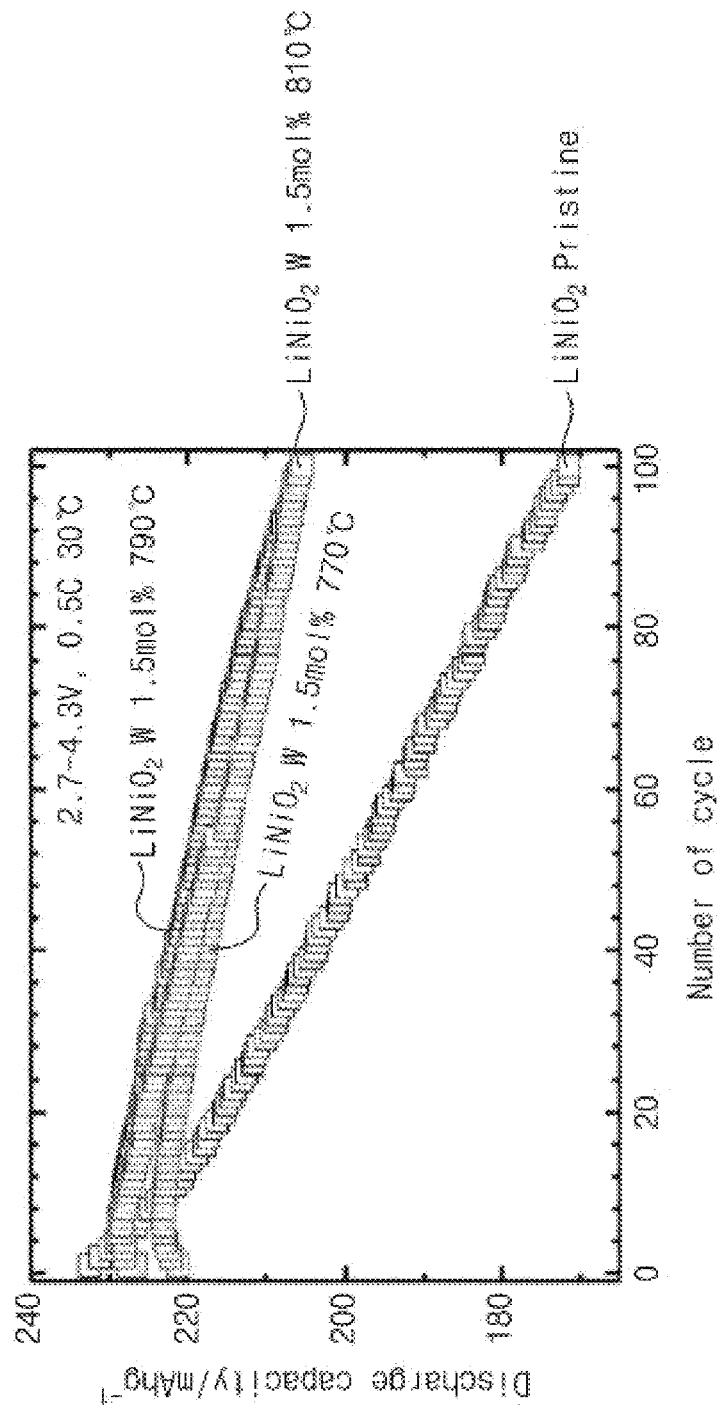
[Fig. 29]

[Fig. 30]
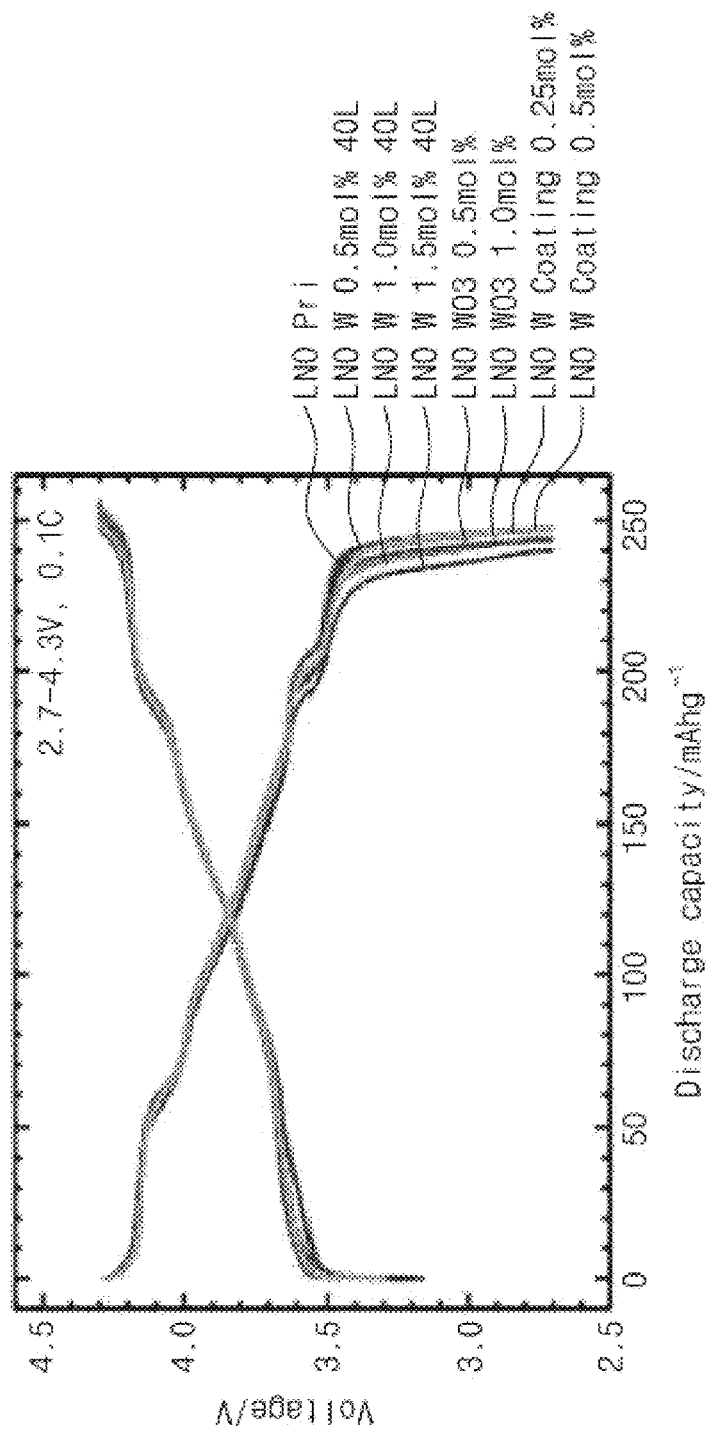

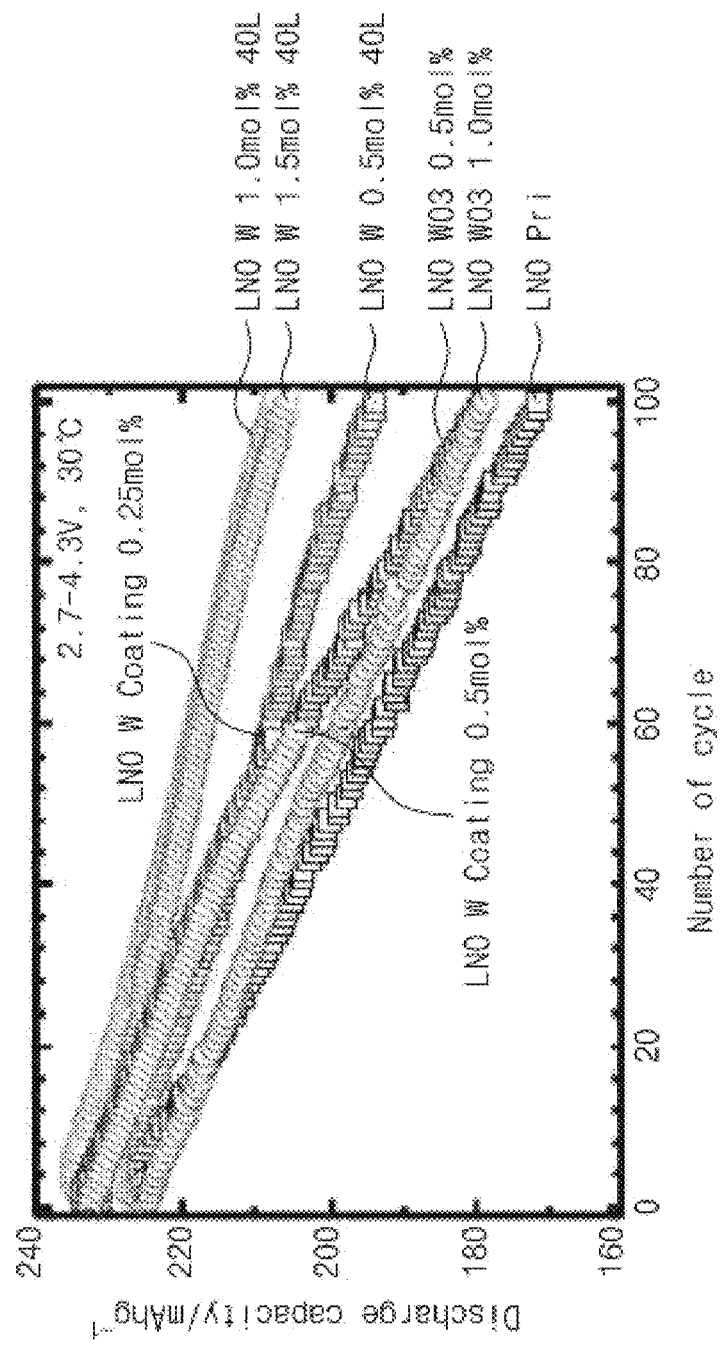
[Fig. 31]

[Fig. 32]
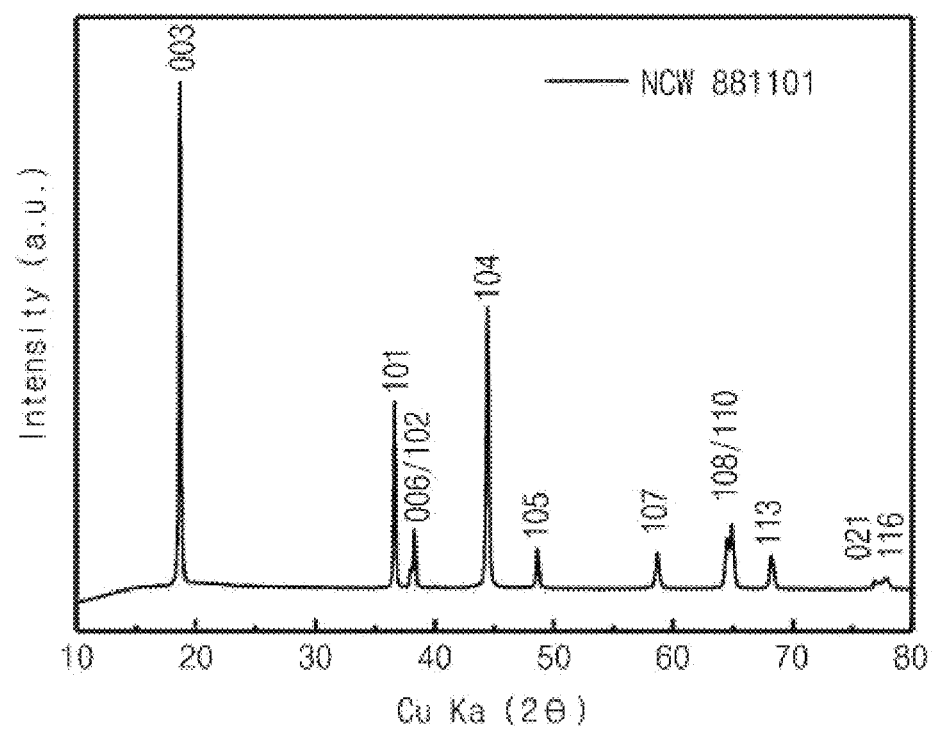

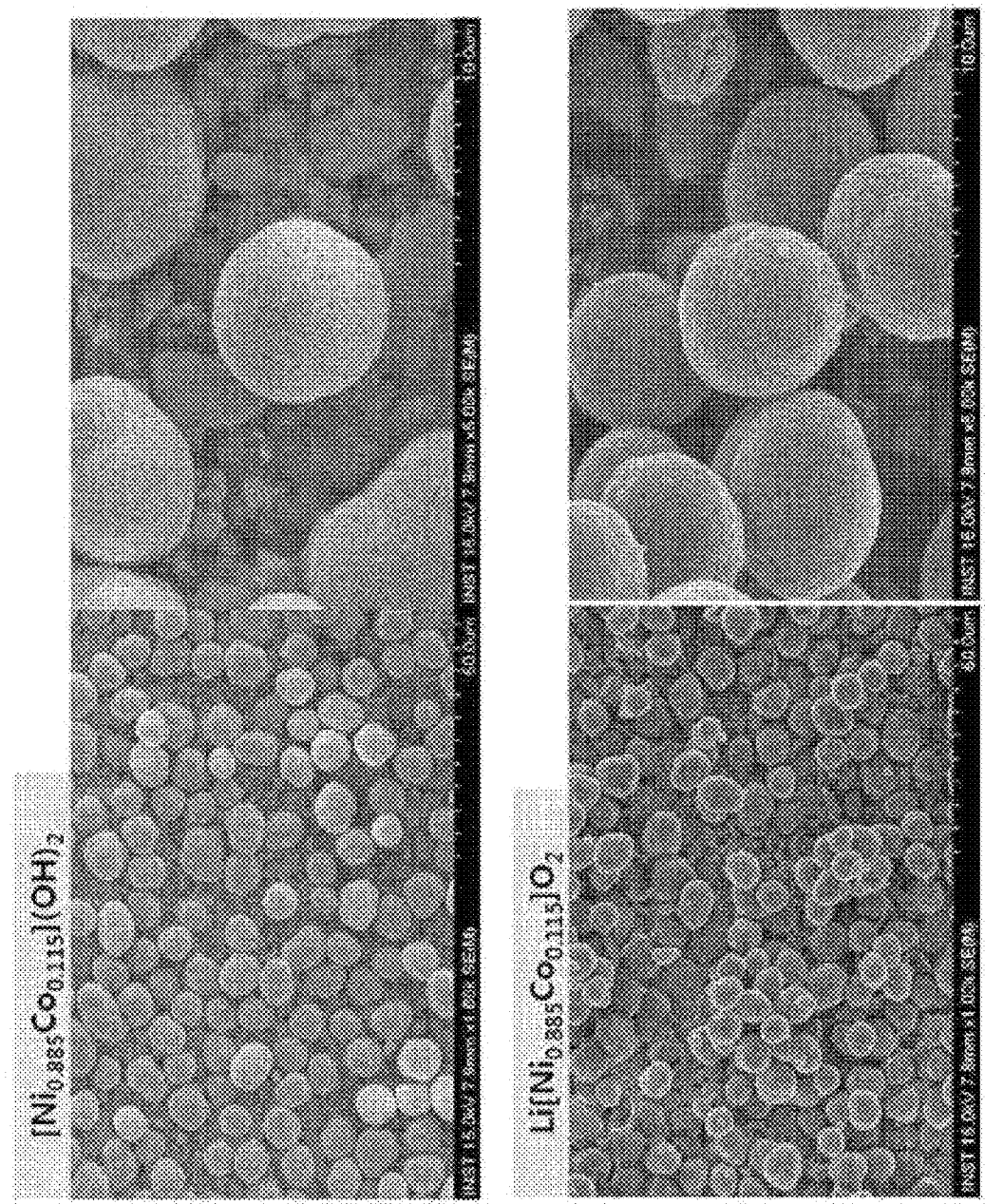
[Fig. 33]

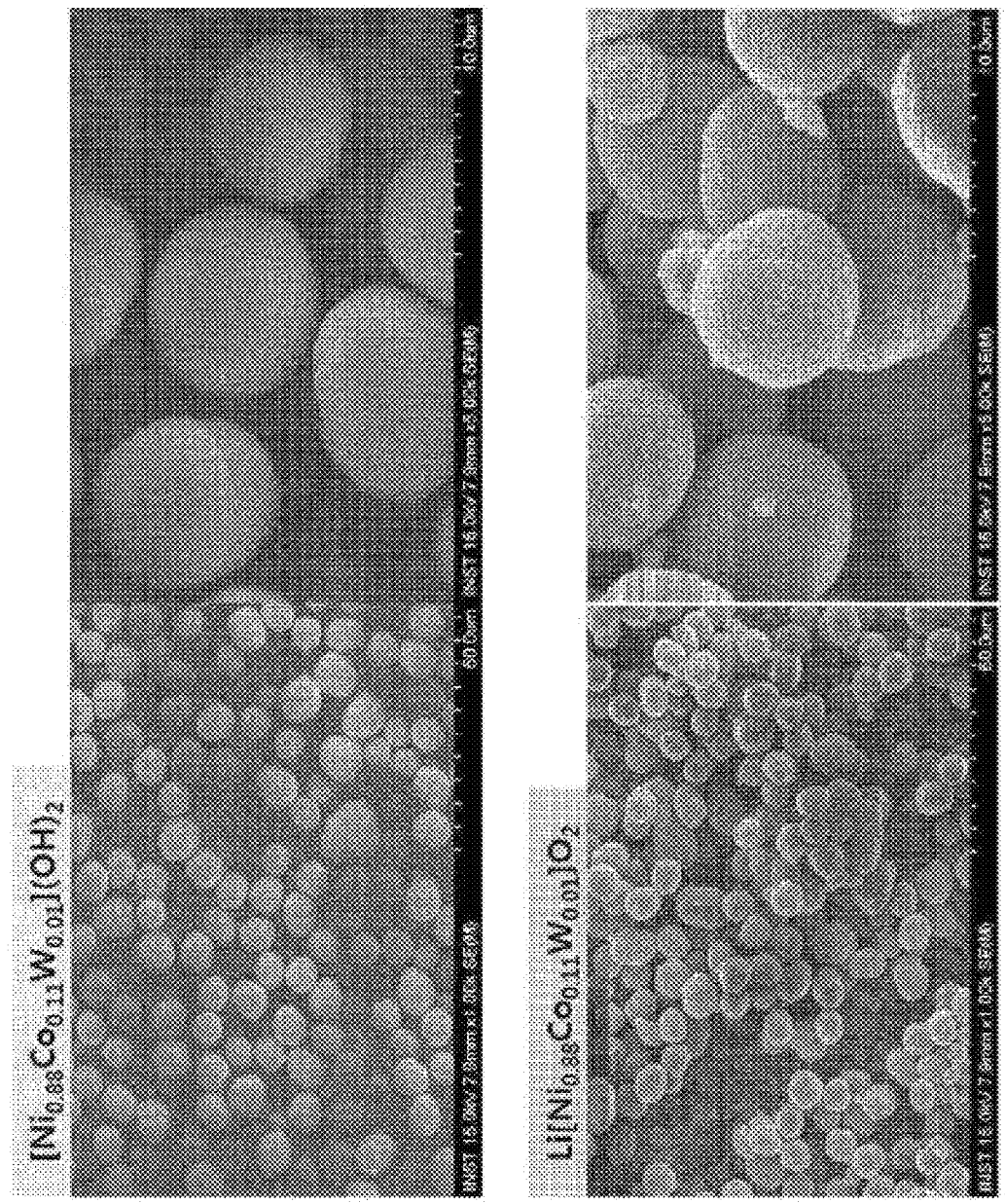
[Fig. 34]

[Fig. 35]
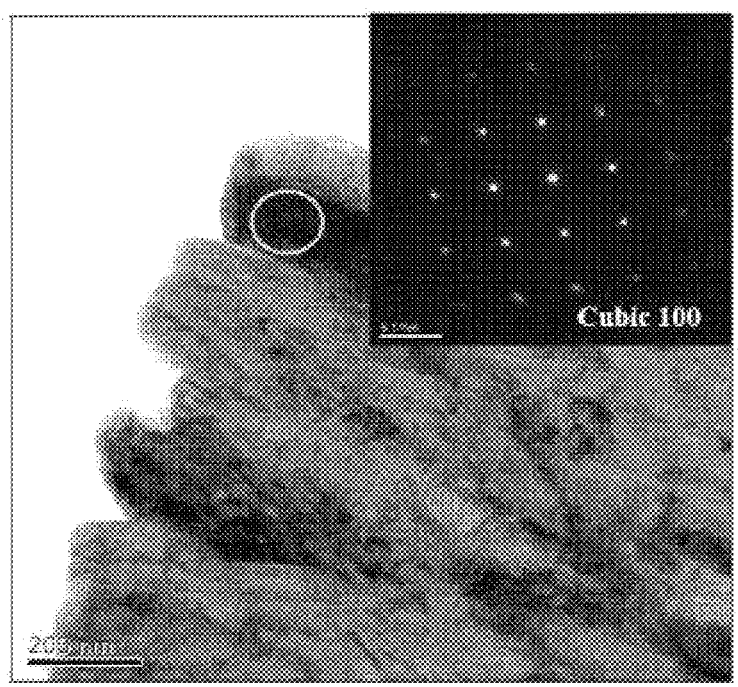
[Fig. 36]
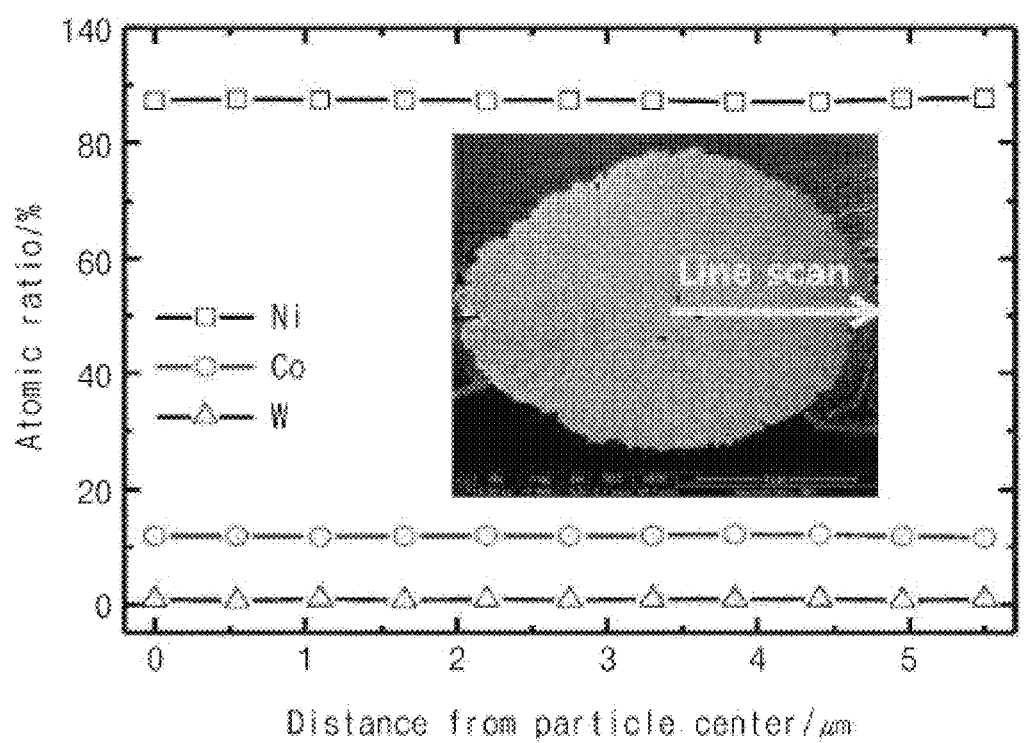

[Fig. 37]
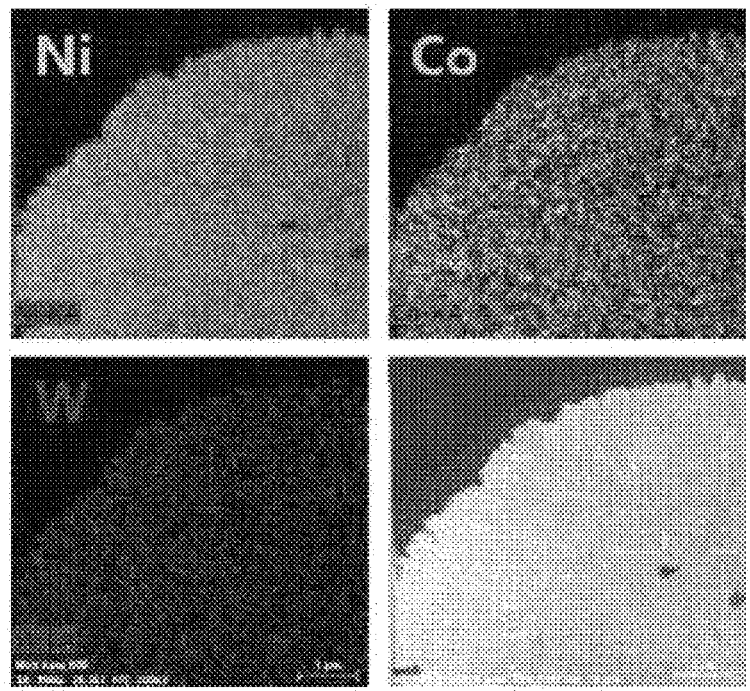
[Fig. 38]
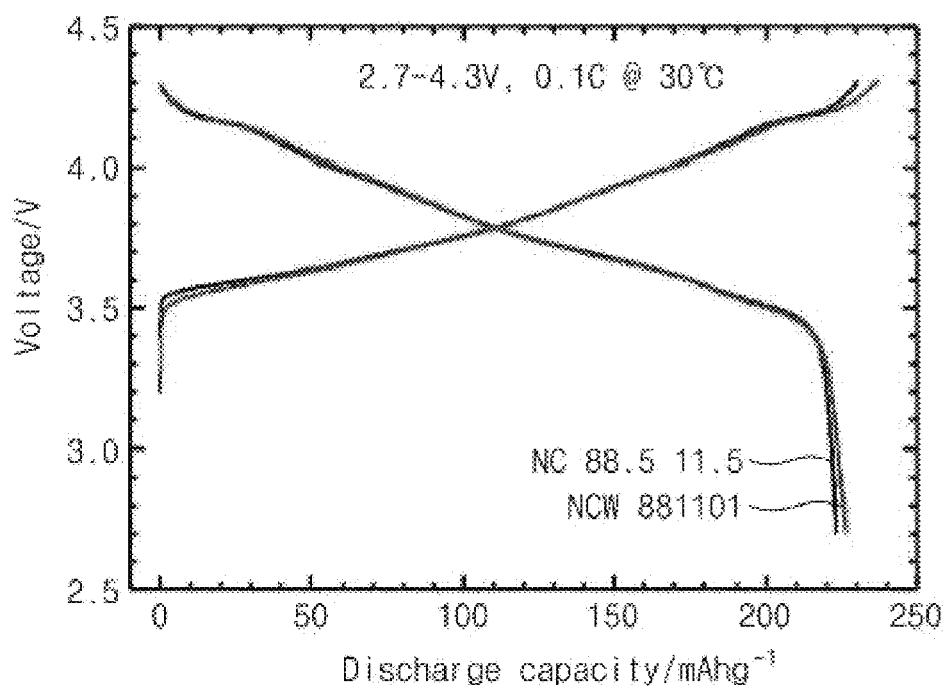

[Fig. 39]
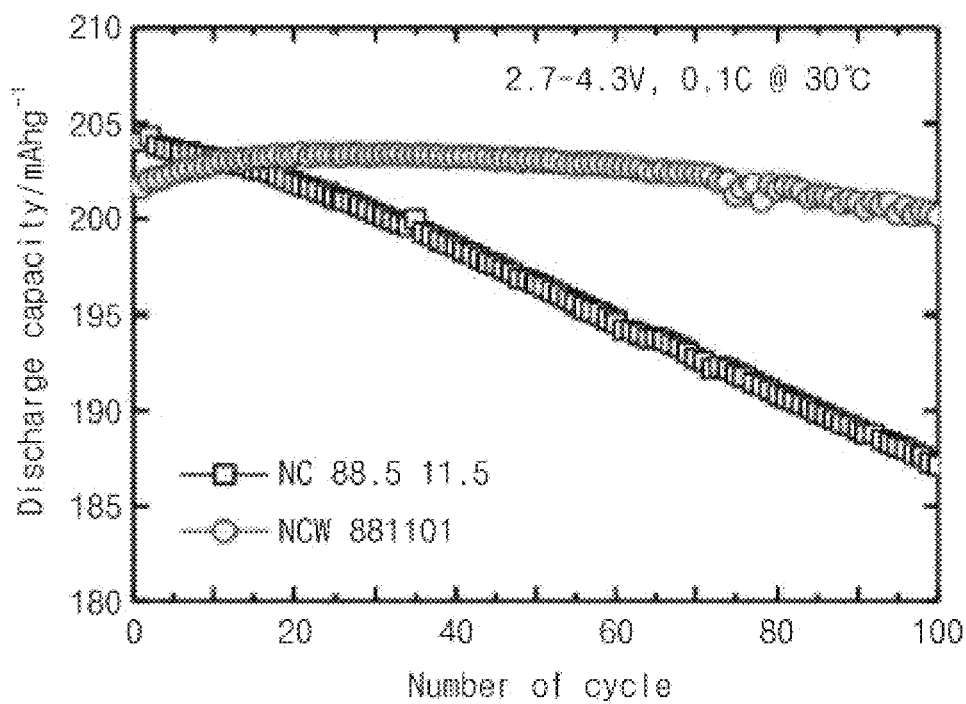

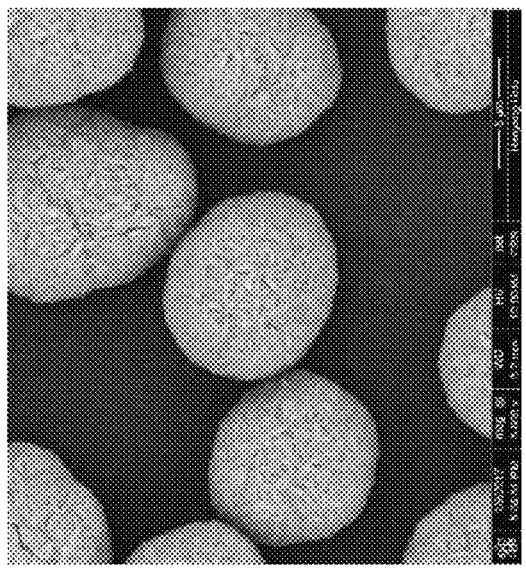
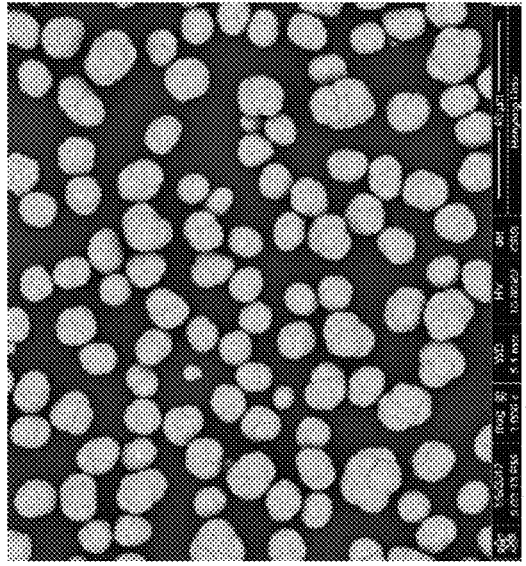
FIG. 41

[Fig. 44]
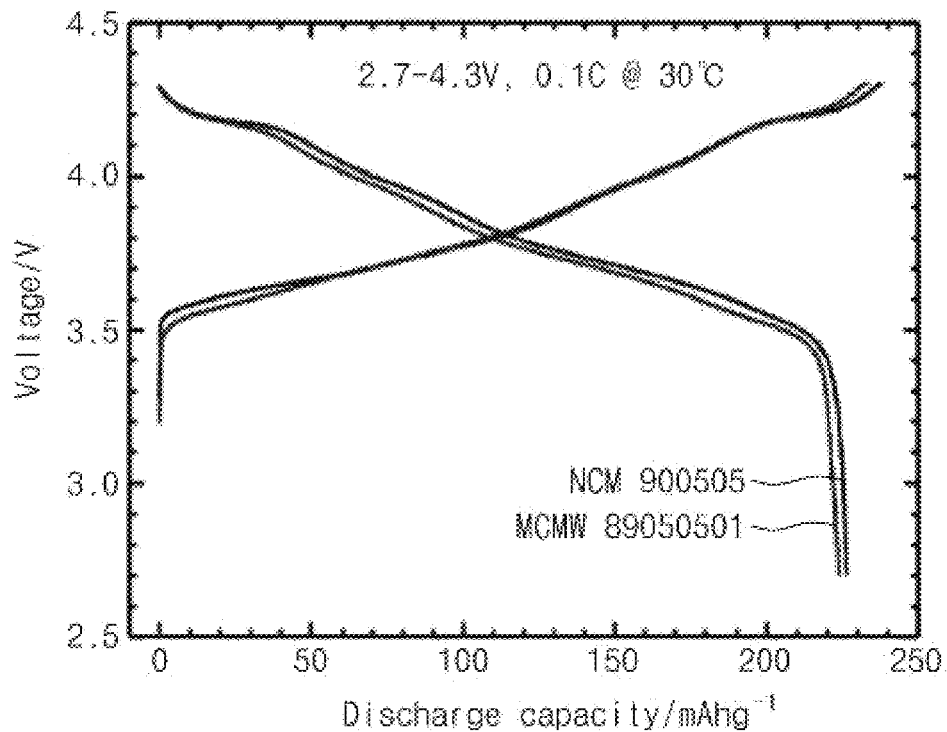
[Fig. 45]
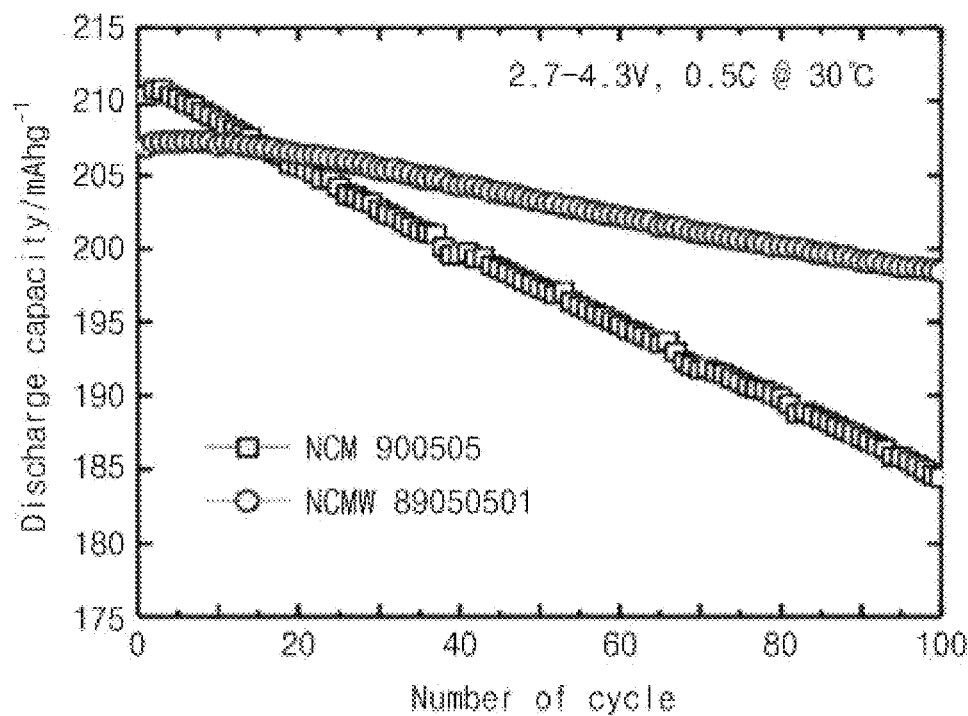

[Fig. 46]
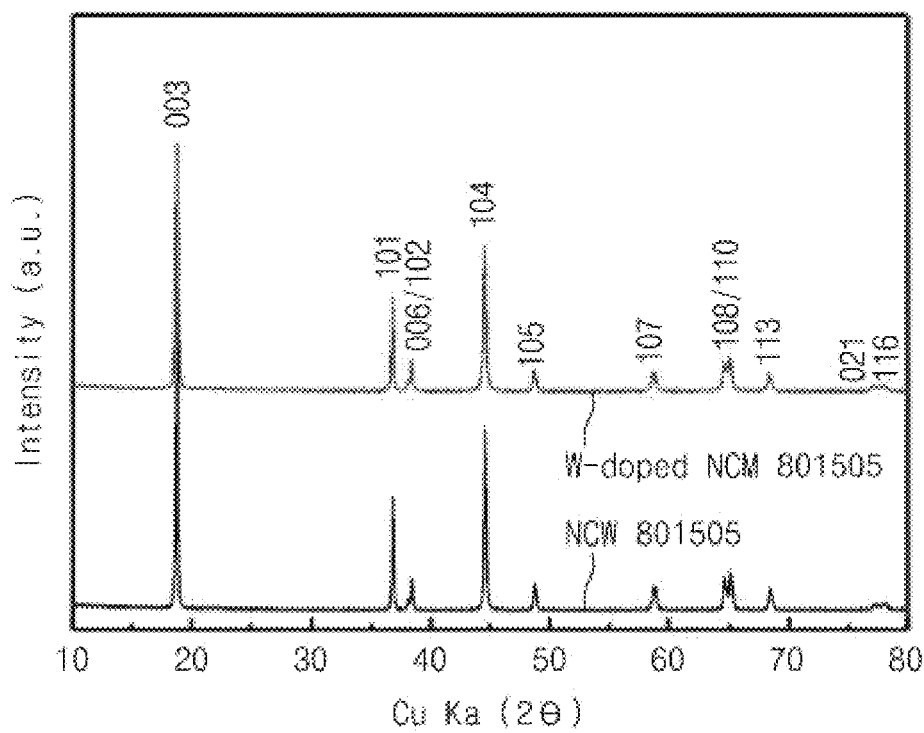
[Fig. 47]
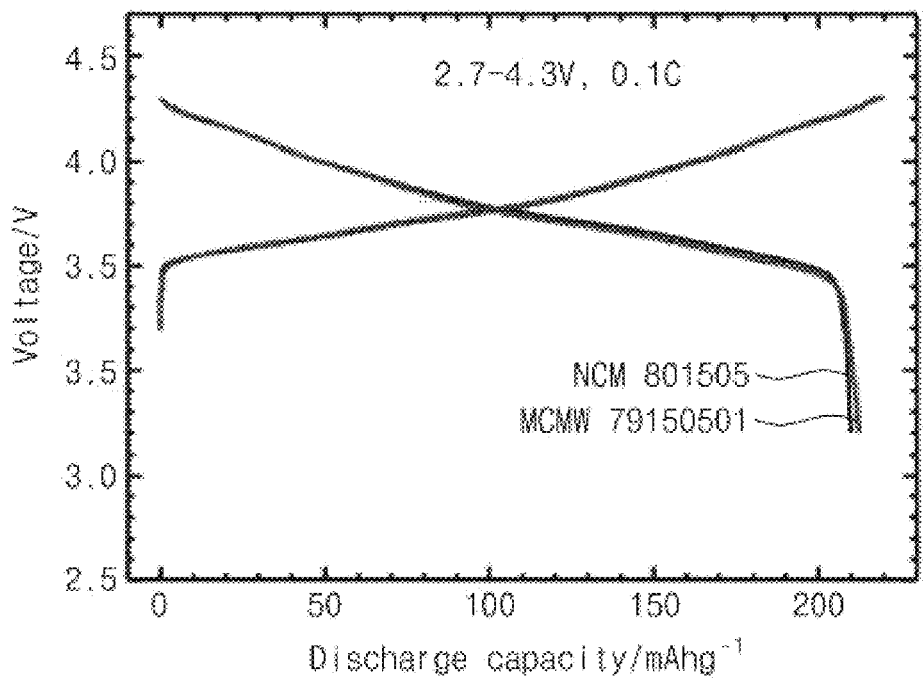

[Fig. 48]
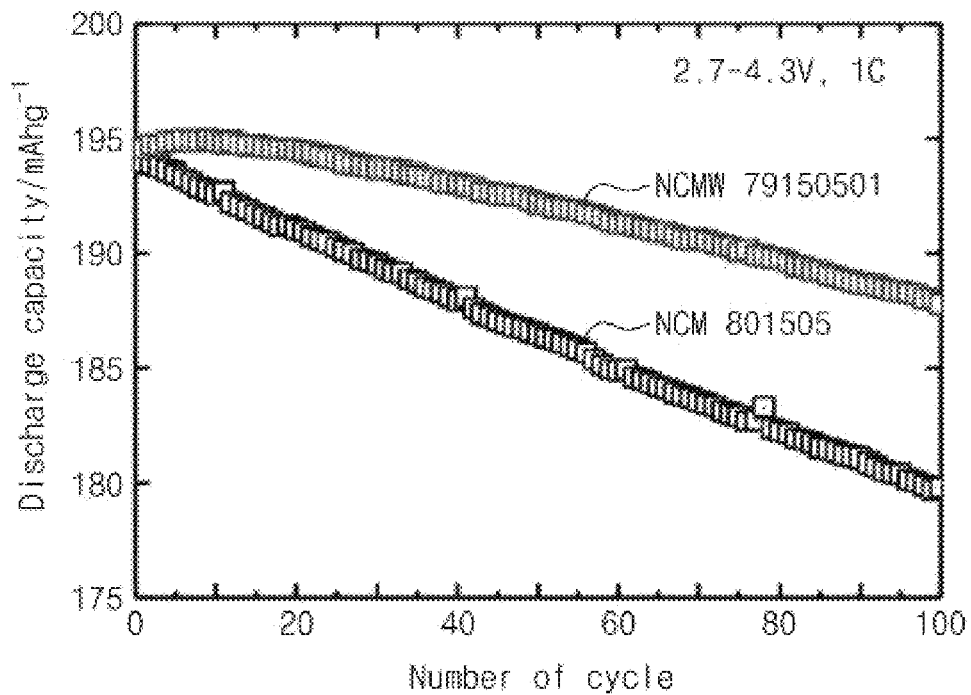
[Fig. 49]
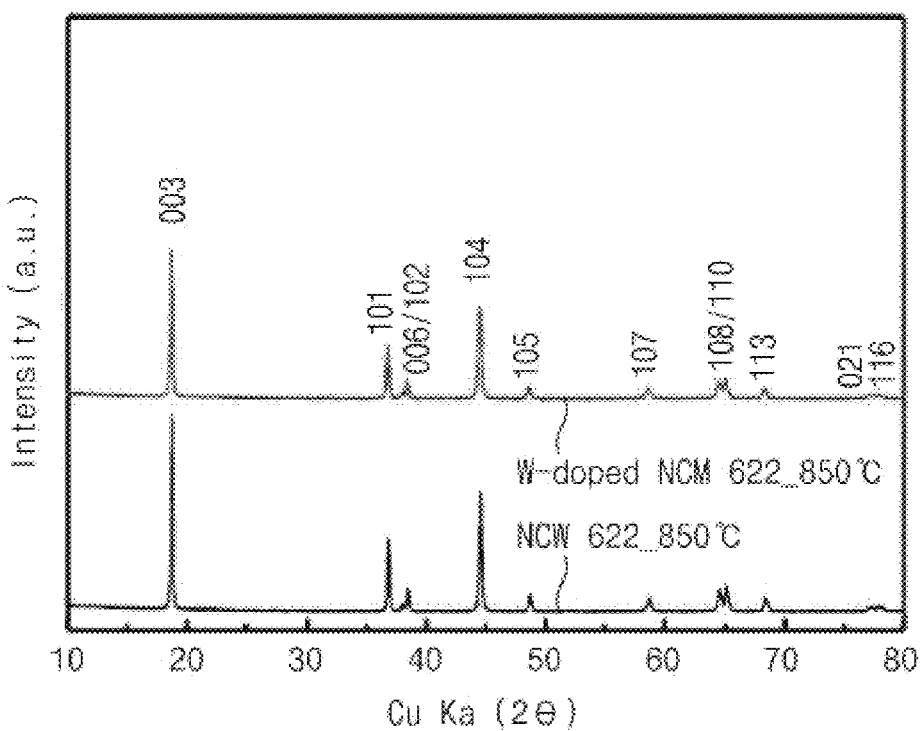

[Fig. 50]
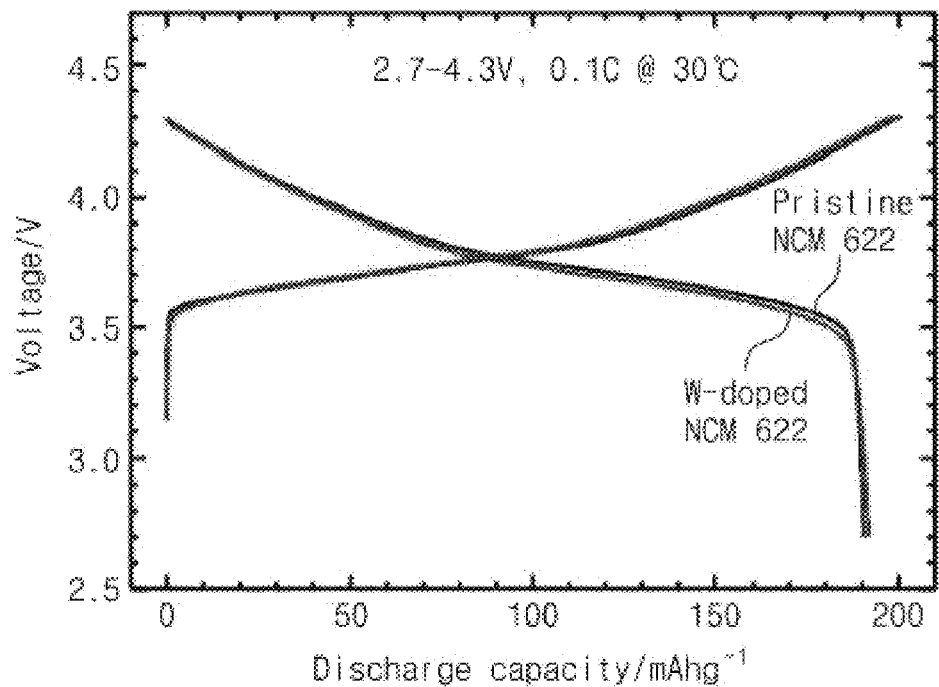
[Fig. 51]
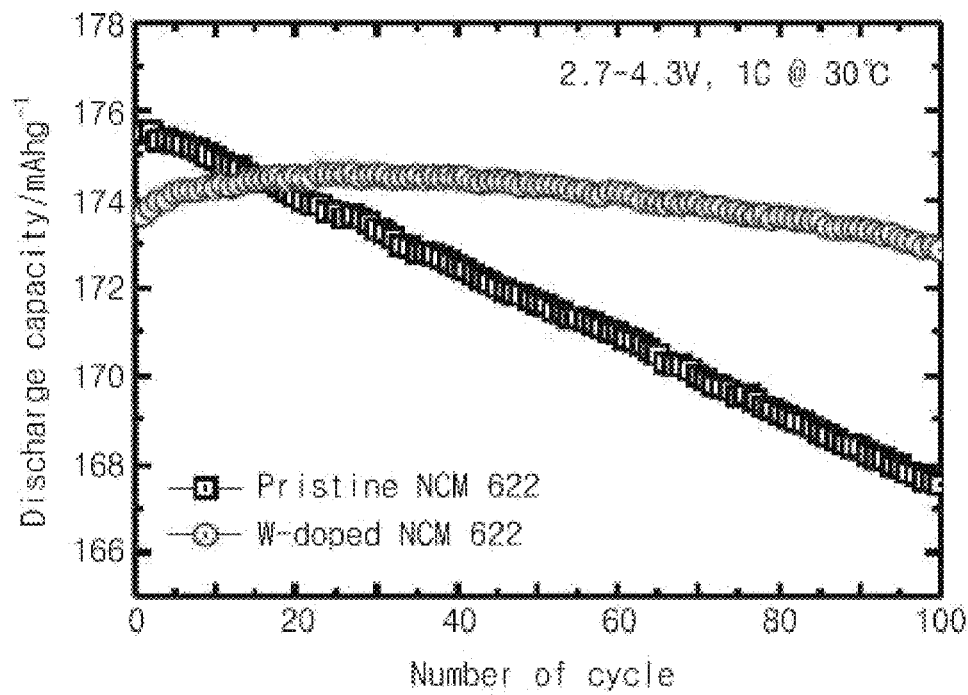

[Fig. 52]
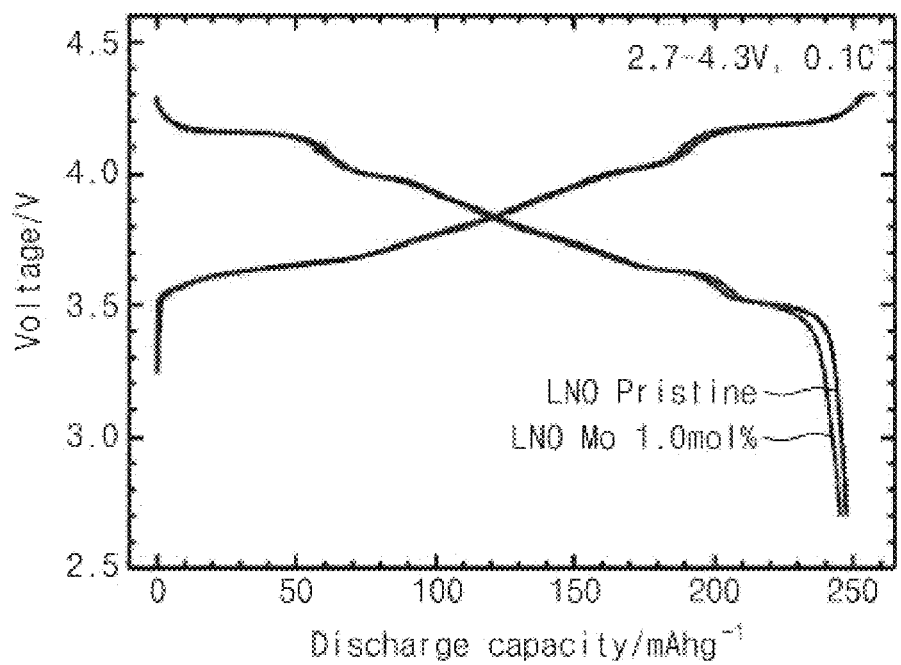
[Fig. 53]
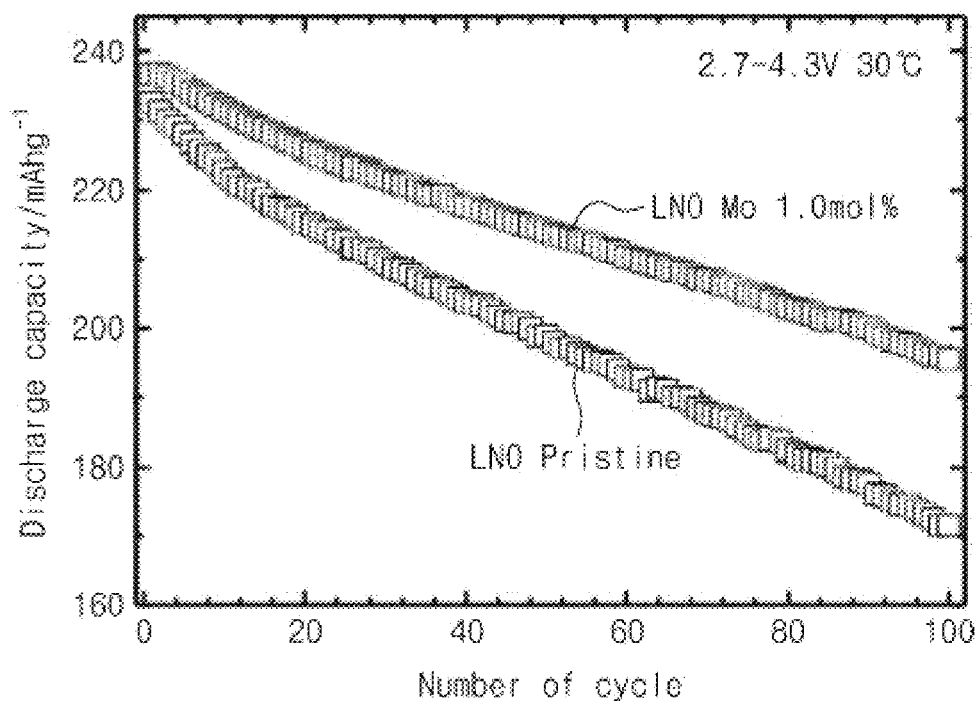

[Fig. 54]
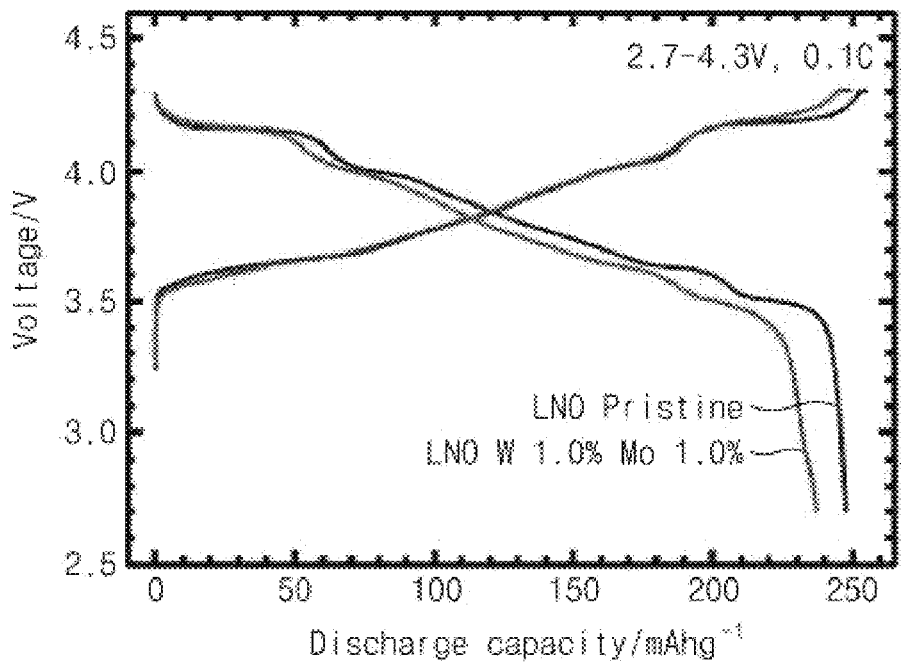
[Fig. 55]
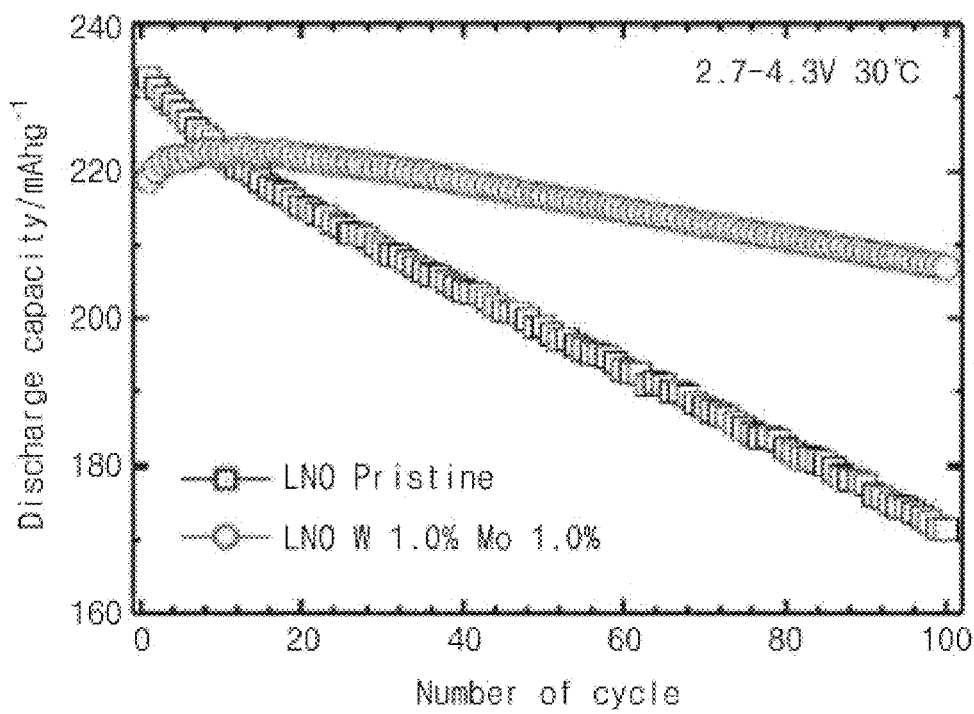

[Fig. 56]
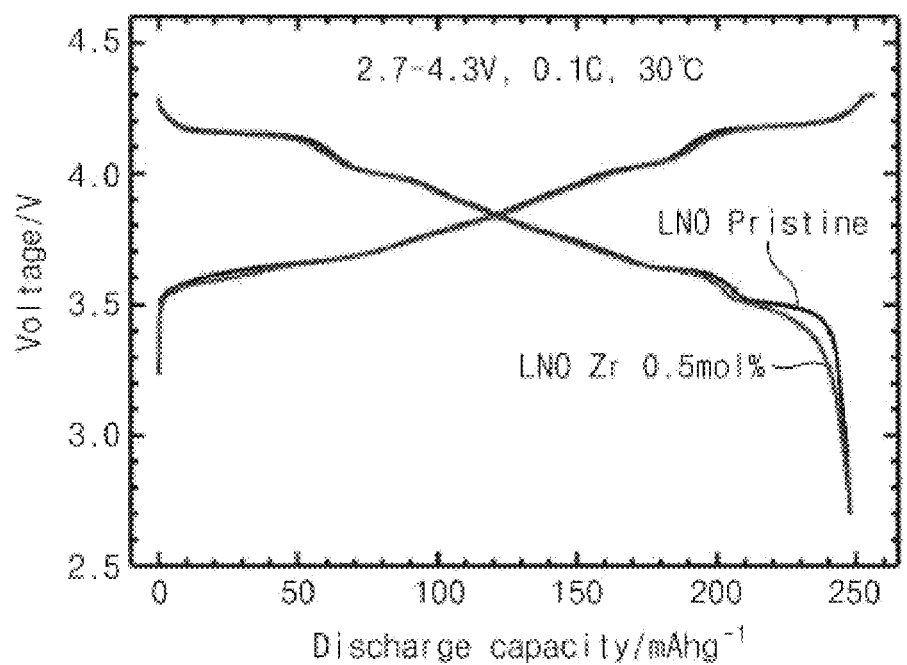
[Fig. 57]
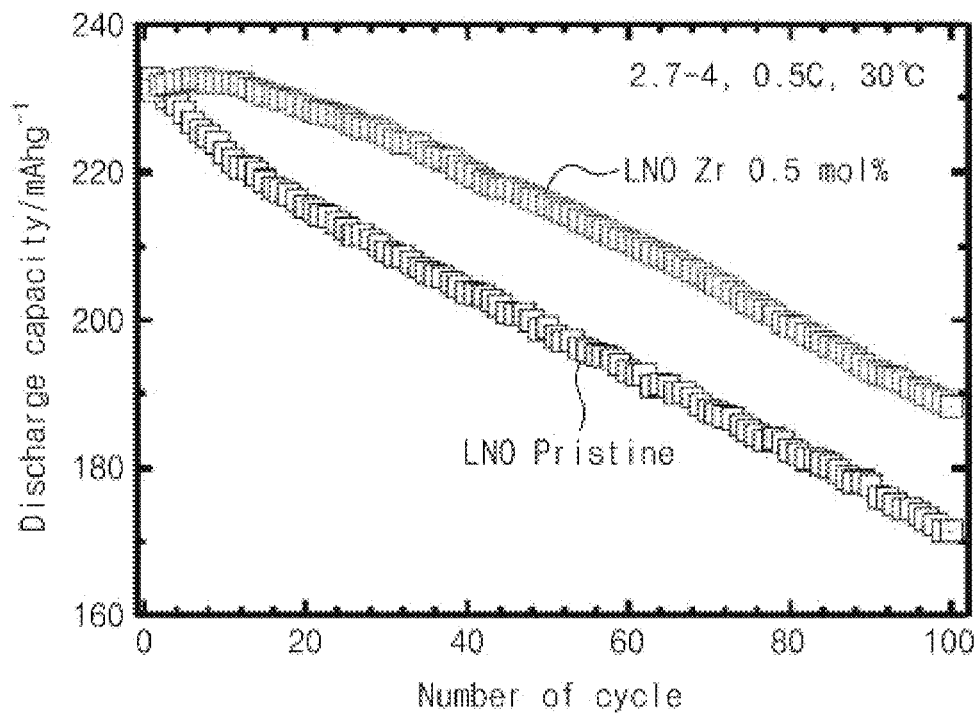

[Fig. 58]
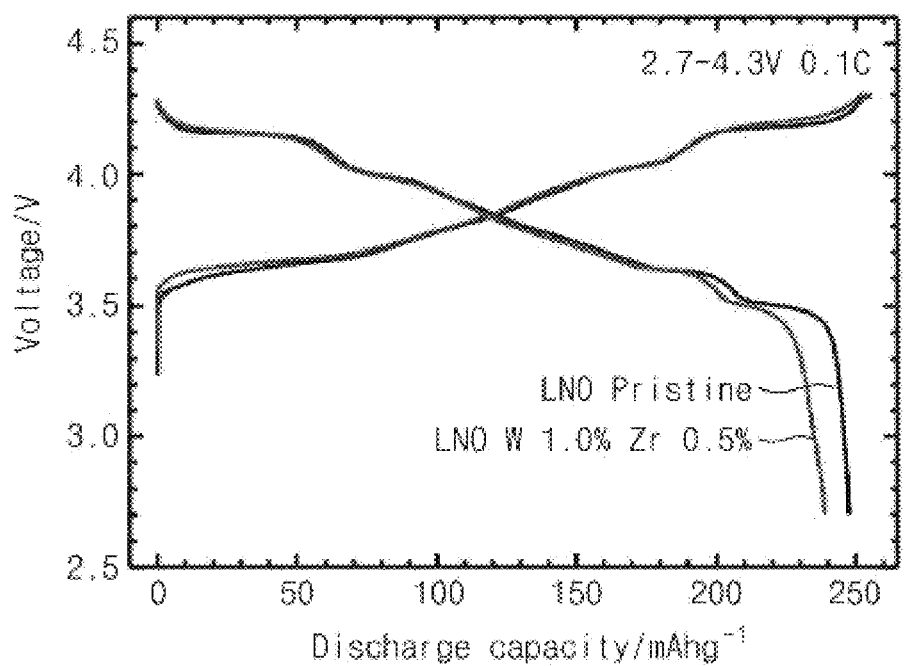
[Fig. 59]
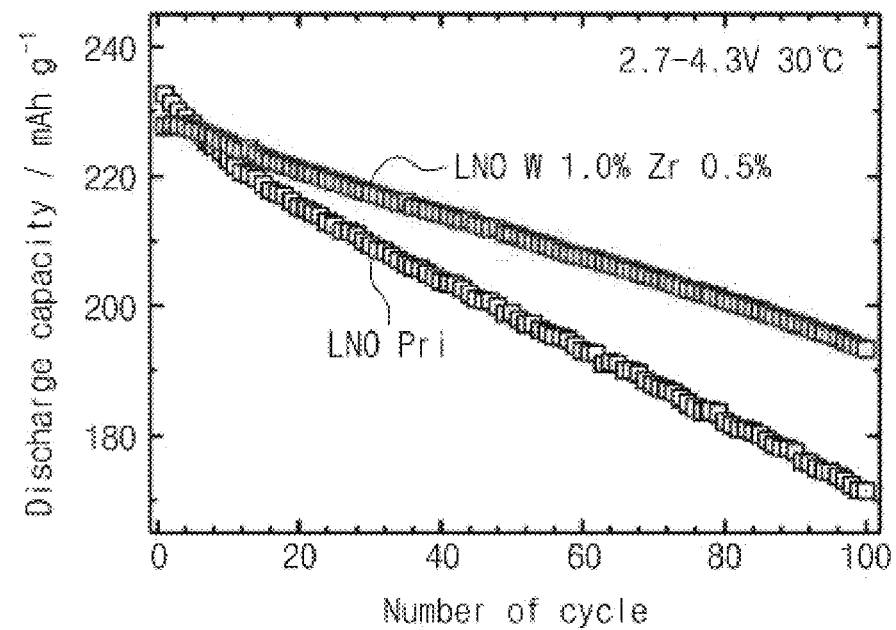

[Fig. 60]
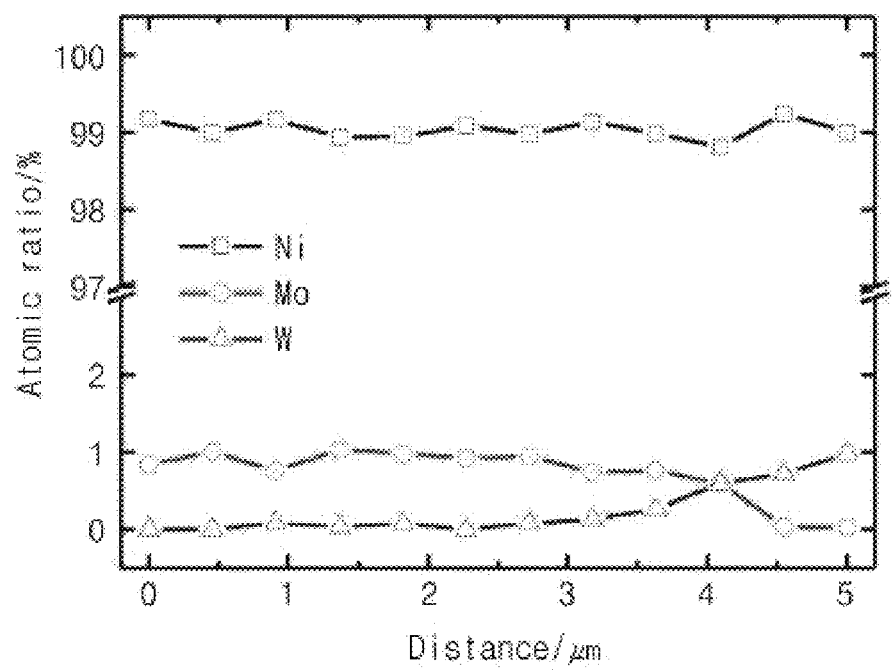
[Fig. 61]
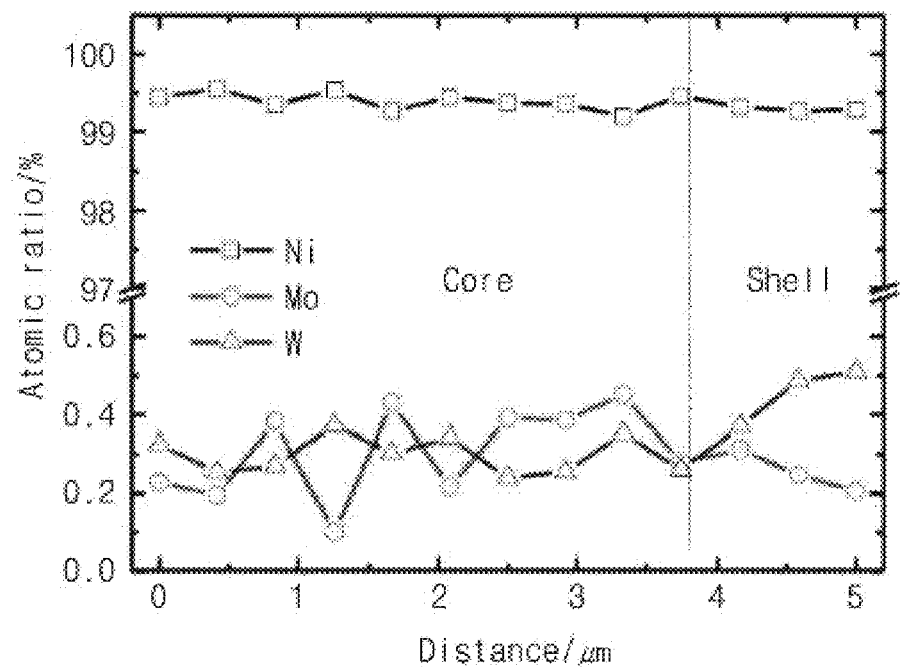

[Fig. 62]
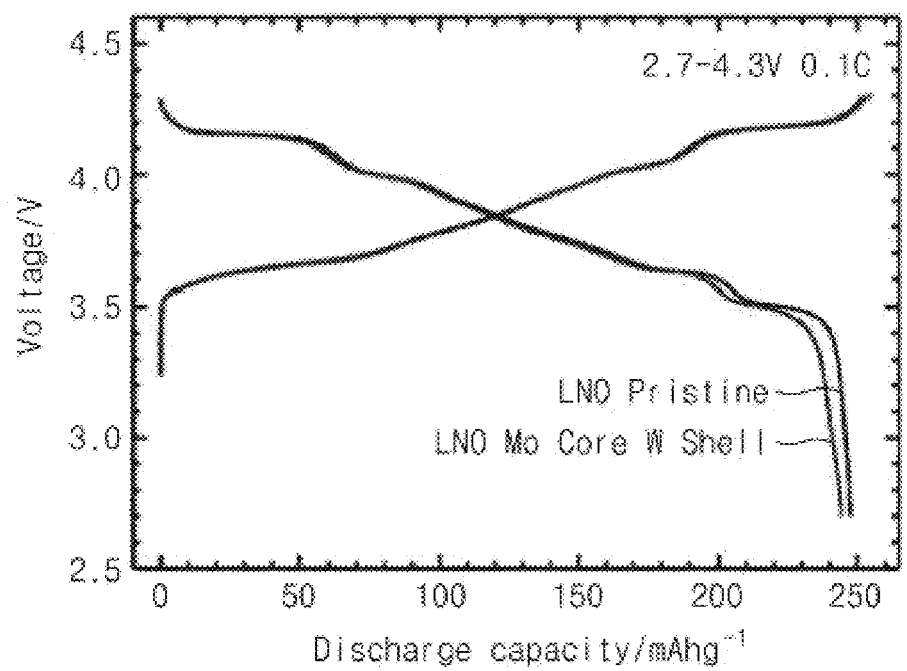
[Fig. 63]
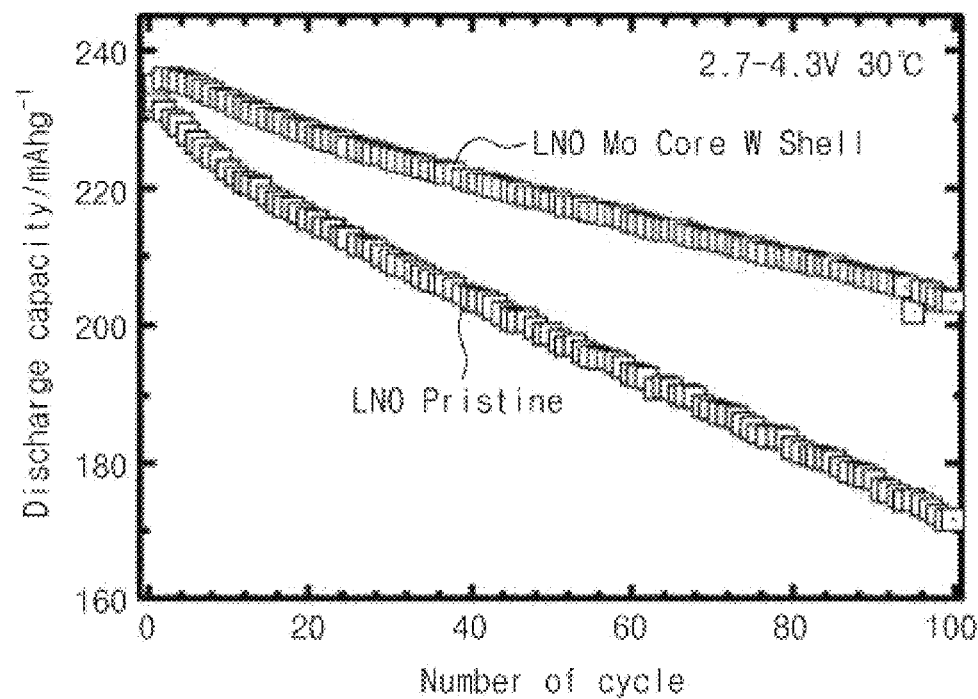

[Fig. 64]
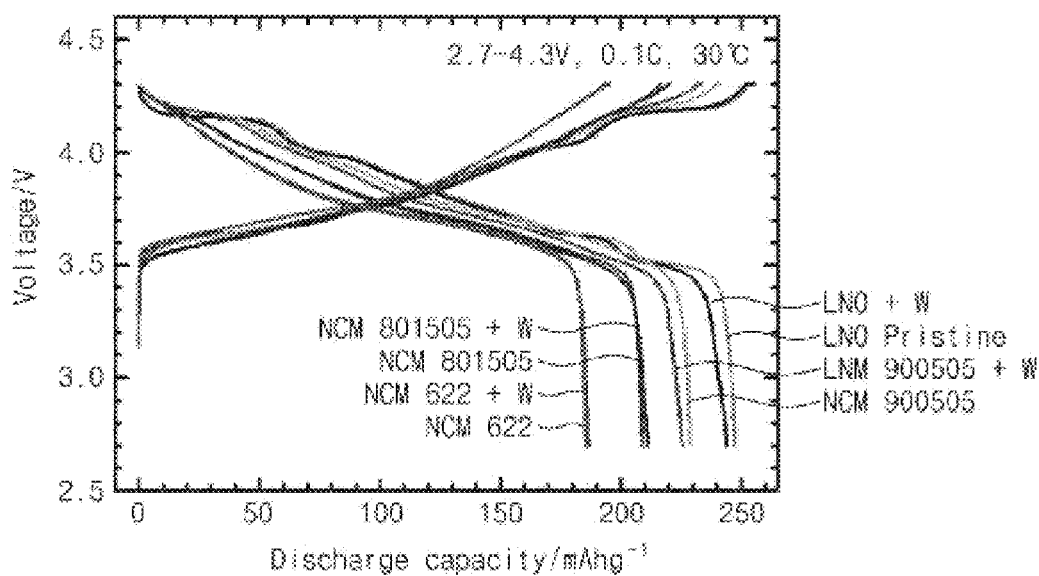
[Fig. 65]
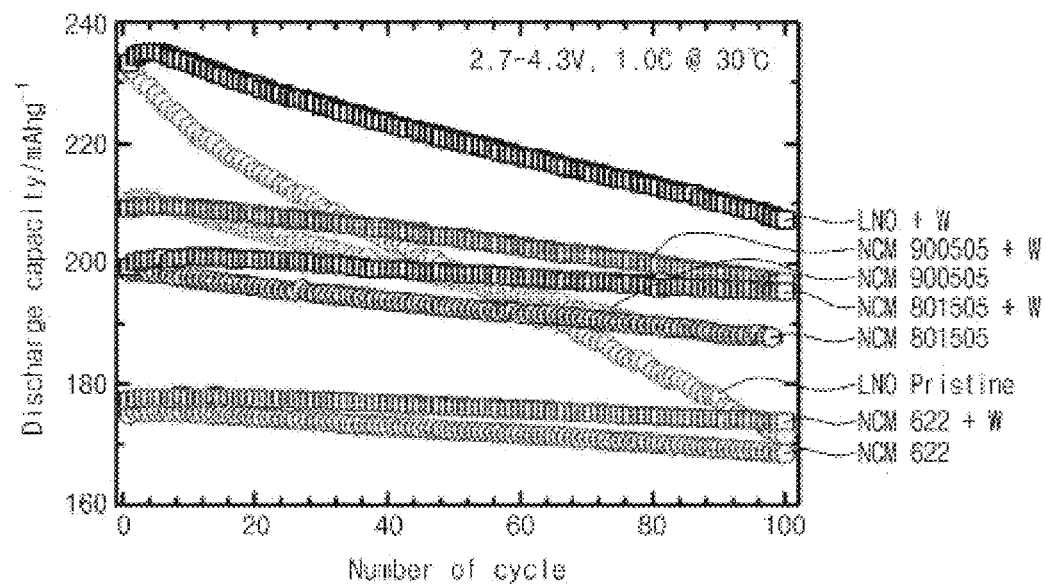

[Fig. 66]
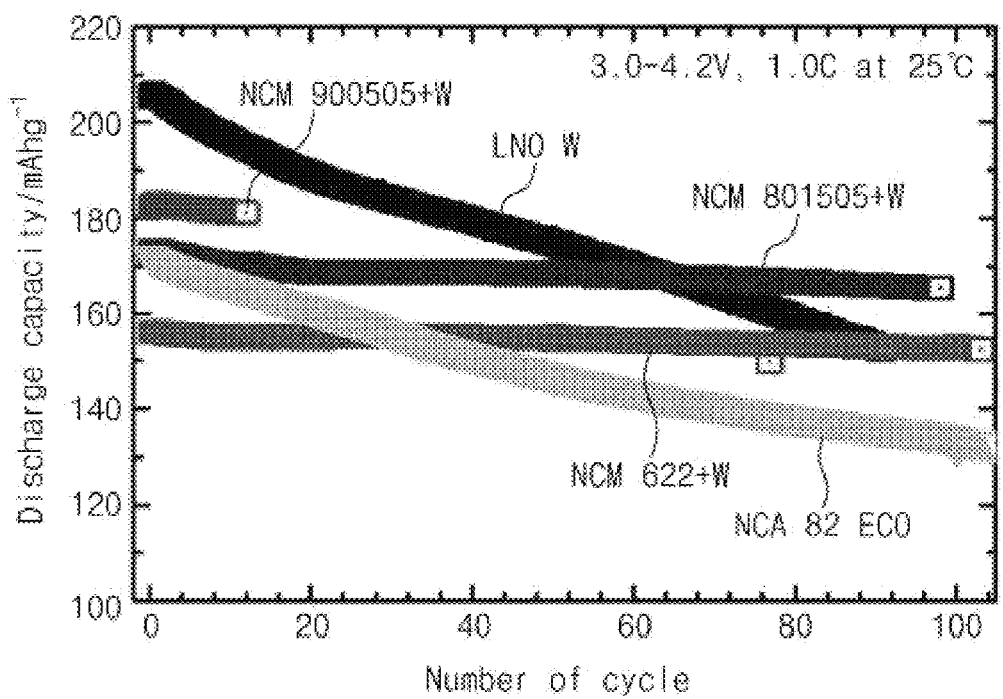

POSITIVE ELECTRODE ACTIVE MATERIAL, METHOD FOR MANUFACTURING SAME, AND LITHIUM SECONDARY BATTERY CONTAINING SAME

CROSS-REFERENCE TO RELATED APPLICATION

This application is a continuation of pending International Application No. PCT/KR2017/002697, which was filed on Mar. 13, 2017 and claims priority to Korean Patent Application Nos. 10-2016-0043718 and 10-2017-0021889, filed on Apr. 8, 2016 and Feb. 17, 2017, in the Korean Intellectual Property Office, the disclosures of which are hereby incorporated by reference in their entireties.

BACKGROUND

1. Field

The present disclosure herein relates to a positive active material, a method of fabricating the same, and a lithium secondary battery including the same.

2. Description of the Related Art

Secondary batteries capable of storing electrical energy have been increasingly demanded with the development of portable mobile electronic devices such as smart phones, MP3 players, and tablet personal computers. In particular, lithium secondary batteries have been increasingly demanded with the development of electric cars, medium and large energy storage systems, and portable devices requiring a high energy density.

Positive active materials used in the lithium secondary batteries have been studied due to the increase in demand for the lithium secondary batteries. For example, Korean Patent Publication No. 10-2014-0119621 (Application No. 10-2013-0150315) discloses a secondary battery manufactured using a precursor for fabricating a lithium-rich positive active material, which is represented by $Ni\alpha Mn\beta Co\gamma\delta A\delta CO3$, where 'A' is one or two or more selected from a group consisting of B, Al, Ga, Ti, and In, '$\alpha$' ranges from 0.05 to 0.4, '$\beta$' ranges from 0.5 to 0.8, '$\gamma$' ranges from 0 to 0.4, and '$\delta$' ranges from 0.001 to 0.1. In this Korean Patent Publication, the secondary battery may have a high-voltage capacity and long life characteristics by adjusting a kind and a composition of a metal substituted in the precursor and by adjusting a kind and the amount of an added metal.

SUMMARY

The present disclosure may provide a highly reliable positive active material, a method of fabricating the same, and a lithium secondary battery including the same.

The present disclosure may also provide a high-capacity positive active material, a method of fabricating the same, and a lithium secondary battery including the same.

The present disclosure may further provide a long-life positive active material, a method of fabricating the same, and a lithium secondary battery including the same.

The present disclosure may further provide a positive active material with improved thermal stability, a method of fabricating the same, and a lithium secondary battery including the same.

In an aspect, a positive active material may include lithium, an additive metal, and at least one of nickel, cobalt, manganese, or aluminum. The additive metal may include an element different from nickel, cobalt, manganese, and aluminum. An average content of the additive metal may be less than 2 mol %.

In an embodiment, the additive metal may have a substantially constant concentration in a whole of a particle.

In an embodiment, the positive active material may include a first crystal structure and a second crystal structure, which have different crystal systems from each other.

In an embodiment, ratios of the first crystal structure and the second crystal structure may be adjusted depending on the content of the additive metal.

In an embodiment, the first crystal structure may be a cubic crystal structure, and the second crystal structure may be a trigonal or rhombohedral crystal structure. The ratio of the first crystal structure may increase as the content of the additive metal increases.

In an embodiment, a ratio of the first crystal structure may be higher than a ratio of the second crystal structure in a surface portion of a particle, and a ratio of the second crystal structure may be higher than a ratio of the first crystal structure in a central portion of the particle.

In an aspect, a positive active material may be represented by the following chemical formula 1.

$$LiM1_aM2_bM3_cM4_dO_2 \quad \text{[Chemical formula 1]}$$

In the chemical formula 1, each of 'M1', 'M2' and 'M3' is one of nickel, cobalt, manganese, and aluminum, $0 \leq a < 1$, $0 \leq b < 1$, $0 \leq c < 1$, $0 < d < 0.02$, at least one of 'a', 'b' or 'c' is greater than 0, and 'M1', 'M2', 'M3' and 'M4' are different metals from each other.

In an embodiment, 'M4' in the chemical formula 1 may include at least one of tungsten, molybdenum, zirconium, niobium, tantalum, titanium, rubidium, bismuth, magnesium, zinc, gallium, vanadium, chromium, calcium, strontium, or tin.

In an embodiment, a crystal structure may be controlled depending on a 'd' value in the chemical formula 1, and a permeating amount of fluorine may be controlled depending on the 'd' value in the chemical formula 1 in a charge/discharge operation.

In an aspect, a method of fabricating a positive active material may include preparing a base aqueous solution including at least one of nickel, cobalt, manganese, or aluminum, and an additive aqueous solution including an additive metal, providing the base aqueous solution and the additive aqueous solution into a reactor to fabricate a positive active material precursor in which a metal hydroxide including at least one of nickel, cobalt, manganese, or aluminum is doped with the additive metal, and firing the positive active material precursor and lithium salt to fabricate a positive active material in which a metal oxide including lithium and at least one of nickel, cobalt, manganese, or aluminum is doped with the additive metal. A doping concentration of the additive metal may be less than 2 mol %.

In an embodiment, a firing temperature of the positive active material precursor and the lithium salt may be adjusted depending on the doping concentration of the additive metal.

In an embodiment, a firing temperature of the positive active material precursor and the lithium salt may increase as the doping concentration of the additive metal increases.

In an embodiment, the doping concentration of the additive metal may be adjusted by a concentration of the additive metal in the additive aqueous solution.

In an embodiment, a pH in the reactor may be adjusted by the additive aqueous solution when the positive active material precursor is fabricated.

BRIEF DESCRIPTION OF THE DRAWINGS

FIG. 1 is a schematic view illustrating a positive active material according to some embodiments of the inventive concepts.

FIG. 2 is a cross-sectional view taken along a line A-B of FIG. 1.

FIG. 3 is a schematic view illustrating a positive active material according to a modified example of some embodiments of the inventive concepts.

FIG. 4 is a schematic view illustrating a primary particle included in a positive active material according to some embodiments of the inventive concepts.

FIG. 5(a) is an ASTAR image of a positive active material according to a comparative example 1, and FIG. 5(b) is a color image version of the ASTAR image of FIG. 5(a).

FIG. 6(a) is an ASTAR image of a positive active material according to an embodiment 7 of the inventive concepts, and FIG. 6(b) is a color image version of the ASTAR image of FIG. 6(a).

FIG. 11 shows SEM images of the positive active material according to the comparative example 1.

FIG. 12 shows SEM images of the positive active material according to the embodiment 7 of the inventive concepts.

FIG. 13 shows SEM images of the positive active material according to an embodiment 10 of the inventive concepts.

FIG. 14 is a XRD graph of positive active materials according to embodiments 2 and 7 of the inventive concepts and the comparative example 1.

FIG. 15 is a graph showing charge/discharge characteristics of positive active materials according to embodiments 2, 7, 10 and 12 of the inventive concepts and the comparative example 1.

FIG. 16 is a graph showing capacity retention characteristics of the positive active materials according to the embodiments 2, 7, 10 and 12 of the inventive concepts and the comparative example 1.

FIG. 17 is a graph showing capacity retention characteristics of the positive active materials according to the embodiment 7 of the inventive concepts and the comparative example 1.

FIG. 18 is an EIS measurement graph of the positive active material according to the comparative example 1.

FIG. 19 is an EIS measurement graph of the positive active material according to the embodiment 7 of the inventive concepts.

FIGS. 20 to 23 are graphs showing differential capacities of the positive active materials according to the embodiments 2, 7 and 10 of the inventive concepts and the comparative example 1.

FIG. 24 is a graph showing charge/discharge characteristics of positive active materials according to embodiments 1 to 4 of the inventive concepts and the comparative example 1.

FIG. 25 is a graph showing capacity retention characteristics of the positive active materials according to the embodiments 1 to 4 of the inventive concepts and the comparative example 1.

FIG. 26 is a graph showing charge/discharge characteristics of positive active materials according to embodiments 5 to 8 of the inventive concepts and the comparative example 1.

FIG. 27 is a graph showing capacity retention characteristics of the positive active materials according to the embodiments 5 to 8 of the inventive concepts and the comparative example 1.

FIG. 28 is a graph showing charge/discharge characteristics of positive active materials according to embodiments 9 to 11 of the inventive concepts and the comparative example 1.

FIG. 29 is a graph showing capacity retention characteristics of the positive active materials according to the embodiments 9 to 11 of the inventive concepts and the comparative example 1.

FIG. 30 is a graph showing charge/discharge characteristics of positive active materials according to the embodiments 2, 7 and 10 of the inventive concepts and comparative examples 1 to 5.

FIG. 31 is a graph showing capacity retention characteristics of the positive active materials according to the embodiments 2, 7 and 10 of the inventive concepts and the comparative examples 1 to 5.

FIG. 32 is a XRD graph of a positive active material according to an embodiment 13 of the inventive concepts.

FIG. 33 shows SEM images of a positive active material precursor and a positive active material according to a comparative example 6.

FIG. 34 shows SEM images of a positive active material precursor and a positive active material according to an embodiment 13 of the inventive concepts.

FIG. 35 shows a TEM image and a SEAD pattern of the positive active material according to the embodiment 13 of the inventive concepts.

FIG. 36 shows EPMA data of the positive active material according to the embodiment 13 of the inventive concepts.

FIG. 37 shows TEM-EDX mapping of the positive active material according to the embodiment 13 of the inventive concepts.

FIG. 38 is a graph showing charge/discharge characteristics of the positive active materials according to the embodiment 13 of the inventive concepts and the comparative example 6.

FIG. 39 is a graph showing capacity retention characteristics of the positive active materials according to the embodiment 13 of the inventive concepts and the comparative example 6.

FIG. 41 shows SEM images of a positive active material precursor according to an embodiment 14 of the inventive concepts.

FIG. 44 is a graph showing charge/discharge characteristics of the positive active materials according to the embodiment 14 of the inventive concepts and the comparative example 7.

FIG. 45 is a graph showing capacity retention characteristics of the positive active materials according to the embodiment 14 of the inventive concepts and the comparative example 7.

FIG. 46 is a XRD graph of positive active materials according to an embodiment 15 of the inventive concepts and a comparative example 8.

FIG. 47 is a graph showing charge/discharge characteristics of the positive active materials according to the embodiment 15 of the inventive concepts and the comparative example 8.

FIG. 48 is a graph showing capacity retention characteristics of the positive active materials according to the embodiment 15 of the inventive concepts and the comparative example 8.

FIG. 49 is a XRD graph of positive active materials according to an embodiment 16 of the inventive concepts and a comparative example 9.

FIG. 50 is a graph showing charge/discharge characteristics of the positive active materials according to the embodiment 16 of the inventive concepts and the comparative example 9.

FIG. 51 is a graph showing capacity retention characteristics of the positive active materials according to the embodiment 16 of the inventive concepts and the comparative example 9.

FIG. 52 is a graph showing charge/discharge characteristics of positive active materials according to an embodiment 17 of the inventive concepts and the comparative example 1.

FIG. 53 is a graph showing capacity retention characteristics of the positive active materials according to the embodiment 17 of the inventive concepts and the comparative example 1.

FIG. 54 is a graph showing charge/discharge characteristics of positive active materials according to an embodiment 18 of the inventive concepts and the comparative example 1.

FIG. 55 is a graph showing capacity retention characteristics of the positive active materials according to the embodiment 18 of the inventive concepts and the comparative example 1.

FIG. 56 is a graph showing charge/discharge characteristics of positive active materials according to an embodiment 19 of the inventive concepts and the comparative example 1.

FIG. 57 is a graph showing capacity retention characteristics of the positive active materials according to the embodiment 19 of the inventive concepts and the comparative example 1.

FIG. 58 is a graph showing charge/discharge characteristics of positive active materials according to an embodiment 20 of the inventive concepts and the comparative example 1.

FIG. 59 is a graph showing capacity retention characteristics of the positive active materials according to the embodiment 20 of the inventive concepts and the comparative example 1.

FIG. 60 is a graph showing an atomic ratio of a positive active material precursor according to an embodiment 21 of the inventive concepts.

FIG. 61 is a graph showing an atomic ratio of a positive active material according to the embodiment 21 of the inventive concepts.

FIG. 62 is a graph showing charge/discharge characteristics of the positive active materials according to the embodiment 21 of the inventive concepts and the comparative example 1.

FIG. 63 is a graph showing capacity retention characteristics of the positive active materials according to the embodiment 21 of the inventive concepts and the comparative example 1.

FIG. 64 is a graph showing charge/discharge characteristics of the positive active materials according to the embodiments 7, 14, 15 and 16 of the inventive concepts and the comparative examples 1, 7, 8 and 9.

FIG. 65 is a graph showing life characteristics of the positive active materials according to the embodiments 7, 14, 15 and 16 of the inventive concepts and the comparative examples 1, 7, 8 and 9.

FIG. 66 is a graph showing life characteristics of the positive active materials according to the embodiments 7, 14, 15 and 16 of the inventive concepts and a comparative example 10.

DETAILED DESCRIPTION OF THE EMBODIMENTS

Figure 7A:
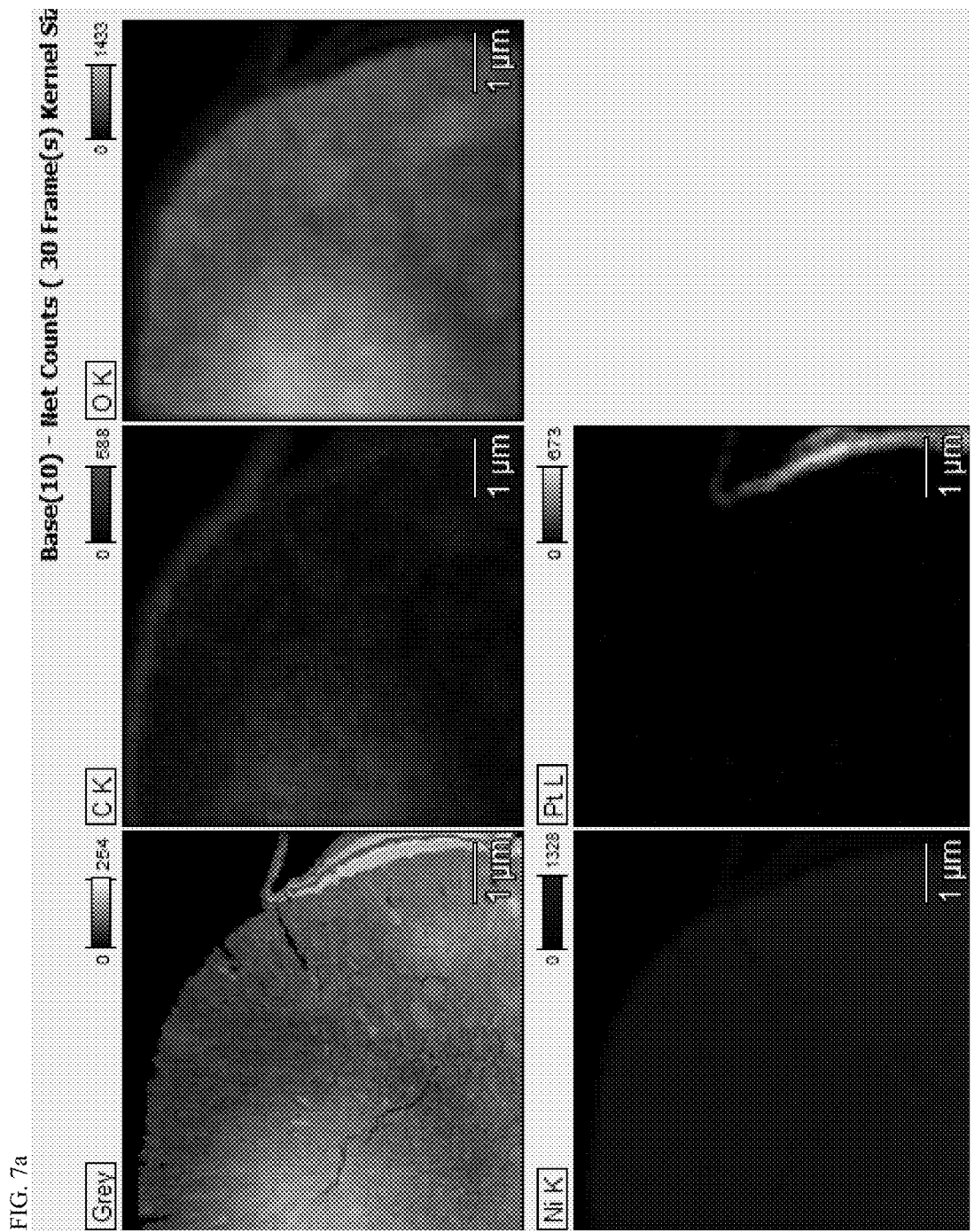
FIG. 7(a) shows EDS mapping data (before charging/discharging) of the positive active material according to the comparative example 1.

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Moreover, it will be understood that when a ratio of a first crystal structure is higher than that of a second crystal structure in a specific portion, the specific portion may include both the first crystal structure and the second crystal structure and the ratio of the first crystal structure may be higher than that of the second crystal structure, or the specific portion may have only the first crystal structure.

Furthermore, in the present specification, a crystal system may include seven crystal systems, i.e., a triclinic crystal system, a monoclinic crystal system, an orthorhombic crystal system, a tetragonal crystal system, a trigonal or rhombohedral crystal system, a hexagonal crystal system, and a cubic crystal system.

Furthermore, the term "mol %" means a content of a metal included in a positive active material or positive active material precursor on the assumption that a sum of the other metals in the positive active material or positive active material precursor except lithium and oxygen is 100%.

FIG. 1 is a schematic view illustrating a positive active material according to some embodiments of the inventive concepts, FIG. 2 is a cross-sectional view taken along a line A-B of FIG. 1, and FIG. 3 is a schematic view illustrating a positive active material according to a modified example of some embodiments of the inventive concepts.

Referring to FIGS. 1 and 2, a positive active material 100 according to some embodiments of the inventive concepts may include lithium, an additive metal, and at least one of nickel, cobalt, manganese, or aluminum. In other words, the positive active material 100 may be an oxide which includes lithium, the additive metal, and at least one of nickel, cobalt, manganese, or aluminum. For example, the additive metal may be tungsten. For other examples, the additive metal may include at least one of tungsten, molybdenum, niobium, tantalum, titanium, zirconium, bismuth, ruthenium, magnesium, zinc, gallium, vanadium, chromium, calcium, strontium, or tin.

In some embodiments, the additive metal may include at least one of heavy metal elements having specific gravities of 4 or more. Alternatively, in other embodiments, the additive metal may include at least one of a group 4 element, a group 5 element, a group 6 element, a group 8 element, or a group 15 element.

When a content of the additive metal (e.g., tungsten) is 2 mol % or more in the positive active material 100, capacity and life characteristics of the positive active material 100 may be deteriorated. Thus, according to some embodiments of the inventive concepts, the content of the additive metal (e.g., tungsten) of the positive active material 100 may be less than 2 mol %.

For an example, the positive active material 100 may be formed of a metal oxide including nickel, lithium, the additive metal, and oxygen. For another example, the positive active material 100 may be formed of a metal oxide including nickel, cobalt, lithium, the additive metal, and oxygen. For still another example, the positive active material 100 may be formed of a metal oxide including nickel, cobalt, manganese, lithium, the additive metal, and oxygen. For yet another example, the positive active material 100 may be formed of a metal oxide including nickel, cobalt, aluminum, lithium, the additive metal, and oxygen. The technical features according to embodiments of the inventive concepts may be applied to positive active materials including various materials.

In some embodiments, a concentration of the additive metal may be substantially constant in the positive active material 100. Alternatively, in other embodiments, the positive active material 100 may include portions of which concentrations of the additive metal are different from each other, or the additive metal may have a concentration gradient in the positive active material 100.

In some embodiments, a concentration of at least one of nickel, cobalt, manganese, or aluminum may be substantially constant in the positive active material 100. Alternatively, in other embodiments, at least one of nickel, cobalt, manganese, or aluminum may have a concentration gradient throughout a particle of the positive active material 100 in a direction from a center of the particle toward a surface of the particle or may have a concentration gradient in a portion of the particle in the direction. In still other embodiments, the positive active material 100 may include a core portion and a shell portion of which a concentration of a metal (at least one of nickel, cobalt, manganese, or aluminum) is different from that of the core portion. The technical features according to embodiments of the inventive concepts may be applied to positive active materials having various structures and shapes.

In some embodiments, the positive active material 100 may be represented by the following chemical formula 1.

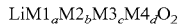

$$\text{LiM1}_a\text{M2}_b\text{M3}_c\text{M4}_d\text{O}_2 \qquad \text{[Chemical formula 1]}$$

In the chemical formula 1, each of 'M1', 'M2' and 'M3' is one of nickel, cobalt, manganese, and aluminum, 0≤a<1, 0≤b<1, 0≤c<1, 0<d<0.02, at least one of 'a', 'b' or 'c' is greater than 0, and 'M1', 'M2', 'M3' and 'M4' are different metals from each other.

In the chemical formula 1, 'M4' may be the additive metal.

In some embodiments, a crystal structure may be controlled depending on the 'd' value (mol % of 'M4') in the chemical formula 1. In addition, the permeation amount of fluorine in a process of including the positive active material may be reduced depending on the 'd' value (mol % of 'M4') in the chemical formula 1 (this will be described later with reference to FIGS. 7 to 10).

The positive active material 100 may include a first crystal structure and a second crystal structure. The first crystal structure and the second crystal structure may be different crystal systems from each other. In some embodiments, the first crystal structure may be a cubic crystal structure, and the second crystal structure may be a trigonal or rhombohedral crystal structure. The crystal structure of the positive active material 100 may be checked or verified through an ASTAR image.

When the positive active material 100 includes a plurality of elements, the first crystal structure may be a cesium chloride structure, a rock-salt structure, a zincblende structure, or a Weaire-Phelan structure.

The positive active material 100 may include a first portion 110 and a second portion 120. The first portion 110 may be a portion of the positive active material 100, in which a ratio of the first crystal structure is higher than that of the second crystal structure. The second portion 120 may be a portion of the positive active material 100, in which a ratio of the second crystal structure is higher than that of the first crystal structure. Unlike FIG. 2, the first portion 110 and the second portion 120 may not be clearly distinguished from each other by a boundary.

As described above, in some embodiments, the first portion 110 may include both the first crystal structure and the second crystal structure, and the ratio of the first crystal structure may be higher than that of the second crystal structure in the first portion 110. Alternatively, in other embodiments, the first portion 110 may have only the first crystal structure.

As described above, in some embodiments, the second portion 120 may include both the first crystal structure and the second crystal structure, and the ratio of the second crystal structure may be higher than that of the first crystal structure in the second portion 120. Alternatively, in other embodiments, the second portion 120 may have only the second crystal structure.

The first portion 110 may surround at least a portion of the second portion 120. For example, a thickness of the first portion 110 may be about 1 μm.

In some embodiments, the first portion 110 may completely surround the second portion 120 as illustrated in FIG. 2. In other words, the second portion 120 may be a core structure, and the first portion 110 may be a shell structure surrounding the core structure. That is, the positive active material 100 may have a core-shell structure having crystal systems which are crystallographically different from each other.

Alternatively, in other embodiments, the first portion 110 may surround a portion of the second portion 120 and the first portion 110 may form a portion of a surface of the positive active material 100, as illustrated in FIG. 3.

As described above, the first portion 110 may be mainly located at an outer portion of the positive active material 100, and the second portion 120 may be mainly located in an inner portion of the positive active material 100. In some embodiments, the surface of the positive active material 100 and a portion of the positive active material 100 adjacent to the surface may mainly or completely have the cubic crystal structure, and a center of the positive active material 100 and a portion of the positive active material 100 adjacent to the center may mainly or completely have the trigonal or rhombohedral crystal structure. In other words, in the surface and the portion adjacent to the surface of the positive active material 100, a ratio of the cubic crystal structure may be higher than that of the trigonal or rhombohedral crystal structure, or only the cubic crystal structure may be observed. In the center and the portion adjacent to the center of the positive active material 100, a ratio of the trigonal or rhombohedral crystal structure may be higher than that of the cubic crystal structure, or only the trigonal or rhombohedral crystal structure may be observed.

In some embodiments, a ratio of the second portion 120 may be higher than that of the first portion 110 in the positive active material 100. For example, a ratio of the second crystal structure may be higher than that of the first crystal structure in the positive active material 100.

In the positive active material 100, a portion having the first crystal structure (or the first portion 110) and a portion having the second crystal structure (or the second portion 120) may include the same material. For example, when the positive active material 100 is formed of an oxide including lithium, nickel, and tungsten, the portion having the first crystal structure (or the first portion 110) and the portion having the second crystal structure (or the second portion 120) may be formed of an oxide including lithium, nickel, and tungsten. For another example, when the positive active material 100 is formed of an oxide including lithium, nickel, cobalt, manganese, and tungsten, the portion having the first crystal structure (or the first portion 110) and the portion having the second crystal structure (or the second portion 120) may be formed of an oxide including lithium, nickel, cobalt, manganese, and tungsten.

In addition, in some embodiments, the portion having the first crystal structure (or the first portion 110) and the portion having the second crystal structure (or the second portion 120) may be represented by the same chemical formula. In other words, the portion having the first crystal structure (or the first portion 110) and the portion having the second crystal structure (or the second portion 120) may be chemically the same as each other.

As described above, according to the embodiments of the inventive concepts, the positive active material 100 may include the first portion 110 in which the ratio of the first crystal structure (e.g., the cubic crystal structure) is high, and the second portion 120 in which the ratio of the second crystal structure (e.g., the trigonal or rhombohedral crystal structure) is high and which is surrounded by the first portion 110. Due to the first portion 110 in which the ratio of the first crystal structure is high, mechanical strength of the positive active material 100 may be improved and residual lithium of the surface of the positive active material 100 may be reduced. Thus, capacity, life span and thermal stability of a secondary battery including the positive active material 100 may be improved.

In addition, according to some embodiments, the ratios of the first crystal structure and the second crystal structure in the positive active material 100 may be adjusted depending on the content of the additive metal. For example, the ratio of the first crystal structure (e.g., the cubic crystal structure) may increase in the positive active material 100 as the content of the additive metal (e.g., tungsten) increases. When the content of the additive metal is 2 mol % or more, the ratio of the first crystal structure (e.g., the cubic crystal structure) may increase and the ratio of the second crystal structure (e.g., the trigonal or rhombohedral crystal structure) may decrease. Thus, a movement path of lithium ions may be reduced in the secondary battery including the positive active material 100. Therefore, when the content of the additive metal (e.g., tungsten) is 2 mol % or more, charge/discharge characteristics of the secondary battery including the positive active material 100 may be deteriorated.

However, according to the aforementioned embodiments of the inventive concepts, the content of the additive metal may be less than 2 mol %, and thus the charge/discharge characteristics of the secondary battery including the positive active material 100 may be improved.

FIG. 4 is a schematic view illustrating a primary particle included in a positive active material according to some embodiments of the inventive concepts.

Referring to FIG. 4, according to some embodiments, the positive active material may include primary particles 30 and a secondary particle in which the primary particles 30 are aggregated.

The primary particles 30 may extend in directions radiating from one region of the inside of the secondary particle toward a surface 20 of the secondary particle. The one region of the inside of the secondary particle may be a center 10 of the secondary particle. In other words, the primary particle 30 may have a rod shape which extends from the one region of the inside of the secondary particle toward the surface 20 of the secondary particle.

A movement path of metal ions (e.g., lithium ions) and an electrolyte may be provided between the primary particles 30 having the rod shapes, i.e., between the primary particles 30 extending in directions D from the center 10 toward the surface 20 of the secondary particle. Thus, the positive active material according to the embodiments of the inventive concepts may improve charge/discharge efficiency of a secondary battery.

According to some embodiments, the primary particle 30 relatively adjacent to the surface 20 of the secondary particle may have a longer length in the direction from the center 10 toward the surface 20 of the secondary particle than the primary particle 30 relatively adjacent to the center 10 of the secondary particle. In other words, in at least a portion of the secondary particle which extends from the center 10 to the surface 20 of the secondary particle, the lengths of the primary particles 30 may sequentially increase as a distance from the surface 20 of the secondary particle decreases.

In some embodiments, when the positive active material 100 includes the additive metal as described with reference to FIGS. 1 to 3, contents of the additive metal in the primary particles 30 may be substantially equal to each other. For example, the content of the additive metal in the primary particles 30 may be less than 2 mol %.

In addition, as described with reference to FIGS. 1 to 3, the positive active material according to some embodiments of the inventive concepts may have the first crystal structure and the second crystal structure. Thus, some of the primary particles 30 may have both the first crystal structure and the second crystal structure. In addition, others of the primary particles 30 may have only the first crystal structure or may have only the second crystal structure. In this case, according to some embodiments, a ratio of the primary particles 30 having the first crystal structure (e.g., the cubic crystal structure) may increase as a distance from the surface 20 of the positive active material decreases, and a ratio of the primary particles 30 having the second crystal structure (e.g., the trigonal or rhombohedral crystal structure) may increase as a distance from the center 10 of the positive active material decreases.

A method of fabricating a positive active material according to some embodiments of the inventive concepts will be described hereinafter.

A base aqueous solution and an additive aqueous solution may be prepared. The base aqueous solution may include at least one of nickel, cobalt, manganese, or aluminum, and the additive aqueous solution may include an additive metal.

In some embodiments, the preparation of the additive aqueous solution may include preparing a source including the additive metal, and forming the additive aqueous solution by dissolving the source in a solvent. For example, when the additive metal is tungsten, the source may be tungsten oxide ($WO_3$) For example, the solvent may include NaOH.

In some embodiments, the formation of the additive aqueous solution may include dissolving the source (e.g., tungsten oxide) in a basic solution (e.g., LiOH), and forming the additive aqueous solution by mixing the solvent with LiOH in which the source is dissolved. Thus, the source may be easily dissolved.

The solvent may not only dissolve the source but also adjust a pH in a reactor in a process of fabricating a positive active material precursor using the additive aqueous solution as described later.

When the base aqueous solution includes nickel, the base aqueous solution may include, for example, nickel sulfate. When the base aqueous solution includes cobalt, the base aqueous solution may include, for example, cobalt sulfate. When the base aqueous solution includes manganese, the base aqueous solution may include, for example, manganese sulfate. When the base aqueous solution includes at least two of nickel, cobalt, manganese, or aluminum, the base aqueous solution may include at least two metal salt aqueous solutions.

The base aqueous solution and the additive aqueous solution may be provided into the reactor to fabricate a positive active material precursor in which a metal hydroxide including at least one of nickel, cobalt, manganese, or aluminum is doped with the additive metal. In addition to the base aqueous solution and the additive aqueous solution, an ammonia solution may further be provided into the reactor. The pH in the reactor may be adjusted by a supply amount of the ammonia solution and the solvent in which the additive metal is dissolved.

In other embodiments, the source including the additive metal may be dissolved in the base aqueous solution and then may be provided into the reactor.

For example, when the base aqueous solution includes nickel and the additive metal is tungsten, the positive active material precursor may be represented by the following chemical formula 2. In the following chemical formula 2, 'x' may be less than 1 and greater than 0.

$$Ni_{1-x}W_x(OH)_2 \qquad \text{[Chemical formula 2]}$$

The positive active material precursor and lithium salt may be fired to fabricate a positive active material in which a metal oxide including lithium and at least one of nickel, cobalt, manganese, or aluminum is doped with the additive metal.

For example, when the base aqueous solution includes nickel and the additive metal is tungsten as described above, the positive active material may be represented by the following chemical formula 3.

$$LiNi_{1-x}W_xO_2 \qquad \text{[Chemical formula 3]}$$

In some embodiments, a firing temperature of the positive active material precursor and the lithium salt may be adjusted depending on a doping concentration of the additive metal. For example, the firing temperature of the positive active material precursor and the lithium salt may increase as the doping concentration of the additive metal increases. For example, when the doping concentration of the additive metal is 0.5 mol %, the firing temperature of the positive active material precursor and the lithium salt may be about 730° C. When the doping concentration of the additive metal is 1.0 mol %, the firing temperature of the positive active material precursor and the lithium salt may be about 760° C. When the doping concentration of the additive metal is 1.5 mol %, the firing temperature of the positive active material precursor and the lithium salt may be about 790° C.

Unlike the embodiments of the inventive concepts, if the firing temperature of the positive active material precursor and the lithium salt is not adjusted depending on the doping concentration of the additive metal, charge/discharge characteristics of a secondary battery including a fabricated positive active material may be deteriorated.

However, according to the aforementioned embodiments of the inventive concepts, the firing temperature of the positive active material precursor and the lithium salt may be adjusted depending on the doping concentration of the additive metal, and thus the charge/discharge characteristics of the secondary battery including the positive active material may be improved.

Evaluation results of characteristics of the positive active material according to the aforementioned embodiments of the inventive concepts will be described hereinafter.

Fabrication of Positive Active Materials According to Embodiments 1 to 4

$WO_3$ powder was dissolved at a concentration of 0.235M in 0.4 L of a 1.5M lithium hydroxide solution. The formed solution was dissolved in 9.6 L of a 4M sodium hydroxide solution to form an additive aqueous solution in which tungsten (W) was dissolved. 10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate aqueous solution and a 10.5M ammonia solution were continuously provided into the reactor at 0.561 liter/hour and 0.128 liter/hour, respectively, for a time of 15 hours to 35 hours. In addition, the additive aqueous solution was supplied into the reactor to adjust a pH and to add tungsten, and thus a metal composite hydroxide ($Ni_{0.995}$ $W_{0.005}(OH)_2$) was formed.

The formed metal composite hydroxide ($Ni_{0.995}$ $W_{0.005}(OH)_2$) was filtered, was cleaned by water, and then, was dried in a vacuum dryer at 110° C. for 12 hours. After the metal composite hydroxide ($Ni_{0.995}$ $W_{0.005}(OH)_2$) and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 710° C. for 10 hours to fabricate positive active material ($LiNi_{0.995}$ $W_{0.005}O_2$) powder according to an embodiment 1.

In the method described in the above embodiment 1, the metal composite hydroxide ($Ni_{0.995}$ $W_{0.005}(OH)_2$) and lithium hydroxide (LiOH) were fired at 730° C. to fabricate positive active material ($LiNi_{0.995}$ $W_{0.005}O_2$) powder according to an embodiment 2.

In the method described in the above embodiment 1, the metal composite hydroxide ($Ni_{0.995}$ $W_{0.005}(OH)_2$) and lithium hydroxide (LiOH) were fired at 750° C. to fabricate positive active material ($LiNi_{0.995}$ $W_{0.005}O_2$) powder according to an embodiment 3.

In the method described in the above embodiment 1, the metal composite hydroxide ($Ni_{0.995}$ $W_{0.005}(OH)_2$) and lithium hydroxide (LiOH) were fired at 770° C. to fabricate positive active material ($LiNi_{0.995}$ $W_{0.005}O_2$) powder according to an embodiment 4.

TABLE 1

| Classification | Positive active material | Firing temperature |
| --- | --- | --- |
| Embodiment 1 | $LiNi_{0.995}W_{0.005}O_2$ | 710° C. |
| Embodiment 2 | $LiNi_{0.995}W_{0.005}O_2$ | 730° C. |
| Embodiment 3 | $LiNi_{0.995}W_{0.005}O_2$ | 750° C. |
| Embodiment 4 | $LiNi_{0.995}W_{0.005}O_2$ | 770° C. |

Fabrication of Positive Active Materials According to Embodiments 5 to 8

In the method described in the above embodiment 1, the $WO_3$ powder was dissolved at a concentration of 0.47M to form an additive aqueous solution, a metal composite hydroxide ($Ni_{0.99}$ $W_{0.01}(OH)_2$) was formed using this additive aqueous solution, and the metal composite hydroxide ($Ni_{0.99}$ $W_{0.01}(OH)_2$) and lithium hydroxide (LiOH) were fired at 730° C. to fabricate positive active material ($LiNi_{0.99}$ $W_{0.01}O_2$) according to an embodiment 5.

In the method described in the above embodiment 5, the metal composite hydroxide ($Ni_{0.99}$ $W_{0.01}(OH)_2$) and lithium hydroxide (LiOH) were fired at 750° C. to fabricate positive active material ($LiNi_{0.99}$ $W_{0.01}O_2$) powder according to an embodiment 6.

In the method described in the above embodiment 5, the metal composite hydroxide ($Ni_{0.99}$ $W_{0.01}(OH)_2$) and lithium hydroxide (LiOH) were fired at 760° C. to fabricate positive active material ($LiNi_{0.99}$ $W_{0.01}O_2$) powder according to an embodiment 7.

In the method described in the above embodiment 5, the metal composite hydroxide ($Ni_{0.99}$ $W_{0.01}(OH)_2$) and lithium hydroxide (LiOH) were fired at 770° C. to fabricate positive active material ($LiNi_{0.99}$ $W_{0.01}O_2$) powder according to an embodiment 8.

TABLE 2

| Classification | Positive active material | Firing temperature |
| --- | --- | --- |
| Embodiment 5 | $LiNi_{0.99}W_{0.01}O_2$ | 730° C. |
| Embodiment 6 | $LiNi_{0.99}W_{0.01}O_2$ | 750° C. |
| Embodiment 7 | $LiNi_{0.99}W_{0.01}O_2$ | 760° C. |
| Embodiment 8 | $LiNi_{0.99}W_{0.01}O_2$ | 770° C. |

Fabrication of Positive Active Materials According to Embodiments 9 to 11

In the method described in the above embodiment 1, the $WO_3$ powder was dissolved at a concentration of 0.705M to form an additive aqueous solution, a metal composite hydroxide ($Ni_{0.985}$ $W_{0.015}(OH)_2$) was formed using this additive aqueous solution, and the metal composite hydroxide ($Ni_{0.985}$ $W_{0.015}(OH)_2$) and lithium hydroxide (LiOH) were fired at 770° C. to fabricate positive active material ($LiNi_{0.985}$ $W_{0.015}O_2$) according to an embodiment 9.

In the method described in the above embodiment 9, the metal composite hydroxide ($Ni_{0.985}$ $W_{0.015}(OH)_2$) and lithium hydroxide (LiOH) were fired at 790° C. to fabricate positive active material ($LiNi_{0.985}$ $W_{0.015}O_2$) powder according to an embodiment 10.

In the method described in the above embodiment 9, the metal composite hydroxide ($Ni_{0.985}$ $W_{0.015}(OH)_2$) and lithium hydroxide (LiOH) were fired at 810° C. to fabricate positive active material ($LiNi_{0.985}$ $W_{0.015}O_2$) powder according to an embodiment 11.

TABLE 3

| Classification | Positive active material | Firing temperature |
| --- | --- | --- |
| Embodiment 9 | $LiNi_{0.985}W_{0.015}O_2$ | 770° C. |
| Embodiment 10 | $LiNi_{0.985}W_{0.015}O_2$ | 790° C. |
| Embodiment 11 | $LiNi_{0.985}W_{0.015}O_2$ | 810° C. |

Fabrication of Positive Active Material According to Embodiment 12

In the method described in the above embodiment 1, the $WO_3$ powder was dissolved at a concentration of 0.94M to form an additive aqueous solution, a metal composite hydroxide ($Ni_{0.95}W_{0.02}(OH)_2$) was formed using this additive aqueous solution, and the metal composite hydroxide ($Ni_{0.98}W_{0.02}(OH)_2$) and lithium hydroxide (LiOH) were fired at 790° C. to fabricate positive active material ($LiNi_{0.98}W_{0.02}O_2$) according to an embodiment 12.

Fabrication of Positive Active Material According to Comparative Example 1

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate aqueous solution and a 10.5M ammonia solution were continuously provided into the reactor at 0.561 liter/hour and 0.128 liter/hour, respectively, for a time of 15 hours to 35 hours. In addition, a sodium hydroxide solution was supplied into the reactor to adjust a pH, and thus a metal composite hydroxide (Ni(OH)$_2$) was formed.

The formed metal composite hydroxide (Ni(OH)$_2$) was filtered, was cleaned by water, and then, was dried in a vacuum dryer at 110° C. for 12 hours. After the metal composite hydroxide (Ni(OH)$_2$) and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 650° C. for 10 hours to fabricate positive active material (LiNiO$_2$) powder according to a comparative example 1.

The positive active materials according to the embodiments 1 to 12 and the comparative example 1 may be listed as the following table 4.

TABLE 4

| Classification | Positive active material |
| --- | --- |
| Comparative example 1 | $LiNiO_2$ |
| Embodiments 1 to 4 | $LiNi_{0.995}W_{0.005}O_2$ |
| Embodiments 5 to 8 | $LiNi_{0.99}W_{0.01}O_2$ |
| Embodiments 9 to 11 | $LiNi_{0.985}W_{0.015}O_2$ |
| Embodiment 12 | $LiNi_{0.98}W_{0.02}O_2$ |

Residual lithium according to the embodiment 8 of the inventive concepts and residual lithium according to the comparative example 1 were measured as shown in the following table 5.

TABLE 5

| Classification | LiOH (ppm) | $Li_2CO_3$ (ppm) | Total Residual Li (ppm) |
| --- | --- | --- | --- |
| Comparative example 1 | 17822.4 | 8128.8 | 25951.2 |
| Embodiment 8 | 16497.7 | 3516.0 | 20013.6 |

As shown in the table 5, the amount of the residual lithium of the positive active material according to the embodiment 8 is less than the amount of the residual lithium of the positive active material according to the comparative example 1 by about 6000 ppm.

FIG. 5(a) and FIG. 5(b) are an ASTAR image of a positive active material according to a comparative example 1, and FIG. 6(a) and FIG. 6(b) are an ASTAR image of a positive active material according to an embodiment 7 of the inventive concepts, in black/white and color, respectively.

Referring to FIGS. 5(a), 5(b), 6(a) and 6(b), ASTAR images of the positive active materials according to the comparative example 1 and the embodiment 7 were obtained. In FIGS. 5(a), 5(b), 6(a), and 6(b), a black region shows the trigonal or rhombohedral crystal structure, and a gray region shows the cubic crystal structure.

As shown in FIGS. 5(a), 5(b), 6(a), and 6(b), in the positive active material according to the comparative example 1, the cubic crystal structure and the trigonal or rhombohedral crystal structure are uniformly and randomly distributed. On the contrary, in the positive active material according to the embodiment 7, the cubic crystal structure is mainly distributed in a surface portion of the positive active material and the trigonal or rhombohedral crystal structure is mainly distributed within the positive active material. In other words, a first portion in which a ratio of the cubic crystal structure is higher than that of the trigonal or rhombohedral crystal structure surrounds at least a portion of a second portion in which a ratio of the trigonal or rhombohedral crystal structure is higher than that of the cubic crystal structure.

Figure 7B:
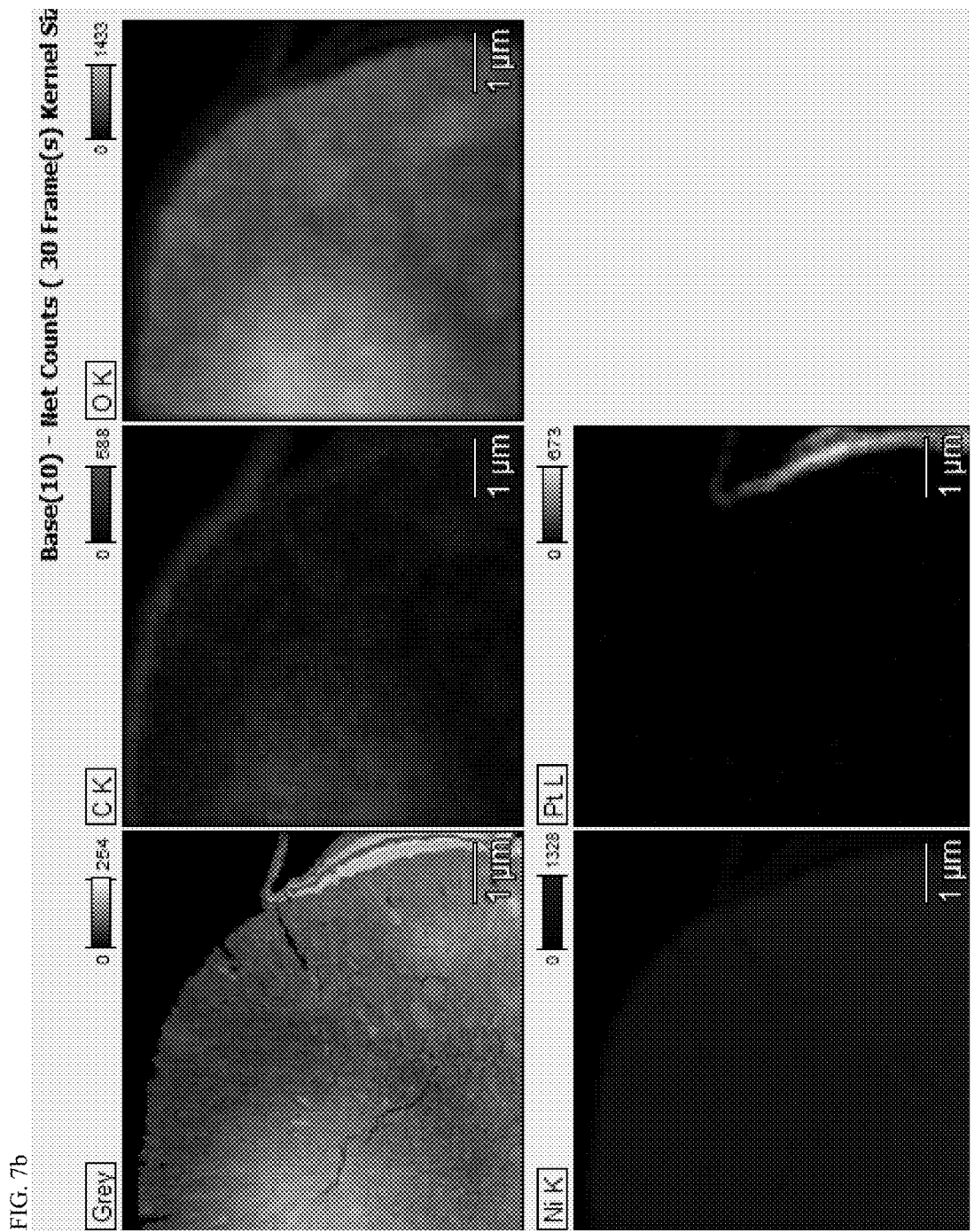
FIG. 7(b) is a color image version of the EDS mapping data of FIG. 7(a).
Figure 8A:
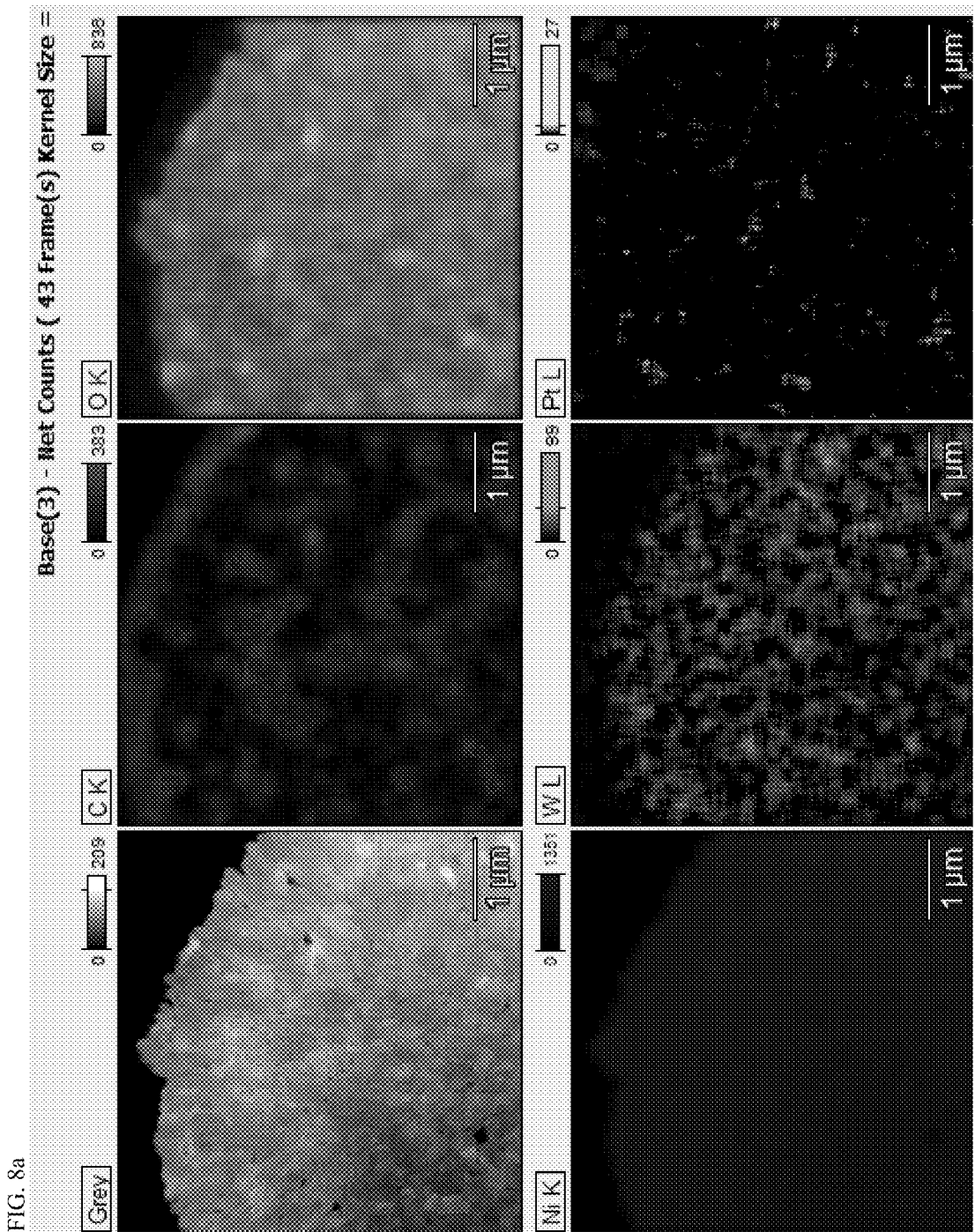
FIG. 8(a) shows EDS mapping data (before charging/discharging) of the positive active material according to the embodiment 7 of the inventive concepts.
Figure 8B:
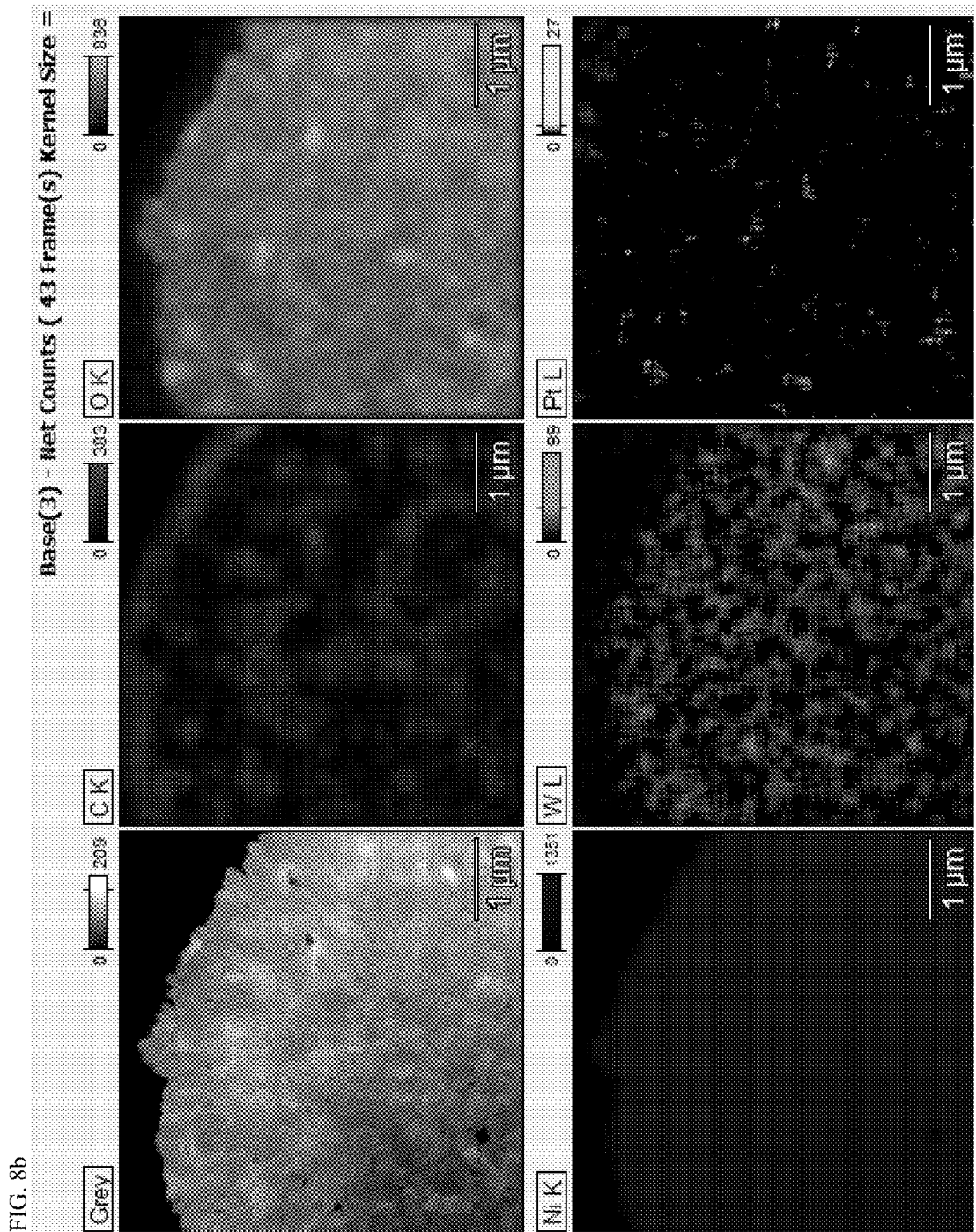
FIG. 8(b) is a color image version of the EDS mapping data of FIG. 8(a).
Figure 9A:
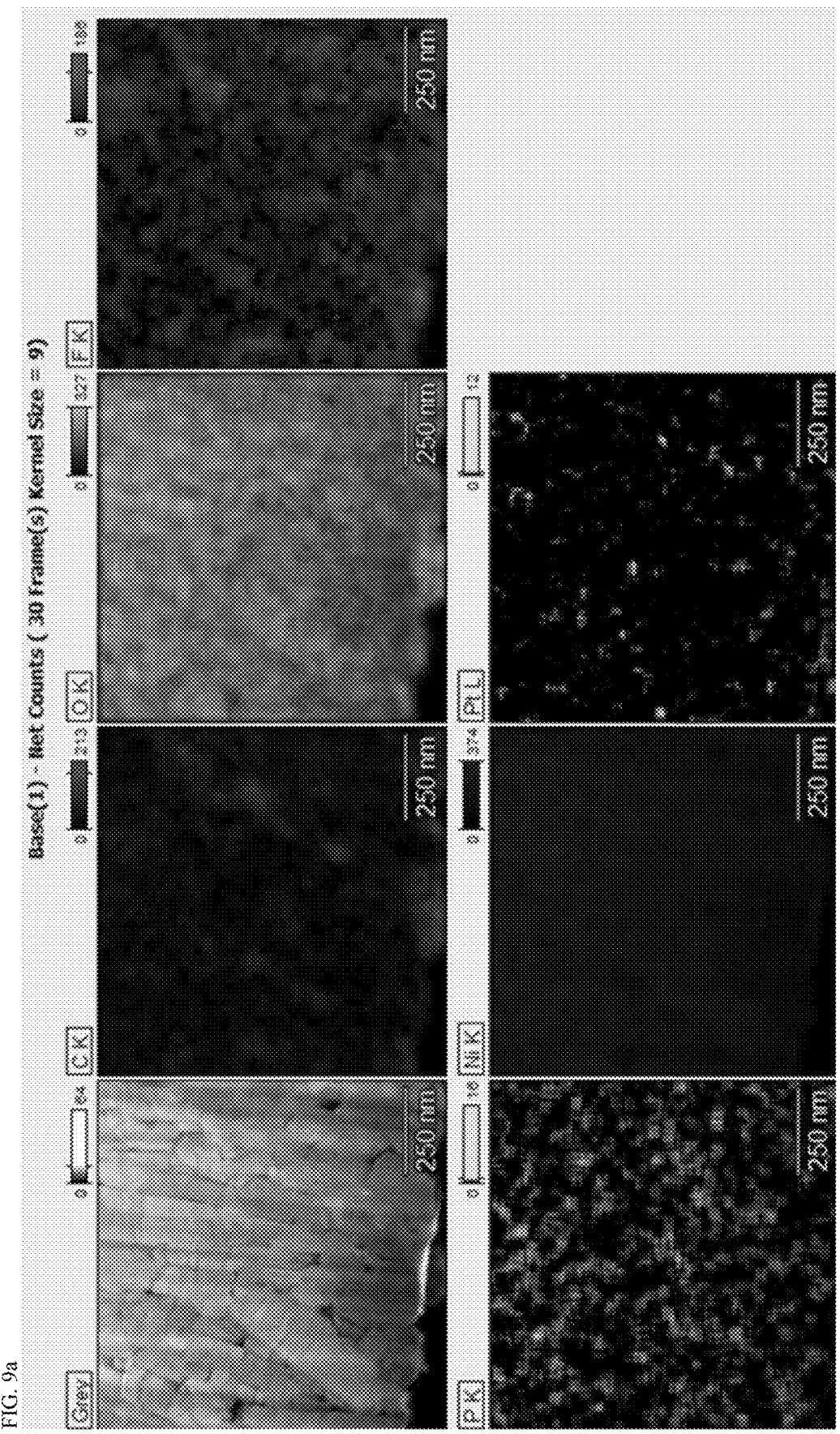
FIG. 9(a) shows EDS mapping data (after charging/discharging) of the positive active material according to the comparative example 1.
Figure 9B:
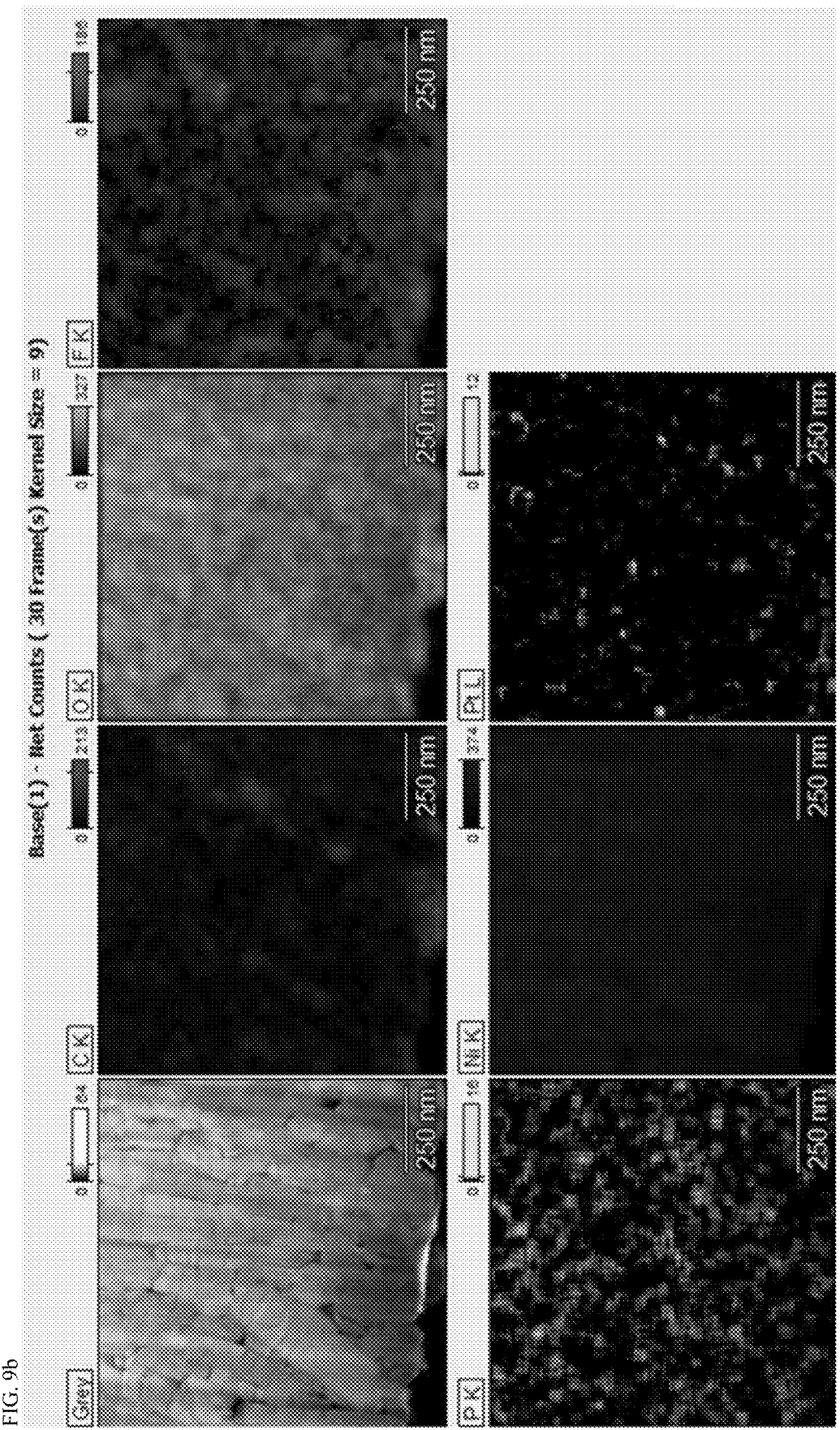
FIG. 9(b) is a color image version of the EDS mapping data of FIG. 9(a).
Figure 10A:
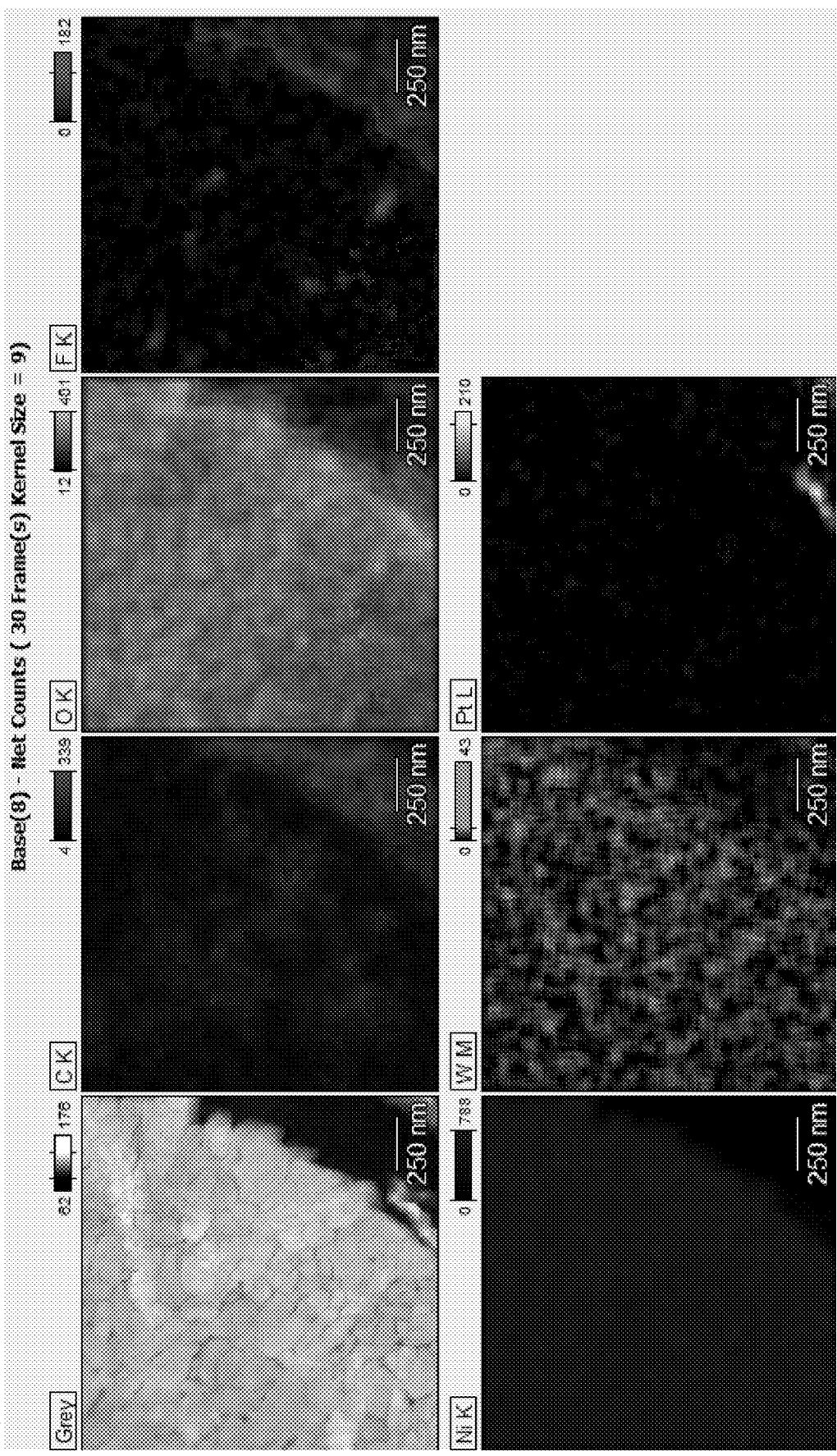
FIG. 10(a) shows EDS mapping data (after charging/discharging) of the positive active material according to the embodiment 7 of the inventive concepts.
Figure 10B:
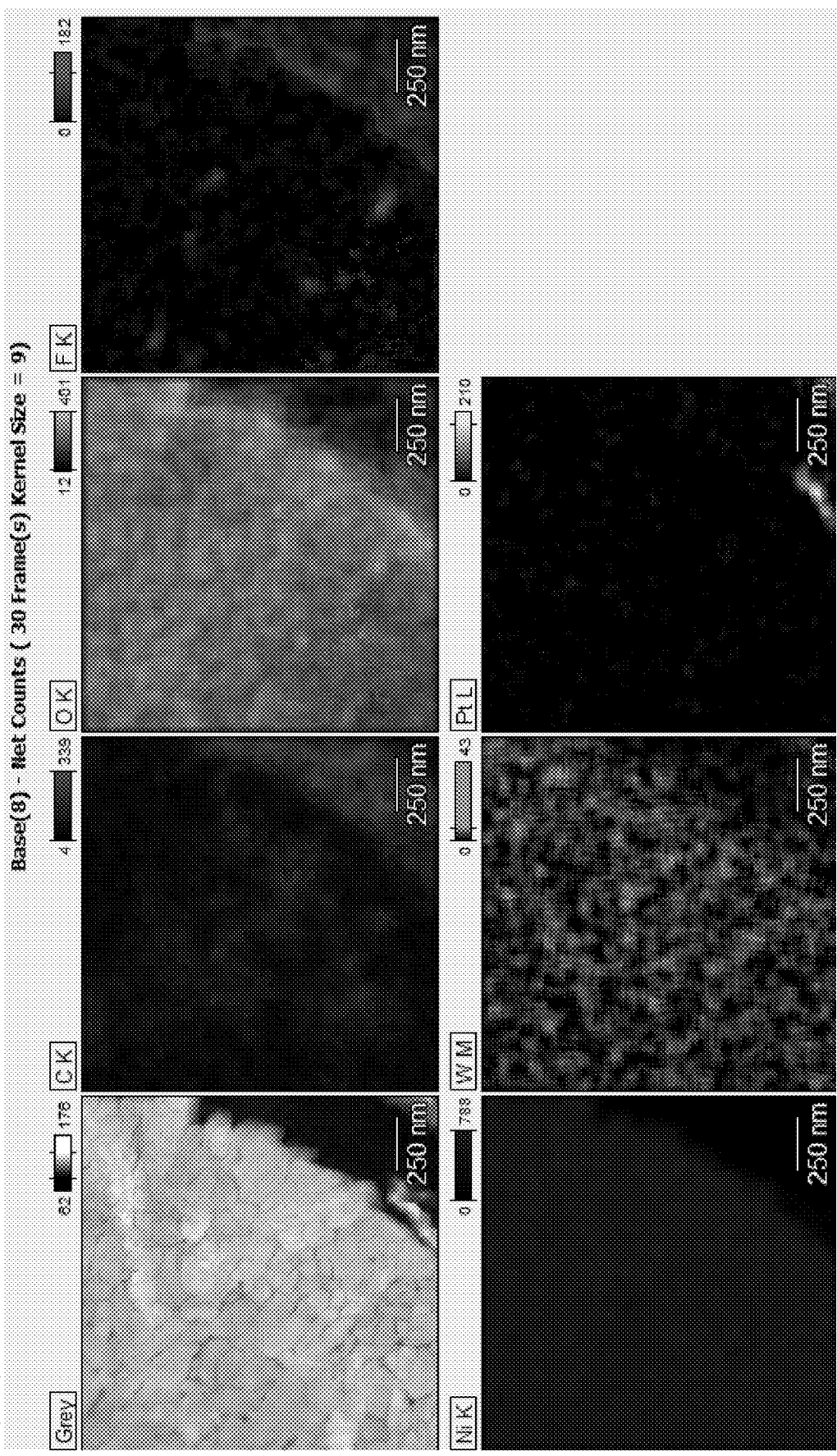
FIG. 10(b) is a color image version of the EDS mapping data of FIG. 10(a).

FIG. 7(a) and FIG. 7(b) show EDS mapping data (before charging/discharging) of the positive active material according to the comparative example 1, and FIG. 8(a) and FIG. 8(b) show EDS mapping data (before charging/discharging) of the positive active material according to the embodiment 7 of the inventive concepts. FIG. 9(a) and FIG. 9(b) show EDS mapping data (after charging/discharging) of the positive active material according to the comparative example 1, and FIG. 10(a) and FIG. 10(b) show EDS mapping data (after charging/discharging) of the positive active material according to the embodiment 7 of the inventive concepts.

Referring to FIGS. 7(a), 7(b), 8(a), and 8(b), tungsten which is the additive metal is substantially uniformly distributed in a particle of the positive active material according to the embodiment 7 of the inventive concepts.

In addition, referring to FIGS. 9(a), 9(b), 10(a), and 10(b), in the positive active material according to the comparative example 1 which does not include the additive metal, fluorine (F) existing in an electrolyte permeates into a particle in a charge/discharge operation. On the contrary, in the positive active material according to the embodiment 7 which includes the additive metal (i.e., tungsten), a very small amount of fluorine (F) which is much less than that of the comparative example 1 permeates into the particle. In other words, when the positive active material including the additive metal (e.g., tungsten) is fabricated according to the embodiments of the inventive concepts, fluorine (F) permeating in the charge/discharge operation may be minimized, and thus life and capacity characteristics of the positive active material may be improved.

FIG. 11 shows SEM images of the positive active material according to the comparative example 1, and FIG. 12 shows SEM images of the positive active material according to the embodiment 7 of the inventive concepts. FIG. 13 shows SEM images of the positive active material according to an embodiment 10 of the inventive concepts, and FIG. 14 is a XRD graph of positive active materials according to embodiments 2 and 7 of the inventive concepts and the comparative example 1.

Referring to FIGS. 11 to 14, SEM images of the positive active materials according to the comparative example 1 and the embodiments 7 and 10 were obtained, and XRD data of the positive active materials according to the embodiments 2 and 7 and the comparative example 1 were measured. As shown in FIGS. 11 to 13, a plurality of particles of the positive active material according to the comparative example 1 are broken after 100 cycles of charging/discharging. However, the positive active materials according to the embodiments 7 and 10 have stabilized crystal structures, and thus breakage of particles thereof may be minimized.

FIG. 15 is a graph showing charge/discharge characteristics of positive active materials according to embodiments 2, 7, 10 and 12 of the inventive concepts and the comparative example 1, and FIG. 16 is a graph showing capacity retention characteristics of the positive active materials according to the embodiments 2, 7, 10 and 12 of the inventive concepts and the comparative example 1.

Referring to FIGS. 15 and 16, half cells were manufactured using the positive active materials according to the embodiments 2, 7, 10 and 12 and the comparative example 1. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 15 and 16 and the following table 6.

TABLE 6

|  | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 1 | 247.5 | 96.8% | 242.3 | 97.9% | 232.5 | 93.9% | 100 | 73.7% |
| Embodiment 2 | 246.7 | 96.1% | 242.5 | 98.3% | 233.1 | 94.5% | 100 | 83.2% |
| Embodiment 7 | 244.0 | 95.6% | 240.0 | 98.4% | 233.2 | 95.6% | 100 | 88.2% |
| Embodiment 10 | 240.8 | 94.9% | 235.4 | 97.8% | 226.6 | 94.1% | 100 | 89.8% |
| Embodiment 12 | 201.4 | 96.0% | 182.5 | 90.6% | 160.7 | 79.8% | 15 | 98.4% |

As shown in FIGS. 15 and 16 and the table 6, discharge capacity and life characteristics of the secondary batteries manufactured using the positive active materials according to the embodiments 2, 7, 10 and 12 are significantly superior to those of the secondary battery manufactured using the positive active material according to the comparative example 1. In addition, in the case of the positive active material according to the embodiment 12, discharge capacity characteristics are significantly reduced due to an excessive amount of tungsten. Thus, it may be recognized that the content of the additive metal in the positive active material is controlled less than 2 mol % to effectively improve the capacity characteristics of the secondary battery.

FIG. 17 is a graph showing capacity retention characteristics of the positive active materials according to the embodiment 7 of the inventive concepts and the comparative example 1.

Referring to FIG. 17, discharge capacities according to the number of charge/discharge cycles of the positive active materials according to the embodiment 7 and the comparative example 1 were measured. The measured results are shown in FIG. 17 and the following table 7.

TABLE 7

| Classification | 1st Discharge Capacity at 0.1 C (mAhg$^{-1}$) | 1st Ah Efficiency | 0.2 C (mAhg$^{-1}$) (0.2 C/0.1 C) | 0.5 C (mAhg$^{-1}$) (0.5 C/0.1 C) | 1 C (mAhg$^{-1}$) (1 C/0.1 C) | 2 C (mAhg$^{-1}$) (2 C/0.1 C) | 5 C (mAhg$^{-1}$) (5 C/0.1 C) |
|---|---|---|---|---|---|---|---|
| Comparative example 1 | 245.0 | 97.3% | 239.2 (97.6%) | 232.7 (95.0%) | 225.0 (91.9%) | 215.1 (87.8%) | 201.0 (82.1%) |
| Embodiment 7 | 243.5 | 95.9% | 240.0 (98.7%) | 234.0 (96.2%) | 225.3 (92.6%) | 215.9 (88.8%) | 206.1 (84.7%) |

As shown in FIG. 17 and the table 7, life characteristics of the secondary battery manufactured using the positive active material according to the embodiment 7 are superior to those of the secondary battery manufactured using the positive active material according to the comparative example 1.

FIG. 18 is an electrochemical impedance spectroscopy (EIS) measurement graph of the positive active material according to the comparative example 1, and FIG. 19 is an EIS measurement graph of the positive active material according to the embodiment 7 of the inventive concepts.

Referring to FIGS. 18 and 19, secondary batteries including the positive active materials according to the comparative example 1 and the embodiment 7 were manufactured, and electrochemical impedances according to a charge/discharge cycle thereof were measured.

TABLE 8

| Classification | Resistance ($\Omega$) | 1st | 25th | 50th | 100th |
|---|---|---|---|---|---|
| Comparative example 1 | Rsf | 6.9 | 7 | 7.2 | 9.4 |
| | Rct | 6.5 | 12.5 | 25.5 | 70.2 |
| Embodiment 7 | Rsf | 6.1 | 6.4 | 6.8 | 7.3 |
| | Rct | 6.3 | 11.3 | 14.7 | 22.1 |

As shown in FIGS. 18 and 19 and the table 8, Rsf values and Rct values of the positive active material including the additive metal (tungsten) according to the embodiment 7 are significantly lower than those of the positive active material according to the comparative example 1. In addition, it may be recognized that a difference therebetween gradually increases as the number of the charge/discharge cycles increases. In other words, it may be recognized that a surface of the positive active material including the additive metal (tungsten) according to the embodiment 7 is more stable than a surface of the positive active material according to the comparative example 1.

FIGS. 20 to 23 are graphs showing differential capacities of the positive active materials according to the embodiments 2, 7 and 10 of the inventive concepts and the comparative example 1.

Referring to FIGS. 20 and 23, half cells were manufactured using the positive active materials according to the embodiments 2, 7 and 10 and the comparative example 1, and differential capacities of the half cells were measured. As shown in FIGS. 20 to 23, phase transition rates of the positive active materials according to the embodiments 2, 7 and 10 are much lower than that of the positive active material according to the comparative example 1. In addition, in the cases of the positive active materials according to the embodiments 7 and 10, a H1 Phase is still shown after 100 cycles.

FIG. 24 is a graph showing charge/discharge characteristics of positive active materials according to embodiments 1 to 4 of the inventive concepts and the comparative example 1, and FIG. 25 is a graph showing capacity retention characteristics of the positive active materials according to the embodiments 1 to 4 of the inventive concepts and the comparative example 1.

Half cells were manufactured using the positive active materials according to the embodiments 1 to 4 and the comparative example 1. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 24 and 25 and the following table 9.

TABLE 9

| | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 1 | 247.5 | 96.8% | 242.3 | 97.9% | 232.5 | 93.9% | 100 | 73.7% |
| Embodiment 1 | 243.9 | 96.0% | 239.0 | 98.0% | 229.3 | 94.0% | 100 | 75.2% |
| Embodiment 2 | 246.7 | 96.1% | 242.5 | 98.3% | 233.1 | 94.5% | 100 | 83.2% |
| Embodiment 3 | 247.7 | 96.5% | 241.4 | 97.5% | 230.5 | 93.1% | 100 | 80.8% |
| Embodiment 4 | 239.3 | 93.8% | 236.7 | 98.9% | 224.5 | 93.8% | 100 | 80.5% |

As shown in FIGS. 24 and 25 and the table 9, discharge capacity and life characteristics of the secondary batteries manufactured using the positive active materials according to the embodiments 1 to 4 are significantly superior to those of the secondary battery manufactured using the positive active material according to the comparative example 1. In addition, the firing temperatures of the positive active material precursor and the lithium salt in the embodiments 1 to 4 doped with the additive metal are higher than that in the comparative example 1 not doped with the additive metal. Furthermore, it may be recognized that the charge/discharge characteristics are effectively improved by controlling the firing temperature of the positive active material precursor and the lithium salt to about 730° C., like the embodiment 2.

FIG. 26 is a graph showing charge/discharge characteristics of positive active materials according to embodiments 5 to 8 of the inventive concepts and the comparative example 1, and FIG. 27 is a graph showing capacity retention characteristics of the positive active materials according to the embodiments 5 to 8 of the inventive concepts and the comparative example 1.

Half cells were manufactured using the positive active materials according to the embodiments 5 to 8 and the comparative example 1. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 26 and 27 and the following table 10.

TABLE 10

|  | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 1 | 247.5 | 96.8% | 242.3 | 97.9% | 232.5 | 93.9% | 100 | 73.7% |
| Embodiment 5 | 242.1 | 96.0% | 236.1 | 97.5% | 226.1 | 93.4% | 100 | 87.6% |
| Embodiment 6 | 238.1 | 95.1% | 233.9 | 98.2% | 226.5 | 95.1% | 100 | 88.6% |
| Embodiment 7 | 244.0 | 95.6% | 240.0 | 98.4% | 233.2 | 95.6% | 100 | 88.2% |
| Embodiment 8 | 245.0 | 95.6% | 241.7 | 98.6% | 234.9 | 95.9% | 100 | 86.5% |

As shown in FIGS. 26 and 27 and the table 10, discharge capacity and life characteristics of the secondary batteries manufactured using the positive active materials according to the embodiments 5 to 8 are significantly superior to those of the secondary battery manufactured using the positive active material according to the comparative example 1. In addition, the firing temperatures of the positive active material precursor and the lithium salt in the embodiments 5 to 8 doped with the additive metal are higher than that in the comparative example 1 not doped with the additive metal. Furthermore, when the content of the additive metal increases to 1.0 mol % as compared with the embodiments 1 to 4 (the content of the additive metal: 0.5 mol %), the firing temperature of the positive active material precursor and the lithium salt increases to effectively improve charge/discharge efficiency.

FIG. 28 is a graph showing charge/discharge characteristics of positive active materials according to embodiments 9 to 11 of the inventive concepts and the comparative example 1, and FIG. 29 is a graph showing capacity retention characteristics of the positive active materials according to the embodiments 9 to 11 of the inventive concepts and the comparative example 1.

Half cells were manufactured using the positive active materials according to the embodiments 9 to 11 and the comparative example 1. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 28 and 29 and the following table 11.

TABLE 11

|  | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 1 | 247.5 | 96.8% | 242.3 | 97.9% | 232.5 | 93.9% | 100 | 73.7% |
| Embodiment 9 | 238.7 | 95.3% | 231.8 | 97.1% | 221.2 | 92.7% | 100 | 92.1% |

TABLE 11-continued

| | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Embodiment 10 | 240.8 | 94.9% | 235.4 | 97.8% | 226.6 | 94.1% | 100 | 89.8% |
| Embodiment 11 | 240.9 | 95.0% | 236.1 | 98.0% | 227.6 | 94.5% | 100 | 89.8% |

As shown in FIGS. 28 and 29 and the table 11, the firing temperatures of the positive active material precursor and the lithium salt in the embodiments 9 to 11 doped with the additive metal are higher than that in the comparative example 1 not doped with the additive metal. In addition, when the content of the additive metal increases to 1.5 mol % as compared with the embodiments 1 to 4 (the content of the additive metal: 0.5 mol %) and the embodiments 5 to 8 (the content of the additive metal: 1.0 mol %), the firing temperature of the positive active material precursor and the lithium salt increases to effectively improve the charge/discharge efficiency.

Fabrication of Positive Active Materials According to Comparative Examples 2 and 3

A metal composite hydroxide $(Ni(OH)_2)$ was formed by performing the same process as the comparative example 1 described above.

The formed metal composite hydroxide $(Ni(OH)_2)$ was filtered, was cleaned by water, and then, was dried in a vacuum dryer at 110° C. for 12 hours. The metal composite hydroxide $(Ni(OH)_2)$ and $WO_3$ powder were mixed with each other at a molar ratio of 99.5:0.5, and then, the mixture was mixed with lithium hydroxide (LiOH). Thereafter, the mixture mixed with lithium hydroxide (LiOH) was fired at 650° C. to fabricate positive active material $(LiNi_{0.995}W_{0.005}O_2)$ powder according to a comparative example 2.

In the method described in the above comparative example 2, the metal composite hydroxide $(Ni(OH)_2)$ and the $WO_3$ powder were mixed with each other at a molar ratio of 99:1. Thus, positive active material $(LiNi_{0.99}W_{0.01}O_2)$ powder according to a comparative example 3 was fabricated.

Fabrication of Positive Active Materials According to Comparative Examples 4 and 5

$LiNiO_2$ powder was formed by performing the same process as the comparative example 1 described above.

The formed $LiNiO_2$ powder and $WO_3$ were mixed with each other at a molar ratio of 99.75:0.25, and the mixture was ball-milled. Thereafter, the ball-milled mixture was thermally treated at 400° C. to fabricate positive active material (W coating 0.25 mol % $LiNiO_2$) powder according to a comparative example 4.

In the method described in the above comparative example 4, $LiNiO_2$ powder and $WO_3$ were mixed with each other at a molar ratio of 99.5:0.5, and the mixture was ball-milled. Thereafter, the ball-milled mixture was thermally treated at 400° C. to fabricate positive active material (W coating 0.5 mol % $LiNiO_2$) powder according to a comparative example 5.

The positive active materials according to the comparative examples 2 to 4 may be listed as the following table 12.

TABLE 12

| Classification | Positive active material |
|---|---|
| Comparative example 2 | $WO_3$ 0.5 mol % |
| Comparative example 3 | $WO_3$ 1.0 mol % |
| Comparative example 4 | W coating 0.25 mol % |
| Comparative example 5 | W coating 0.5 mol % |

FIG. 30 is a graph showing charge/discharge characteristics of positive active materials according to the embodiments 2, 7 and 10 of the inventive concepts and comparative examples 1 to 5, and FIG. 31 is a graph showing capacity retention characteristics of the positive active materials according to the embodiments 2, 7 and 10 of the inventive concepts and the comparative examples 1 to 5.

Referring to FIGS. 30 and 31, half cells were manufactured using the positive active materials according to the comparative examples 2 to 5. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 30 and 31 and the following table. 13.

TABLE 13

| | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 2 | 246.9 | 97.1 | 242.2 | 98.1 | 233.8 | 94.7 | 100 | 76.7 |
| Comparative example 3 | 242.0 | 97.2 | 235.5 | 97.3 | 224.6 | 92.8 | 100 | 79.6 |
| Comparative example 4 | 247.5 | 97.6 | 242.2 | 97.9 | 233.1 | 94.2 | 58 | 88.8 |
| Comparative example 5 | 247.3 | 97.7 | 241.8 | 97.7 | 232.3 | 93.9 | 59 | 87.9 |

As shown in FIGS. 30 and 31 and the tables 8 and 13, the discharge capacity and life characteristics of the secondary battery manufactured using the positive active material including the additive metal according to the embodiment are significantly superior to those of the secondary batteries manufactured using the positive active materials according to the comparative examples 1 to 5.

Fabrication of Positive Active Material According to Embodiment 13

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of an additive aqueous solution in which tungsten (W) was dissolved. 10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate and cobalt sulfate aqueous solution (molar ratio of nickel:cobalt=88:11) and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and W-doping.

A formed metal composite hydroxide ($Ni_{0.88}Co_{0.11}W_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 750° C. for 10 hours to fabricate positive active material ($LiNi_{0.88}Co_{0.11}W_{0.01}O_2$) powder according to an embodiment 13.

Fabrication of Positive Active Material According to Comparative Example 6

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate and cobalt sulfate aqueous solution (molar ratio of nickel:cobalt=88.5:11.5) and a 10.5M ammonia solution were continuously provided into the reactor at 0.561 liter/hour and 0.128 liter/hour, respectively, for a time of 15 hours to 35 hours. At the same time, a sodium hydroxide solution was additionally supplied to adjust a pH.

The formed metal composite hydroxide ($Ni_{0.885}Co_{0.115}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 700° C. for 10 hours to fabricate positive active material ($LiNi_{0.885}Co_{0.115}O_2$) powder according to a comparative example 6.

FIG. 32 is a XRD graph of a positive active material according to an embodiment 13 of the inventive concepts, FIG. 33 shows SEM images of a positive active material precursor and a positive active material according to a comparative example 6, and FIG. 34 shows SEM images of a positive active material precursor and a positive active material according to an embodiment 13 of the inventive concepts.

Referring to FIGS. 32 to 34, it may be recognized that the positive active material according to the embodiment 13 of the inventive concepts is doped with tungsten. In addition, the number of broken particles of the positive active material according to the embodiment 13 is less than the number of broken particles of the positive active material according to the comparative example 6.

FIG. 35 shows a TEM image and a SEAD pattern of the positive active material according to the embodiment 13 of the inventive concepts.

Referring to FIG. 35, a cubic structure is observed in a portion of the positive active material including tungsten according to the embodiment 13 of the inventive concepts, i.e., in a surface portion of the positive active material particle including tungsten according to the embodiment 13.

FIG. 36 shows EPMA data of the positive active material according to the embodiment 13 of the inventive concepts, and FIG. 37 shows TEM-EDX mapping of the positive active material according to the embodiment 13 of the inventive concepts.

The following table 14 shows concentrations of elements at a center and a surface of the positive active material particle on the basis of EPMA data shown in FIG. 36. The following table 15 shows a total composition of the positive active material on the basis of TEM-EDX mapping of FIG. 37.

TABLE 14

| Element | Concentration | |
|---|---|---|
| | Center | Surface |
| Nickel | 87.3 | 87.7 |
| Cobalt | 11.9 | 11.5 |
| Tungsten | 0.8 | 0.8 |

TABLE 15

| Element | Concentration | |
|---|---|---|
| | Design | Atomic % |
| Nickel | 88 | 87.96 |
| Cobalt | 11 | 11.03 |
| Tungsten | 1 | 1.01 |

Referring to FIGS. 36 and 37 and the tables 14 and 15, the concentrations of nickel and cobalt and the concentration of tungsten are substantially constant from the center to the surface of the positive active material according to the embodiment 13. In other words, the positive active material according to the embodiment 13 may be formed of substantially the same material from the center to the surface and may be represented by substantially the same chemical formula from the center to the surface.

FIG. 38 is a graph showing charge/discharge characteristics of the positive active materials according to the embodiment 13 of the inventive concepts and the comparative example 6, and FIG. 39 is a graph showing capacity retention characteristics of the positive active materials according to the embodiment 13 of the inventive concepts and the comparative example 6.

Half cells were manufactured using the positive active materials according to the embodiment 13 and the comparative example 6. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 38 and 39 and the following table 16.

TABLE 16

|  | 0.1 C, 1st Dis-capa (mAh/g) | 1st Efficiency | 0.2 C Capacity (mAh/g) | 0.2 C/ 0.1 C | 0.5 C Capacity (mAh/g) | 0.5 C/ 0.1 C | 1 C Capacity (mAh/g) | 1 C/0.1 C | cycle | 1 C Cycle Retention | L/L (mg/cm2) |
|---|---|---|---|---|---|---|---|---|---|---|---|
| Comparative example 6 | 223.1% | 96.8% | 219.6 | 98.4% | 212.0 | 95.0% | 204.0 | 91.5% | 100 | 91.8% | 3.16 |
| Embodiment 13 | 226.5 | 95.4% | 221.3 | 97.7% | 211.3 | 93.3% | 201.7 | 89.0% | 100 | 99.3% | 3.07 |

As shown in FIGS. 38 and 39 and the table 16, capacity and charge/discharge characteristics of the embodiment 13 doped with the additive metal are superior to those of the comparative example 6 not doped with the additive metal.

Fabrication of Positive Active Material According to Embodiment 14

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of an additive aqueous solution in which tungsten (W) was dissolved. 10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=90:5:5) and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and W-doping.

A formed metal composite hydroxide ($Ni_{0.89}Co_{0.05}Mn_{0.05}W_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 750° C. for 10 hours to fabricate positive active material ($LiNi_{0.89}Co_{0.05}Mn_{0.05}W_{0.01}O_2$) powder according to an embodiment 14.

Fabrication of Positive Active Material According to Comparative Example 7

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=90:5:5) and a 10.5M ammonia solution were continuously provided into the reactor at 0.561 liter/hour and 0.128 liter/hour, respectively, for a time of 15 hours to 35 hours. At the same time, a sodium hydroxide solution was additionally supplied to adjust a pH.

A formed metal composite hydroxide ($Ni_{0.90}Co_{0.05}Mn_{0.05}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 750° C. for 10 hours to fabricate positive active material ($LiNi_{0.90}Co_{0.05}Mn_{0.05}O_2$) powder according to a comparative example 7.

Figure 40:
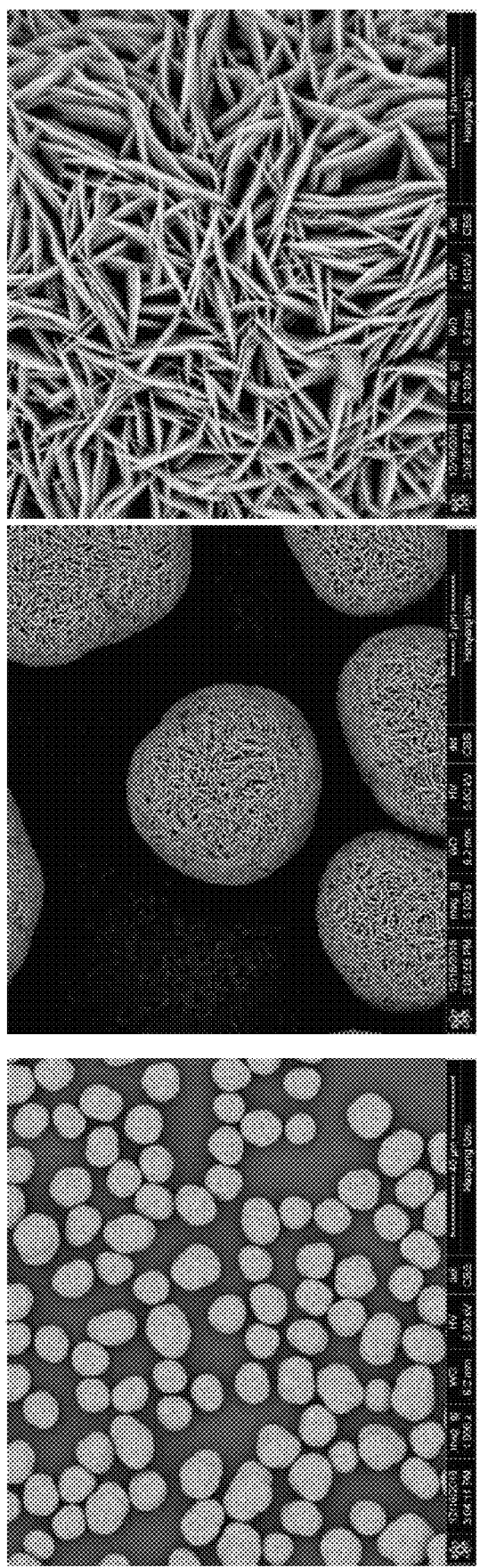
FIG. 40 shows SEM images of a positive active material precursor according to a comparative example 7.
Figure 42:
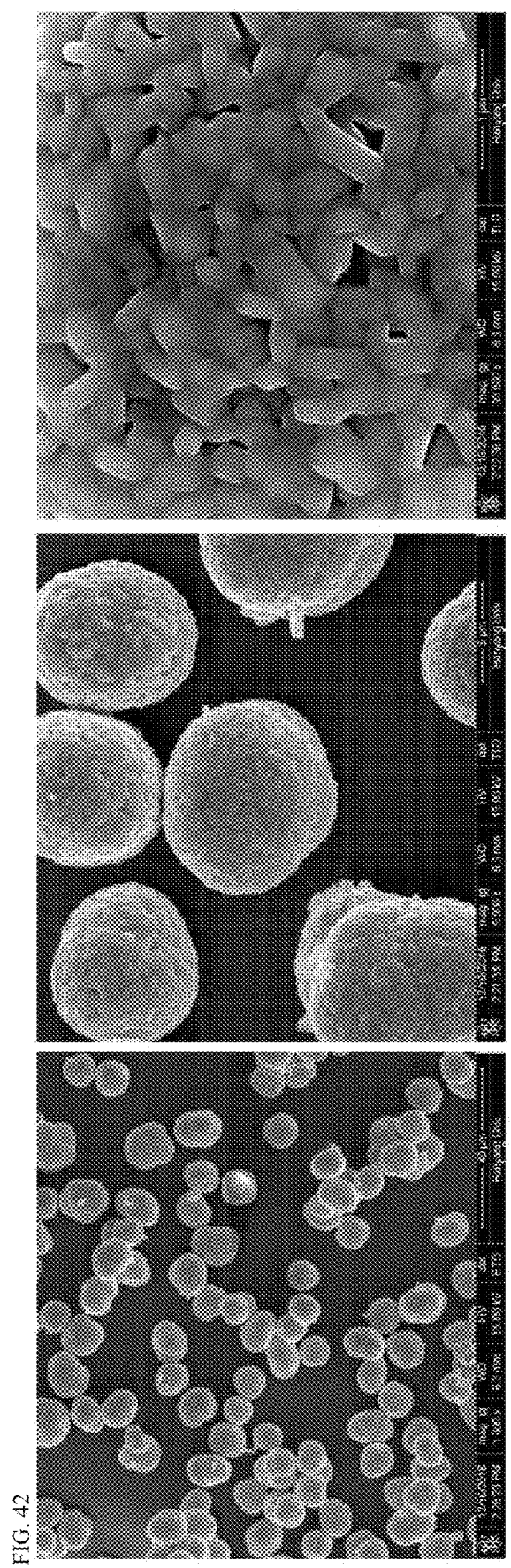
FIG. 42 shows SEM images of a positive active material according to the comparative example 7.
Figure 43:
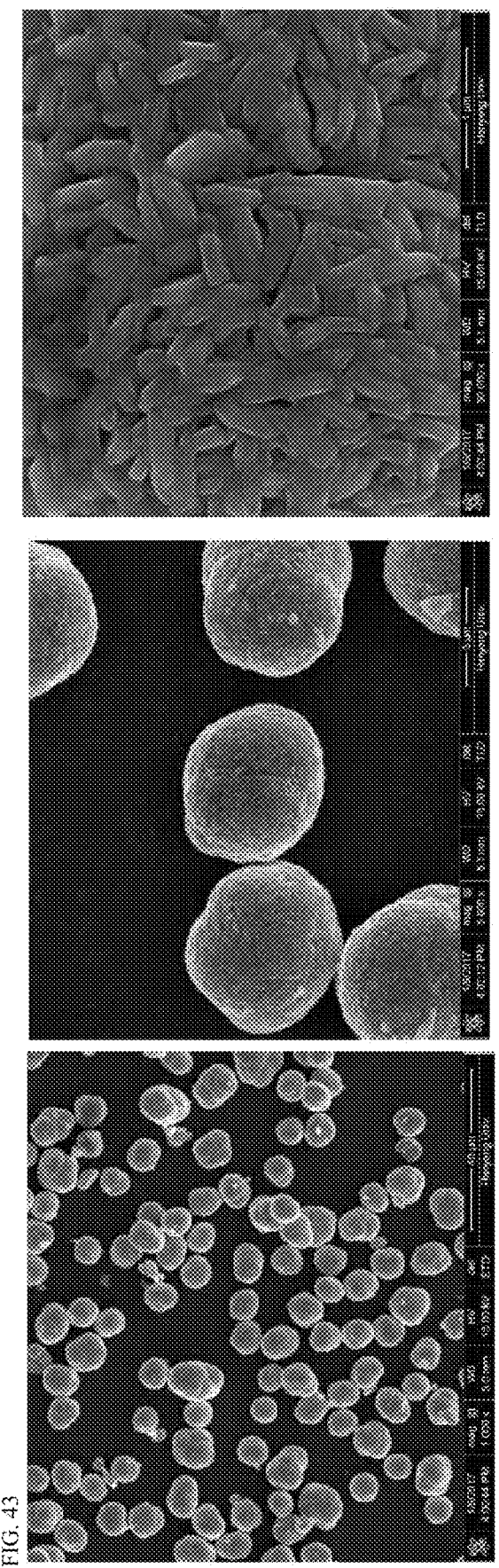
FIG. 43 shows SEM images of a positive active material according to the embodiment 14 of the inventive concepts.

FIG. 40 shows SEM images of a positive active material precursor according to a comparative example 7, and FIG. 41 shows SEM images of a positive active material precursor according to an embodiment 14 of the inventive concepts. FIG. 42 shows SEM images of a positive active material according to the comparative example 7, and FIG. 43 shows SEM images of a positive active material according to the embodiment 14 of the inventive concepts.

FIG. 44 is a graph showing charge/discharge characteristics of the positive active materials according to the embodiment 14 of the inventive concepts and the comparative example 7, and FIG. 45 is a graph showing capacity retention characteristics of the positive active materials according to the embodiment 14 of the inventive concepts and the comparative example 7.

Referring to FIGS. 44 and 45, half cells were manufactured using the positive active materials according to the comparative example 7 and the embodiment 14. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 44 and 45 and the following table 17.

TABLE 17

|  | 0.1 C, 1st Dis-Capa (mAh/g) | 1st Efficiency | 0.2 C Capacity (mAh/g) | 0.2 C/0.1 C | 0.5 C Capacity (mAh/g) | 0.5 C/0.1 C | Cycle number | 0.5 C Cycle Retention |
|---|---|---|---|---|---|---|---|---|
| Comparative example 7 | 226.3 | 94.9% | 220.8 | 97.6% | 210.4 | 93.0% | 100 | 87.7% |
| Embodiment 14 | 223.7 | 95.6% | 217.4 | 97.2% | 206.9 | 92.5% | 100 | 95.9% |

As shown in FIGS. 44 and 45 and the table 17, discharge capacity and life characteristics of the secondary battery manufactured using the positive active material according to the embodiment 14 are significantly superior to those of the secondary battery manufactured using the positive active material according to the comparative example 7.

Fabrication of Positive Active Material According to Embodiment 15

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of an additive aqueous solution in which tungsten (W) was dissolved. 10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=80:15:5) and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and W-doping.

A formed metal composite hydroxide ($Ni_{0.79}Co_{0.15}Mn_{0.05}W_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 780° C. for 10 hours to fabricate positive active material ($LiNi_{0.79}Co_{0.15}Mn_{0.05}W_{0.01}O_2$) powder according to an embodiment 15.

Fabrication of Positive Active Material According to Comparative Example 8

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=80:15:5) and a 10.5M ammonia solution were continuously provided into the reactor at 0.561 liter/hour and 0.128 liter/hour, respectively, for a time of 15 hours to 35 hours. At the same time, a sodium hydroxide solution was additionally supplied to adjust a pH.

A formed metal composite hydroxide ($Ni_{0.80}Co_{0.15}Mn_{0.05}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 780° C. for 10 hours to fabricate positive active material ($LiNi_{0.80}Co_{0.15}Mn_{0.05}O_2$) powder according to a comparative example 8.

FIG. 46 is a XRD graph of positive active materials according to the embodiment 15 of the inventive concepts and the comparative example 8, FIG. 47 is a graph showing charge/discharge characteristics of the positive active materials according to the embodiment 15 of the inventive concepts and the comparative example 8, and FIG. 48 is a graph showing capacity retention characteristics of the positive active materials according to the embodiment 15 of the inventive concepts and the comparative example 8.

Half cells were manufactured using the positive active materials according to the embodiment 15 and the comparative example 8. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 47 and 48 and the following table 18.

TABLE 18

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/ 0.1 C | 1 C Capacity (mAh/g) | 1 C/0.1 C | cycle | 1 C Cycle Retention | L/L (mg/cm2) |
|---|---|---|---|---|---|---|---|---|---|---|---|
| Comparative example 8 | 209.8 | 96.4% | 206.7 | 98.5% | 200.6 | 95.6% | 194.0 | 92.4% | 100 | 92.7% | 2.65 |
| Embodiment 15 | 211.5 | 96.6% | 207.9 | 98.3% | 202.1 | 95.6% | 194.6 | 92.0% | 100 | 96.6% | 3.31 |

As shown in FIGS. 47 and 48 and the table 18, capacity and charge/discharge characteristics of the embodiment 15 doped with the additive metal are superior to those of the comparative example 8 not doped with the additive metal.

Fabrication of Positive Active Material According to Embodiment 16

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of an additive aqueous solution in which tungsten (W) was dissolved. 10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=60:20:20) and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and W-doping.

A formed metal composite hydroxide ($Ni_{0.59}Co_{0.20}Mn_{0.20}W_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 850° C. for 10 hours to fabricate positive active material (LiNi$_{0.59}$Co$_{0.20}$Mn$_{0.20}$ W$_{0.01}$O$_2$) powder according to an embodiment 16.

Fabrication of Positive Active Material According to Comparative Example 9

10 liters of distilled water was provided into a co-precipitation reactor (capacity: 40 L, output power of rotary motor: 750 W or more). Thereafter, a N$_2$ gas was supplied into the reactor at a rate of 6 liter/min, and the distilled water was stirred at 350 rpm while maintaining a temperature of the reactor at 45° C. A 2M nickel sulfate, cobalt sulfate and manganese sulfate aqueous solution (molar ratio of nickel:cobalt:manganese=60:20:20) and a 10.5M ammonia solution were continuously provided into the reactor at 0.561 liter/hour and 0.128 liter/hour, respectively, for a time of 15 hours to 35 hours. At the same time, a sodium hydroxide solution was additionally supplied to adjust a pH.

A formed metal composite hydroxide (Ni$_{0.60}$Co$_{0.20}$Mn$_{0.20}$(OH)$_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 850° C. for 10 hours to fabricate positive active material (LiNi$_{0.60}$Co$_{0.20}$Mn$_{0.20}$O$_2$) powder according to a comparative example 9.

FIG. 49 is a XRD graph of positive active materials according to the embodiment 16 of the inventive concepts and the comparative example 9, FIG. 50 is a graph showing charge/discharge characteristics of the positive active materials according to the embodiment 16 of the inventive concepts and the comparative example 9, and FIG. 51 is a graph showing capacity retention characteristics of the positive active materials according to the embodiment 16 of the inventive concepts and the comparative example 9.

Half cells were manufactured using the positive active materials according to the embodiment 16 and the comparative example 9. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 50 and 51 and the following table 19.

TABLE 19

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/ 0.1 C | 1 C Capacity (mAh/g) | 1 C/0.1 C | cycle | 1 C Cycle Retention | L/L (mg/cm2) |
|---|---|---|---|---|---|---|---|---|---|---|---|
| Comparative example 9 | 190.5 | 94.8% | 187.0 | 98.2% | 181.5 | 95.3% | 175.5 | 92.1% | 100 | 95.5% | 3.69 |
| Embodiment 16 | 191.7 | 95.1% | 187.6 | 97.8% | 181.6 | 94.7% | 173.7 | 90.6% | 100 | 99.6% | 4.00 |

As shown in FIGS. 50 and 51 and the table 19, capacity and charge/discharge characteristics of the embodiment 16 doped with the additive metal are superior to those of the comparative example 9 not doped with the additive metal.

Fabrication of Positive Active Material According to Embodiment 17 Na$_2$MoO$_4$ powder was dissolved at a concentration of 0.019M in 10 L of a 4M sodium hydroxide solution to form 10 L of an additive aqueous solution in which Mo was dissolved. 10 liters of distilled water was provided into a co-precipitation reactor (capacity: 40 L, output power of rotary motor: 750 W or more). Thereafter, a N$_2$ gas was supplied into the reactor at a rate of 6 liter/min, and the distilled water was stirred at 350 rpm while maintaining a temperature of the reactor at 45° C. A 2M nickel sulfate aqueous solution and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and Mo-doping.

A formed metal composite hydroxide ($Ni_{0.99}Mo_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 730° C. for 10 hours to fabricate positive active material ($LiNi_{0.99}Mo_{0.01}O_2$) powder according to an embodiment 17.

FIG. 52 is a graph showing charge/discharge characteristics of the positive active materials according to the embodiment 17 of the inventive concepts and the comparative example 1, and FIG. 53 is a graph showing capacity retention characteristics of the positive active materials according to the embodiment 17 of the inventive concepts and the comparative example 1.

A half cell was manufactured using the positive active material according to the embodiment 17. Discharge capacities of the half cell were measured under conditions of cut off 2.7V to 4.3V, 0.1 C, and 30° C., and discharge capacities according to the number of charge/discharge cycles of the half cell were measured under conditions of cut off 2.7V to 4.3V, 0.5 C, and 30° C. The measured results of the embodiment 17 were compared with those of the half cell manufactured using the positive active material according to the comparative example 1. The compared results are shown in FIGS. 52 and 53 and the following table 20.

motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate aqueous solution and a 10.5M ammonia solution were continuously provided into the reactor at 0.561 liter/hour and 0.128 liter/hour, respectively, for a time of 15 hours to 35 hours. In addition, at the same time, the additive aqueous solution was supplied for adjustment of a pH and doping of W and Mo.

A formed metal composite hydroxide ($Ni_{0.98}W_{0.01}Mo_{0.01}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 760° C. for 10 hours to fabricate positive active material ($LiNi_{0.98}W_{0.01}Mo_{0.01}O_2$) powder according to an embodiment 18.

FIG. 54 is a graph showing charge/discharge characteristics of the positive active materials according to the embodiment 18 of the inventive concepts and the comparative example 1, and FIG. 55 is a graph showing capacity retention characteristics of the positive active materials according to the embodiment 18 of the inventive concepts and the comparative example 1.

TABLE 20

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/0.1 C | cycle | 0.5 C Cycle Retention | L/L (mg/cm2) |
|---|---|---|---|---|---|---|---|---|---|
| Comparative example 1 | 247.5 | 96.8% | 242.3 | 97.9% | 232.5 | 93.9% | 100 | 73.7% | 6.52 |
| Embodiment 17 | 245.4 | 95.2% | 242.4 | 98.8% | 236.6 | 96.4% | 100 | 82.6% | 5.09 |

As shown in FIGS. 52 and 53 and the table 20, capacity and charge/discharge characteristics of the embodiment 17 doped with the additive metal are superior to those of the comparative example 1 not doped with the additive metal.

Fabrication of Positive Active Material According to Embodiment 18

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of a preliminary additive aqueous solution in which tungsten (W) was dissolved. $Na_2MoO_4$ powder was dissolved at a concentration of 0.019M in the preliminary additive aqueous solution to form 10 L of an additive aqueous solution in which tungsten (W) and molybdenum (Mo) were dissolved.

10 liters of distilled water was provided into a co-precipitation reactor (capacity: 40 L, output power of rotary A half cell was manufactured using the positive active material according to the embodiment 18. Discharge capacities of the half cell were measured under conditions of cut off 2.7V to 4.3V, 0.1 C, and 30° C., and discharge capacities according to the number of charge/discharge cycles of the half cell were measured under conditions of cut off 2.7V to 4.3V, 0.5 C, and 30° C. The measured results of the embodiment 18 were compared with those of the half cell manufactured using the positive active material according to the comparative example 1. The compared results are shown in FIGS. 54 and 55 and the following table 21.

TABLE 21

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/0.1 C | cycle | 0.5 C Cycle Retention | L/L (mg/cm2) |
|---|---|---|---|---|---|---|---|---|---|
| Comparative example 1 | 247.5 | 96.8% | 242.3 | 97.9% | 232.5 | 93.9% | 100 | 73.7% | 6.52 |
| Embodiment 18 | 236.7 | 94.6% | 229.5 | 96.9% | 218.9 | 92.5% | 100 | 92.9% | 4.39 |

As shown in FIGS. 54 and 55 and the table 21, capacity and charge/discharge characteristics of the embodiment 18 doped with the additive metal are superior to those of the comparative example 1 not doped with the additive metal.

Fabrication of Positive Active Material According to Embodiment 19

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate and zirconium sulfate aqueous solution (molar ratio of nickel:zirconium=99.5:0.5) was continuously provided into the reactor for a time of 15 hours to 35 hours. At the same time, a sodium hydroxide solution was additionally supplied to adjust a pH.

A formed metal composite hydroxide ($Ni_{0.995}Zr_{0.005}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 650° C. for 10 hours to fabricate positive active material ($LiNi_{0.995}Zr_{0.005}O_2$) powder according to an embodiment 19.

FIG. 56 is a graph showing charge/discharge characteristics of the positive active materials according to the embodiment 19 of the inventive concepts and the comparative example 1, and FIG. 57 is a graph showing capacity retention characteristics of the positive active materials according to the embodiment 19 of the inventive concepts and the comparative example 1.

A half cell was manufactured using the positive active material according to the embodiment 19. Discharge capacities of the half cell were measured under conditions of cut off 2.7V to 4.3V, 0.1 C, and 30° C., and discharge capacities according to the number of charge/discharge cycles of the half cell were measured under conditions of cut off 2.7V to 4.3V, 0.5 C, and 30° C. The measured results of the embodiment 19 were compared with those of the half cell manufactured using the positive active material according to the comparative example 1. The compared results are shown in FIGS. 56 and 57 and the following table 22.

solution was dissolved in 9.6 L of a 4M sodium hydroxide solution to form 10 L of an additive aqueous solution in which tungsten (W) was dissolved.

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. A 2M nickel sulfate and zirconium sulfate aqueous solution (molar ratio of nickel:zirconium=99.5:0.5) was continuously provided into the reactor for a time of 15 hours to 35 hours. In addition, at the same time, the additive aqueous solution was supplied for adjustment of a pH and W-doping.

A formed metal composite hydroxide ($Ni_{0.985}W_{0.01}Zr_{0.005}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 790° C. for 10 hours to fabricate positive active material ($LiNi_{0.985}W_{0.01}Zr_{0.005}O_2$) powder according to an embodiment 20.

FIG. 58 is a graph showing charge/discharge characteristics of positive active materials according to an embodiment 20 of the inventive concepts and the comparative example 1, and FIG. 59 is a graph showing capacity retention characteristics of the positive active materials according to the embodiment 20 of the inventive concepts and the comparative example 1.

A half cell was manufactured using the positive active material according to the embodiment 20. Discharge capacities of the half cell were measured under conditions of cut

TABLE 22

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/0.1 C | cycle | 0.5 C Cycle Retention |
|---|---|---|---|---|---|---|---|---|
| Comparative example 1 | 247.5 | 96.8% | 242.3 | 97.9% | 232.5 | 93.9% | 100 | 73.7% |
| Embodiment 19 | 247.9 | 96.6% | 242.3 | 97.7% | 230.9 | 93.1% | 100 | 80.9% |

As shown in FIGS. 56 and 57 and the table 22, capacity and charge/discharge characteristics of the embodiment 19 doped with the additive metal are superior to those of the comparative example 1 not doped with the additive metal.

Fabrication of Positive Active Material According to Embodiment 20

$WO_3$ powder was dissolved at a concentration of 0.47M in 0.4 L of a 1.5M lithium hydroxide solution. The formed off 2.7V to 4.3V, 0.1 C, and 30° C., and discharge capacities according to the number of charge/discharge cycles of the half cell were measured under conditions of cut off 2.7V to 4.3V, 0.5 C, and 30° C. The measured results of the embodiment 20 were compared with those of the half cell manufactured using the positive active material according to the comparative example 1. The compared results are shown in FIGS. 58 and 59 and the following table 23.

TABLE 23

| | 0.1 C, 1st Dis-capa (mAh/g) | 1st Efficiency | 0.2 C Capacity (mAh/g) | 0.2/0.1 C | 0.5 C Capacity (mAh/g) | 0.5 C/0.1 C | cycle | 0.5 C Cycle Retention | L/L (mg/cm2) |
|---|---|---|---|---|---|---|---|---|---|
| Comparative example 1 | 247.5 | 96.8% | 242.3 | 97.9% | 232.5 | 93.9% | 100 | 73.7% | 6.52 |
| Embodiment 20 | 238.8 | 93.7% | 236.5 | 99.0% | 227.6 | 95.3% | 100 | 84.8% | 4.29 |

As shown in FIGS. 58 and 59 and the table 23, capacity and charge/discharge characteristics of the embodiment 20 doped with the additive metal are superior to those of the comparative example 1 not doped with the additive metal.

Fabrication of Positive Active Material According to Embodiment 21

$WO_3$ powder was dissolved at a concentration of 0.47M in 0.4 L of a 1.5M lithium hydroxide solution. The formed solution was dissolved in 9.6 L of a 4M sodium hydroxide solution to form 10 L of a first additive aqueous solution in which tungsten (W) was dissolved.

$Na_2MoO_4$ powder was dissolved at a concentration of 0.019M in 10 L of a 4M sodium hydroxide solution to form 10 L of a second additive aqueous solution in which molybdenum (Mo) was dissolved.

10 liters of distilled water was provided into a co-precipitation reactor (capacity: 40 L, output power of rotary motor: 750 W or more). Thereafter, a $N_2$ gas was supplied into the reactor at a rate of 6 liter/min, and the distilled water was stirred at 350 rpm while maintaining a temperature of the reactor at 45° C. For a time of 15 hours to 35 hours, a 2M nickel sulfate aqueous solution and a 10.5M ammonia solution were continuously provided into the reactor at 0.561 liter/hour and 0.128 liter/hour, respectively, and the second additive aqueous solution was continuously provided into the reactor for adjustment of a pH and Mo-doping. Thus, a core portion was formed.

After the formation of the core portion, the 2M nickel sulfate aqueous solution and the 10.5M ammonia solution were continuously provided at 0.561 liter/hour and 0.128 liter/hour, respectively, and the first additive aqueous solution was continuously provided for adjustment of the pH and W-doping, for a time of 5 hours to 10 hours. Thus, a shell portion was formed.

The formed metal composite hydroxide ($Ni_{0.99}W_{0.005}Mo_{0.005}(OH)_2$) was filtered, was cleaned by water, and then, was dried in a vacuum dryer at 110° C. for 12 hours. After the metal composite hydroxide and lithium hydroxide (LiOH) were mixed with each other at a molar ratio of 1:1, the mixture was heated at a heating rate of 2° C./min and then was maintained at 450° C. for 5 hours to perform a preliminary firing process. Thereafter, the mixture was fired at 770° C. for 10 hours to fabricate positive active material ($LiNi_{0.99}W_{0.005}Mo_{0.005}O_2$) powder according to an embodiment 21.

FIG. 60 is a graph showing an atomic ratio of a positive active material precursor according to the embodiment 21 of the inventive concepts, and FIG. 61 is a graph showing an atomic ratio of a positive active material according to the embodiment 21 of the inventive concepts. FIG. 62 is a graph showing charge/discharge characteristics of the positive active materials according to the embodiment 21 of the inventive concepts and the comparative example 1, and FIG. 63 is a graph showing capacity retention characteristics of the positive active materials according to the embodiment 21 of the inventive concepts and the comparative example 1.

As described above, the metal composite hydroxide ($Ni_{0.99}W_{0.005}Mo_{0.005}(OH)_2$) was formed as a positive active material precursor according to the embodiment 21, and an atomic ratio thereof was measured as shown in FIG. 60 and the following table 24.

TABLE 24

|    | 0 μm  | 2.0 μm | 4.0 μm | 5.0 μm |
|----|-------|--------|--------|--------|
| Ni | 99.17 | 99.01  | 98.84  | 99.00  |
| Mo | 0.83  | 0.95   | 0.63   | 0.02   |
| W  | —     | 0.04   | 0.53   | 0.98   |

In addition, an atomic ratio of the positive active material ($LiNi_{0.99}W_{0.005}Mo_{0.005}O_2$) according to the embodiment 21 was measured as shown in FIG. 61 and the following table 25.

TABLE 25

|    | 0 μm  | 2.0 μm | 4.0 μm | 5.0 μm |
|----|-------|--------|--------|--------|
| Ni | 99.45 | 99.40  | 99.37  | 99.28  |
| Mo | 0.23  | 0.26   | 0.30   | 0.21   |
| W  | 0.32  | 0.33   | 0.33   | 0.51   |

In addition, a half cell was manufactured using the positive active material according to the embodiment 21. Discharge capacities of the half cell were measured under conditions of cut off 2.7V to 4.3V, 0.1 C, and 30° C., and discharge capacities according to the number of charge/discharge cycles of the half cell were measured under conditions of cut off 2.7V to 4.3V, 0.5 C, and 30° C. The measured results of the embodiment 21 were compared with those of the half cell manufactured using the positive active material according to the comparative example 1. The compared results are shown in FIGS. 62 and 63 and the following table 26.

TABLE 26

|  | 0.1 C, 1st Dis-capa (mAh/g) | 1st Efficiency | 0.2 C Capacity (mAh/g) | 0.2/0.1 C | 0.5 C Capacity (mAh/g) | 0.5 C/0.1 C | cycle | 0.5 C Cycle Retention | L/L (mg/cm2) |
|---|---|---|---|---|---|---|---|---|---|
| Comparative example 1 | 247.5 | 96.8% | 242.3 | 97.9% | 232.5 | 93.9% | 100 | 73.7% | 6.52 |
| Embodiment 21 | 248.3 | 95.8 | 245.2 | 98.7 | 239.2 | 96.3 | 100 | 85.0 | 6.01 |

As shown in FIGS. 62 and 63 and the table 26, capacity and charge/discharge characteristics of the embodiment 21 doped with the additive metal are superior to those of the comparative example 1 not doped with the additive metal.

FIG. 64 is a graph showing charge/discharge characteristics of the positive active materials according to the embodiments 7, 14, 15 and 16 of the inventive concepts and the comparative examples 1, 7, 8 and 9, and FIG. 65 is a graph showing life characteristics of the positive active materials according to the embodiments 7, 14, 15 and 16 of the inventive concepts and the comparative examples 1, 7, 8 and 9.

Referring to FIGS. 64 and 65, charge/discharge and life characteristics of the positive active materials according to the embodiment 7 (LNO+W), the embodiment 14 (NCM 900505+W), the embodiment 15 (NCM 801505+W), the embodiment 16 (NCM 622+W), the comparative example 1 (LNO Pristine), the comparative example 7 (NCM 900505), the comparative example 8 (NCM 801505), and the comparative example 9 (NCM 622) were compared with each other.

As shown in FIGS. 64 and 65, capacity and charge/discharge characteristics of the positive active materials including the additive metal according to the embodiments are superior to those of the positive active materials according to the comparative examples which do not include the additive metal.

In addition, in the cases of the positive active materials not including the additive metal in the comparative examples, an initial capacity increases as a content of nickel increases, but a capacity significantly decreases as the number of charge/discharge cycles increases. In other words, the positive active materials including the additive metal according to the embodiments of the inventive concepts may effectively realize both high capacity characteristics and long life characteristics.

FIG. 66 is a graph showing life characteristics of the positive active materials according to the embodiments 7, 14, 15 and 16 of the inventive concepts and a comparative example 10.

Referring to FIG. 66, an NCA positive active material (NCA 82 ECO) including Ni, Co and AL (82 mol %), sold by Ecopro, was prepared as a comparative example 10, and life characteristics of the positive active material of the comparative example 10 were compared with those of the positive active materials according to the embodiments 7, 14, 15 and 16.

As shown in FIG. 66, charge/discharge characteristics of the positive active materials including the additive metal according to the embodiments are significantly superior to those of the positive active material according to the comparative example 10.

The positive active material and the method of fabricating the same according to the embodiments of the inventive concepts may be applied to a lithium secondary battery and a method of manufacturing the same. The lithium secondary battery including the positive active material according to the embodiments of the inventive concepts may be used in various industrial fields such as portable mobile devices, electric cars, and energy storage systems (ESS).

The positive active material according to the embodiments of the inventive concepts may include lithium, an additive metal, and at least one of nickel, cobalt, manganese, or aluminum. The additive metal may include an element different from nickel, cobalt, manganese, and aluminum. An average content of the additive metal (e.g., tungsten) may be less than 2 mol %. Thus, it is possible to realize or provide the positive active material which has high capacity, long life span, improved thermal stability, and high reliability.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A positive active material comprising:
   (i) lithium,
   (ii) an additive metal, and
   (iii) at least one of nickel, cobalt, manganese, or aluminum,
   wherein the additive metal includes an element different from nickel, cobalt, manganese, and aluminum,
   wherein the positive active material comprises a first crystal structure and a second crystal structure, which have different crystal systems from each other,
   wherein the first crystal structure is a cubic crystal structure and the second crystal structure is a trigonal or rhombohedral crystal structure,
   wherein the positive active material comprises an inner portion relatively adjacent to a center of the positive active material and an outer portion relatively adjacent to a surface of the positive active material, and
   wherein a proportion of the first crystal structure in the outer portion is greater than a proportion of the first crystal structure in the inner portion.

2. The positive active material of claim 1, wherein the additive metal has a substantially constant concentration throughout the positive active material, and
   wherein an average content of the additive metal is less than 2 mol %.

3. The positive active material of claim 1, wherein proportions of the first crystal structure and the second crystal structure are adjusted depending on the content of the additive metal.

4. The positive active material of claim 1,
   wherein the proportion of the first crystal structure increases as the content of the additive metal increases.

5. The positive active material of claim 1, wherein a proportion of the first crystal structure is higher than a proportion of the second crystal structure in a surface portion of a particle, and
   wherein a proportion of the second crystal structure is higher than a proportion of the first crystal structure in a central portion of the particle.

6. A positive active material represented by the following chemical formula 1, $$LiM1_aM2_bM3_cM4_dO_2 \quad \text{Chemical formula 1}$$

wherein
   each of 'M1', 'M2' and 'M3' is one of nickel, cobalt, manganese, and aluminum
   'M4' includes at least one of tungsten, niobium, tantalum, rubidium, bismuth, zinc, gallium, calcium, strontium, or tin;
   $0 \leq a < 1$, $0 \leq b < 1$, $0 \leq c < 1$, $0 < d < 0.02$, and at least one of 'a', 'b' or 'c' is greater than 0; and
   'M1', 'M2', and 'M3' are different metals from each other.

7. The positive active material of claim 6, wherein a crystal structure is controlled depending on a 'd' value in the chemical formula 1, and a permeating amount of fluorine is controlled depending on the 'd' value in the chemical formula 1 in a charge/discharge operation.

8. A method of fabricating a positive active material, the method comprising:
   preparing a base aqueous solution including at least one of nickel, cobalt, manganese, or aluminum, and an additive aqueous solution including an additive metal;
   providing the base aqueous solution and the additive aqueous solution into a reactor to fabricate a positive active material precursor in which a metal hydroxide including at least one of nickel, cobalt, manganese, or aluminum is doped with the additive metal; and firing the positive active material precursor and lithium salt to fabricate a positive active material in which a metal oxide including lithium and at least one of nickel, cobalt, manganese, or aluminum is doped with the additive metal wherein the positive active material comprises a first crystal structure and a second crystal structure, which have different crystal systems from each other, wherein the first crystal structure is a cubic crystal structure, and wherein the second crystal structure is a trigonal or rhombohedral crystal structure, wherein the positive active material comprises an inner portion relatively adjacent to a center of the positive active material and an outer portion relatively adjacent to a surface of the positive active material, and wherein a proportion of the first crystal structure in the outer portion is greater than a proportion of the first crystal structure in the inner portion.

9. The method of claim 8, wherein a doping concentration of the additive metal is less than 2 mol %, wherein a firing temperature of the positive active material precursor and the lithium salt is adjusted depending on the doping concentration of the additive metal.

10. The method of claim 8, wherein a firing temperature of the positive active material precursor and the lithium salt increases as the doping concentration of the additive metal increases.

11. The method of claim 8, wherein the doping concentration of the additive metal is adjusted by a concentration of the additive metal in the additive aqueous solution.

12. The method of claim 8, wherein a pH in the reactor is adjusted by the additive aqueous solution when the positive active material precursor is fabricated.

13. A positive active material represented by the following chemical formula 1:

$$LiM1_aM2_bM3_cM4_dO_2 \quad \text{Chemical formula 1}$$

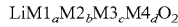

wherein each of 'M1', 'M2' and 'M3' is one of nickel, cobalt, manganese, and aluminum;

'M4' includes at least one of tungsten, molybdenum, zirconium, niobium, tantalum, titanium, rubidium, bismuth, magnesium, zinc, gallium, vanadium, chromium, calcium, strontium, or tin;

$0 \leq a < 1$, $0 \leq b < 1$, $0 \leq c < 1$, $0 < d < 0.02$, and at least one of 'a', 'b' or 'c' is greater than 0; and 'M1', 'M2', and 'M3' and 'M4' are different metals from each other, wherein the positive active material comprises an inner portion relatively adjacent to a center of the positive active material and an outer portion relatively adjacent to a surface of the positive active material, wherein the inner portion and the outer portion both include a first crystal structure and a second crystal structure, which have different crystal systems from each other, wherein a proportion of the first crystal structure is higher than a proportion of the second crystal structure in the outer portion, and wherein a proportion of the second crystal structure is higher than a proportion of the first crystal structure in the inner portion.

14. The positive active material of claim 13, wherein the M4 has a substantially constant concentration throughout the positive active material.

15. The positive active material of claim 13, wherein proportions of the first crystal structure and the second crystal structure are adjusted depending on the content of the M4.

16. The positive active material of claim 13, wherein the first crystal structure is a cubic crystal structure, wherein the second crystal structure is a trigonal or rhombohedral crystal structure, and wherein the proportion of the first crystal structure increases as the content of the M4 increases.

* * * * *